US012182064B2

(12) United States Patent
Volpe et al.

(10) Patent No.: US 12,182,064 B2
(45) Date of Patent: Dec. 31, 2024

(54) MULTIPLE ACCUMULATE BUSSES IN A SYSTOLIC ARRAY

(71) Applicant: Amazon Technologies, Inc., Seattle, WA (US)

(72) Inventors: Thomas A Volpe, Austin, TX (US); Sundeep Amirineni, Austin, TX (US); Thomas Elmer, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/446,357

(22) Filed: Aug. 8, 2023

(65) Prior Publication Data

US 2023/0385233 A1    Nov. 30, 2023

Related U.S. Application Data

(63) Continuation of application No. 17/659,642, filed on Apr. 18, 2022, now Pat. No. 11,762,803, which is a
(Continued)

(51) Int. Cl.
*G06F 15/80* (2006.01)
*G06F 7/505* (2006.01)
(Continued)

(52) U.S. Cl.
CPC .......... *G06F 15/8046* (2013.01); *G06F 7/505* (2013.01); *G06F 7/53* (2013.01);
(Continued)

(58) Field of Classification Search
None
See application file for complete search history.

(56) References Cited

U.S. PATENT DOCUMENTS

| 4,937,774 A | 6/1990 | Malinowski |
| 5,138,695 A | 8/1992 | Means et al. |

(Continued)

FOREIGN PATENT DOCUMENTS

| EP | 3396524 A1 | 10/2018 |
| WO | 94/10638 A1 | 5/1994 |

(Continued)

OTHER PUBLICATIONS

Tanenbaum, "Structured Computer Organization," 2nd edition, 1984, Prentice-Hall, Inc., p. 1-5. (Year: 1984).

(Continued)

*Primary Examiner* — Eric Coleman
(74) *Attorney, Agent, or Firm* — Knobbe, Martens, Olson & Bear, LLP

(57) ABSTRACT

Systems and methods are provided to enable parallelized multiply-accumulate operations in a systolic array. Each column of the systolic array can include multiple busses enabling independent transmission of input partial sums along the respective bus. Each processing element of a given columnar bus can receive an input partial sum from a prior element of the given columnar bus, and perform arithmetic operations on the input partial sum. Each processing element can generate an output partial sum based on the arithmetic operations, provide the output partial sum to a next processing element of the given columnar bus, without the output partial sum being processed by a processing element of the column located between the two processing elements that uses a different columnar bus. Use of columnar busses can enable parallelization to increase speed or enable increased latency at individual processing elements.

20 Claims, 25 Drawing Sheets

Related U.S. Application Data continuation of application No. 16/915,795, filed on Jun. 29, 2020, now Pat. No. 11,308,027.

(51) Int. Cl.
*G06F 7/53* (2006.01)
*G06F 7/544* (2006.01)
*G06F 9/30* (2018.01)
*G06F 9/38* (2018.01)

(52) U.S. Cl.
CPC .......... *G06F 7/5443* (2013.01); *G06F 9/3001* (2013.01); *G06F 9/3893* (2013.01)

(56) References Cited

U.S. PATENT DOCUMENTS

| | | | |
|---|---|---|---|
| 5,151,953 | A | 9/1992 | Landeta |
| 5,168,499 | A | 12/1992 | Peterson et al. |
| 5,659,781 | A | 8/1997 | Larson |
| 5,692,147 | A | 11/1997 | Larsen et al. |
| 5,764,556 | A | 6/1998 | Stiles |
| 6,205,462 | B1 | 3/2001 | Wyland et al. |
| 6,463,453 | B1 | 10/2002 | Dang |
| 6,480,872 | B1 | 11/2002 | Choquette |
| 6,801,924 | B1 | 10/2004 | Green et al. |
| 7,724,261 | B2 | 5/2010 | Thekkath et al. |
| 7,814,137 | B1 | 10/2010 | Mauer |
| 8,184,696 | B1 * | 5/2012 | Chirila-Rus ......... H04N 19/433 375/240.23 |
| 8,549,055 | B2 * | 10/2013 | Streicher ................ G06F 17/10 708/203 |
| 8,610,729 | B2 | 12/2013 | Airey et al. |
| 8,924,455 | B1 | 12/2014 | Barman et al. |
| 9,552,189 | B1 | 1/2017 | Langhammer et al. |
| 10,790,830 | B1 | 9/2020 | Pugh et al. |
| 10,817,260 | B1 | 10/2020 | Huang et al. |
| 10,872,295 | B1 | 12/2020 | Liu et al. |
| 10,879,904 | B1 | 12/2020 | Gunter et al. |
| 10,915,297 | B1 | 2/2021 | Halutz et al. |
| 11,088,694 | B1 * | 8/2021 | Gunter ............. H03K 19/17744 |
| 11,113,233 | B1 | 9/2021 | Volpe |
| 11,232,062 | B1 | 1/2022 | Volpe et al. |
| 11,308,026 | B1 | 4/2022 | Volpe et al. |
| 11,308,027 | B1 | 4/2022 | Volpe et al. |
| 11,422,773 | B1 | 8/2022 | Volpe et al. |
| 11,467,806 | B2 | 10/2022 | Elmer |
| 11,762,803 | B2 | 9/2023 | Volpe et al. |
| 11,816,446 | B2 | 11/2023 | Elmer et al. |
| 11,842,169 | B1 | 12/2023 | Elmer |
| 11,880,682 | B2 | 1/2024 | Myer et al. |
| 2003/0081489 | A1 | 5/2003 | Scheuerlein et al. |
| 2004/0139274 | A1 | 7/2004 | Hui |
| 2006/0149803 | A1 | 7/2006 | Siu et al. |
| 2007/0028076 | A1 | 2/2007 | Wezelenburg |
| 2007/0185953 | A1 | 8/2007 | Prokopenko et al. |
| 2009/0113169 | A1 * | 4/2009 | Yang ..................... G06F 7/57 712/15 |
| 2009/0248769 | A1 | 10/2009 | Chua |
| 2010/0281235 | A1 * | 11/2010 | Vorbach ................. G06F 7/483 712/15 |
| 2011/0025900 | A1 | 2/2011 | Kondo |
| 2011/0058569 | A1 | 3/2011 | Harrand |
| 2011/0225116 | A1 | 9/2011 | Gupta et al. |
| 2016/0342890 | A1 | 11/2016 | Young |
| 2016/0342892 | A1 | 11/2016 | Ross |
| 2016/0358069 | A1 | 12/2016 | Brothers et al. |
| 2017/0010863 | A1 | 1/2017 | Nystad |
| 2017/0097824 | A1 | 4/2017 | Elmer et al. |
| 2017/0103311 | A1 | 4/2017 | Henry et al. |
| 2017/0115958 | A1 | 4/2017 | Langhammer |
| 2017/0235515 | A1 * | 8/2017 | Lea ..................... G11C 7/1006 711/105 |
| 2018/0036165 | A1 | 2/2018 | Fallon |
| 2018/0052660 | A1 | 2/2018 | Lutz |
| 2018/0164866 | A1 | 6/2018 | Turakhia et al. |
| 2018/0218518 | A1 | 8/2018 | Yan et al. |
| 2018/0225116 | A1 | 8/2018 | Henry et al. |
| 2018/0314671 | A1 | 11/2018 | Zhang et al. |
| 2018/0315398 | A1 | 11/2018 | Kaul et al. |
| 2018/0336163 | A1 | 11/2018 | Phelps et al. |
| 2018/0336164 | A1 | 11/2018 | Phelps et al. |
| 2018/0336165 | A1 | 11/2018 | Phelps et al. |
| 2019/0026077 | A1 | 1/2019 | Manzo |
| 2019/0041961 | A1 | 2/2019 | Desai et al. |
| 2019/0079801 | A1 | 3/2019 | Lyuh et al. |
| 2019/0138882 | A1 | 5/2019 | Choi et al. |
| 2019/0236049 | A1 | 8/2019 | Vantrease et al. |
| 2019/0294413 | A1 | 9/2019 | Vantrease et al. |
| 2019/0311243 | A1 | 10/2019 | Whatmough et al. |
| 2019/0377549 | A1 | 12/2019 | Alben et al. |
| 2019/0385050 | A1 | 12/2019 | Wang et al. |
| 2020/0026497 | A1 | 1/2020 | Park et al. |
| 2020/0117988 | A1 | 4/2020 | Arthur et al. |
| 2020/0150958 | A1 | 5/2020 | Ahmed |
| 2020/0159809 | A1 * | 5/2020 | Catthoor ................. G06N 3/04 |
| 2020/0192701 | A1 | 6/2020 | Horowitz et al. |
| 2020/0201576 | A1 | 6/2020 | Yudanov et al. |
| 2020/0226473 | A1 | 7/2020 | Sharma et al. |
| 2020/0285605 | A1 | 9/2020 | Nam |
| 2020/0302298 | A1 | 9/2020 | Van et al. |
| 2020/0349106 | A1 | 11/2020 | Ovsiannikov |
| 2021/0019591 | A1 * | 1/2021 | Venkatesh ................ G06N 3/08 |
| 2021/0042087 | A1 | 2/2021 | Pugh et al. |
| 2021/0064985 | A1 | 3/2021 | Sun et al. |
| 2021/0072955 | A1 | 3/2021 | Mellempudi et al. |
| 2021/0089316 | A1 | 3/2021 | Rash et al. |
| 2021/0091794 | A1 | 3/2021 | Snelgrove et al. |
| 2021/0103429 | A1 | 4/2021 | Nair et al. |
| 2021/0150770 | A1 | 5/2021 | Appu et al. |
| 2021/0157548 | A1 | 5/2021 | Elmer |
| 2021/0157549 | A1 | 5/2021 | Elmer et al. |
| 2021/0390367 | A1 * | 12/2021 | Liu ..................... G06F 9/30105 |
| 2022/0350567 | A1 | 11/2022 | Pan et al. |
| 2022/0350775 | A1 | 11/2022 | Volpe |
| 2023/0004384 | A1 | 1/2023 | Meyer et al. |
| 2023/0004523 | A1 | 1/2023 | Meyer et al. |
| 2023/0010054 | A1 | 1/2023 | Elmer |

FOREIGN PATENT DOCUMENTS

| | | |
|---|---|---|
| WO | 2021/108644 A1 | 6/2021 |
| WO | 2021/108660 A1 | 6/2021 |
| WO | 2023/278475 A1 | 1/2023 |

OTHER PUBLICATIONS

Henry, et al., "Leveraging the bfloat16 Artificial Intelligence Datatype For Higher-Precision Computations," 2019 IEEE 26th Symposium on Computer Arithmetic (ARITH), Kyoto, Japan, 2019, pp. 69-76. (Year: 2019).

Grout, 'Chapter 5—Introduction to Digital Logic Design', in Digital Systems Design with FPGAs and CPLDs, I. Grout, Ed. Burlington: Newnes, 2008, pp. 217-331. (Year: 2008).

Arnould, et al., "A Systolic Array Computer," 1985, IEEE., pp. 232-235. (Year: 1985).

Bao, et al., "A Reconfigurable Macro-Pipelined Systolic Accelerator Architecture," 2011, IEEE., 6 pages. (Year: 2011).

Dick, "Computing the Discrete Fourier Transform on FPGA Based Systolic Arrays," 1996, Proc of the 4th Intl. ACM Symposium on Field Programmable Gate Arrays, 7 pages. (Year: 1996).

Garland, et al., "Low Complexity Multiple Accumulate Units for Convolutional Neural Networks with Weight Sharing," ACM, 24 pages (2018).

Hu, et al., "Systolic Arrays," 2018, SpringerLink, Handbook of Signal Processing Systems, pp. 939-977. (Year: 2018).

International Search Report and Written Opinion in PCT Application No. PCT/US2022/035353, mailed Oct. 14, 2022, 26 pages.

International Search Report and Written Opinion received for PCT Patent Application No. PCT/US2020/062337, mailed on Mar. 4, 2021, 8 pages.

(56) References Cited

OTHER PUBLICATIONS

International Search Report and Written Opinion received for PCT Patent Application No. PCT/US2020/062356, mailed on Mar. 4, 2021, 8 pages.
Kung, "Why Systolic Architectures," IEEE pp. 37-48 (1982).
Kung, et al., "Design Algorithms for VLSI Systems," Dept. of Computer Science, Carnegie Mellon Univ, Pittsburgh (Jan. 1979).
Kung, et al., "Packing Sparse Convolutional Neural Networks for Efficient Systolic Array Implementations: Column Combining under Joint Optimization," ACM. pp. 821-834 (2019).
Kung, et al., "Systolic Arrays for VLSI," Dept. of Computer Science, Carnegie Mellon, Pittsburgh (Apr. 1978).
Liu, et al., "An Energy-Efficient Systolic Pipeline Architecture for Binary Convolutional Neural Network," 2019, IEEE, 4 pages. (Year: 2019).
Pedram, et al., A High performance, Low Power Linear Algebra Core, 2011, IEEE, pp. 35-42 (Year 2011).
Wah, et al., "Systolic Programming for Dynamic Programming Problems," 1999, Circuits Systems Signal Processing vol. 7, No. 2, pp. 119-149. (Year: 1999).
Yang, et al., "Systolic Array Based Accelerator and Algorithm Mapping for Deep Learning Algorithms", Network and Parallel Computing, 2018, pp. 153-158.

\* cited by examiner

MULTIPLE ACCUMULATE BUSSES IN A SYSTOLIC ARRAY

CROSS-REFERENCE TO RELATED APPLICATIONS

This application is a continuation of U.S. patent application Ser. No. 17/659,642, filed on Apr. 18, 2022, entitled "MULTIPLE ACCUMULATE BUSSES IN A SYSTOLIC ARRAY," which is a continuation of U.S. patent application Ser. No. 16/915,795, filed on Jun. 29, 2020, entitled "MULTIPLE ACCUMULATE BUSSES IN A SYSTOLIC ARRAY," the disclosure of each of which is hereby incorporated by reference in its entirety. Furthermore, any and all priority claims identified in the Application Data Sheet, or any connection thereto, are hereby incorporated by reference under 37 C.F.R. § 1.57.

BACKGROUND

Artificial neural networks are computing systems with an architecture based on biological neural networks. A neural network may be implemented by circuitries and data paths, such as a systolic array. Systolic arrays can accelerate the performance of the training and inference phases of artificial neural networks. During the training phase, input data can be provided to train a model. During the inference phase, new inputs can be processed according to the model to obtain a predicted result. User applications often use the model in the inference phase, so the inference phase can often have time sensitivities, and latency during the inference phase can negatively impact the user experience.

Systolic arrays can comprise an array of processing elements capable of performing concurrent arithmetic operations. The array can be initialized with weights corresponding to the trained network, and inference can occur by passing input data into and through the array to result in an output. In order to achieve high inference throughput, it is generally desirable that such arrays operate as quickly as possible. However, increases in clock speed can often result in detrimental increases in power consumption, processor size, required cooling, and the like, thus limiting these increases.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Figure 1A:
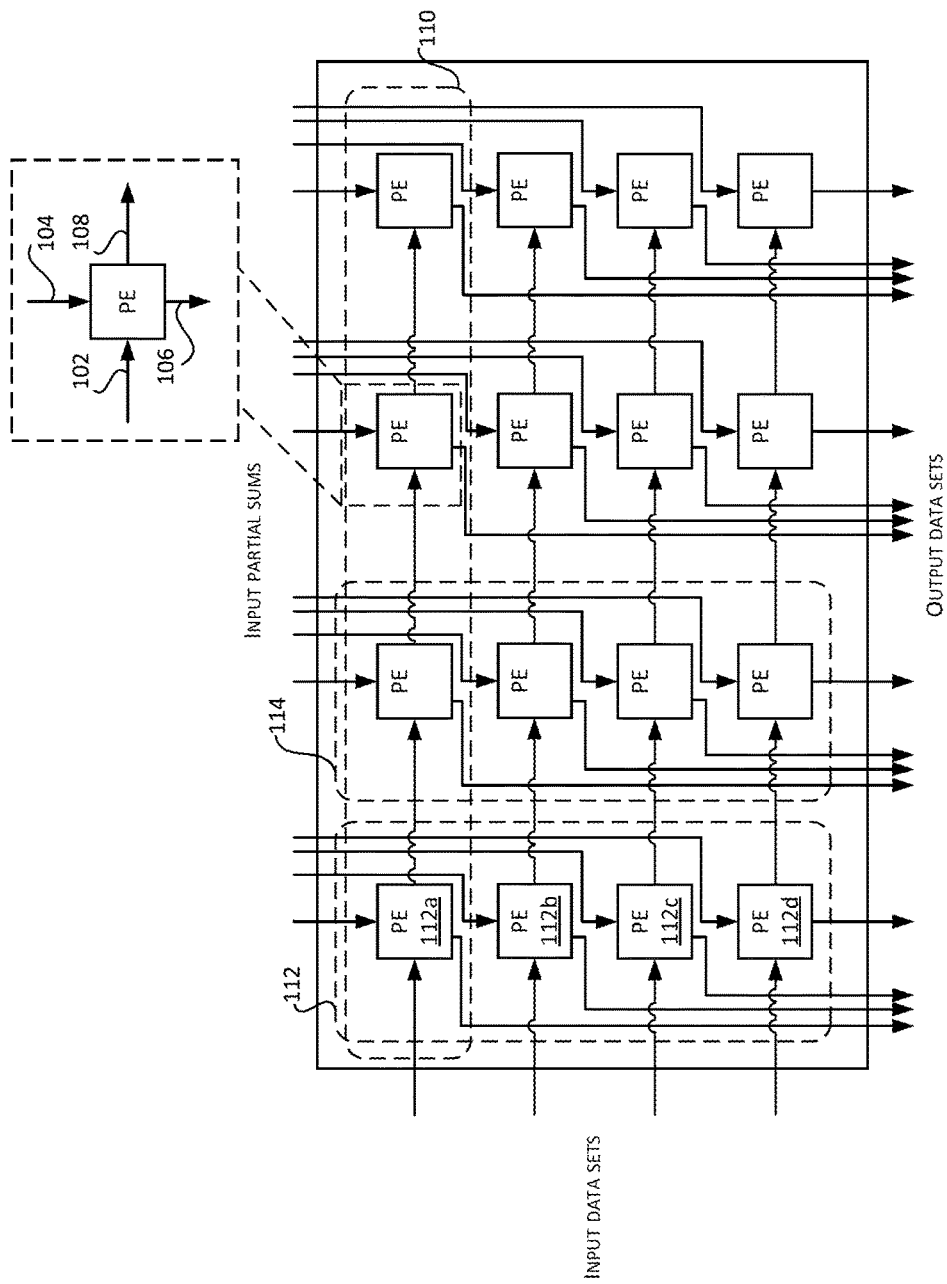
FIG. 1A illustrates an example 4×4 systolic array.

Generally described, the present disclosure relates to a systolic array that includes multiple busses within a column and/or row of the systolic array. As described herein, the use of multiple busses within such a column or row of an array can decrease latency of the array, by increasing parallelism in the array and in some cases decreasing the total pathlength of calculations (e.g., the number of serial operations in each parallelized operations path) through the array. Furthermore, use of multiple busses within a row or column array can reduce the latency sensitivity of individual operations within each calculation path, thus enabling longer latencies for individual operations. This enablement of longer latencies for individual operations may allow for lower-cost or lower-power elements to be used in an array, while maintaining overall latency of the array due to the decreases in latency by the use of multiple busses.

As described herein, a systolic array includes an array of processing elements (PEs), often arranged into two dimensions (e.g., columns and rows). The PEs of the array can be interconnected to enable data to pass through the PEs, which may conduct one or more mathematical operations on the data. For example, each PE may conduct a "multiply accumulate" operation, whereby inputs are fed horizontally into PEs of each row of the array, with each PE multiplying its respective input by a stored weight value and passing the product result to a PE in a subsequent row. The partial sums may accumulate in each column of the array, such that an adder at the base of each column can combine the partial sums of each PE within the column to obtain a final sum for the column.

One illustrative use of a systolic array is in conducting an inference phase of a machine learning application. Machine learning generally requires at least two phases: a "learning phase," where a model is trained against training data, and an "inference phase," in which the trained model is applied to production data to predict a result. Inference phase applications are often latency sensitive, in that they operate in production environments. Moreover, inference phase applications—and particularly neural network applications—often require dense algebraic calculations, such as matrix multiplications. Systolic arrays may be used to accelerate inference-phase workloads in machine learning applications.

As noted above, the PEs of a systolic array may be divided into rows and columns. Each PE in the input layer may receive an element of an input data set, and scale the element with a weight (e.g., a filter) to indicate the element's degree of influence on the output. Each PE in the intermediate layers may receive at least one of the element and the weight (or filter) from another PE in the systolic array. Each PE in the intermediate layers may combine the elements received from a corresponding PE of the systolic array to compute a set of intermediate outputs. For example, each PE in the intermediate layers may compute a sum of element-weight products, and then generate an intermediate output by applying an activation function to the sum.

Generally, an input data set (e.g., an input feature map) may be fed, one input data element at a time, into its respective row of the systolic array, and passed from one PE to another PE in a given row starting from a leftmost PE. Each row corresponds to a specific input data element and weight which are fed into a first PE, in a row, and subsequently passed to an adjacent PE located to the right of the first PE in the same row. Further, an input partial sum may be fed, one input partial sum at a time, into its respective column of the systolic array, and passed from one PE to another PE in a given column starting from a topmost PE. Generally, an input partial sum may be fed from a first PE, in one column, to an adjacent PE located directly beneath the first PE in the same column. Further, each column corresponds to a specific input partial sum which is passed through each PE of a given column. This can be done to allow each PE of a given column to perform a mathematical operation on the input partial sum to produce an output partial sum. As the input data element passes through a PE, the input data element can be multiplied with the weight value, and accumulated with the input partial sum. The first PE, in one column, is provided an input partial sum and generates an output partial sum based on the mathematical operations performed by that PE. The output partial sum is then provided to an adjacent PE in the same column as an input partial sum. The adjacent PE may then perform further mathematical operations before generating an output partial sum and passing the output partial sum to a further adjacent PE. In some implementations, input data is fed into a systolic array in a cascading fashion, with a PE in a first column and row (a position that may be designated as [0,0], indicating row and column 0) receiving an input data element and an input partial sum in a first clock cycle. Thereafter, data can generally flow to subsequent through the rows and columns at a given rate (e.g., advancing one PE per cycle). For example, the output partial sum of the PE at [0,0] can be fed to the PE at [1,0], along with an input data element for row 1, such that the PE at [1,0] performs a mathematical operations on that input data element and partial sum during a second clock cycle. Similarly, the input data element of PE [0,0] can be passed to a PE of a subsequent column (e.g., at position [0,1]), which can also be fed an input partial sum, such that the PE at [0,1] conducts a mathematical operation on that input partial sum and input data element during the second clock cycle. Assuming a convention in which rows advance downward and columns advance to the right, data therefore can generally flow down and to the right during operation of the array. To assist in these calculations, PEs within the array may be provided with weights prior to the first clock cycle, or may receive weights in the first clock cycle or during calculations.

As machine learning applications and neural network applications proliferate, the demand for decreased latency and decreased power consumption has also increased. The present disclosure provides a systolic array with significant advantages over prior implementations. The present disclosure enables a reduction in the overall latency of the array, relative to traditional arrays, without significantly increasing power consumption of the array. Moreover, the present disclosure can enable the use of longer-latency circuitry within PEs of an array, which may reduce power consumption or production costs of the array without significantly increasing latency of the array. These advantages are provided by the embodiments discussed herein, and specifically, by creation of a systolic array utilizing multiple busses in a row and/or column of a systolic array that enable PEs to pass inputs to non-consecutive PEs in the respective row and/or column. As discussed herein, passing of inputs to non-consecutive PEs can enable "sequence skipping" within the rows and/or columns of the array, as an input to, e.g., a first row of a first column can "skip" calculations of one or more consecutive rows and instead be processed by a second, third, fourth, etc., row of the first column (according, for example, to the number of parallel busses). Because some systolic arrays are arranged such that partial sums cascade within a column, columnar busses are sometimes referred to herein as "accumulate" busses. Similarly, because some arrays are arranged such that input data elements or weights are passed along rows, row-aligned busses may be referred to herein as "weight-load" or "input data element" busses.

As disclosed herein, one or more columns and/or rows of a systolic array may be implemented as a plurality of busses to enable sequence skipping within the respective column and/or row and reduce latency of the column and/or row. In the example of a plurality of busses in a column, an initial operation on each bus may occur in the mth row of the systolic array, where m is the number of a given bus. Thus, the initial operation of a first bus can occur in a first row, the initial operation of a second bus can occur in a second row, etc. Subsequent operations on each bus can then occur in a respective (m+n)th row following the prior operation on each bus, where n is the number of busses and m is the row number corresponding to the prior operation for the respective bus. For example, where a column includes three busses, an initial operation of a first bus of the column can occur in a first row, a second operation of the first bus can occur in the fourth row, a third operation of the first bus can occur in the seventh row, etc. Thus, where four busses are implemented, operations on the first bus can occur in the $1^{st}$, $5^{th}$, $9^{th}$, etc., row of the array, operations on the second bus can occur in the $2^{nd}$, $6^{th}$, $10^{th}$, etc., row of the array, and so on. Further, parallel accumulations can occur with respect to each bus of a column. Each bus of the column can accumulate a partial sum of the column based on the rows of the array corresponding to each bus. An adder can be provided at the base of each column to add together the sums of each bus, to result in a total sum for the column. Thus, whereas a traditional array has an operation path-length of r (the number of rows in the array), an array as disclosed herein can achieve an operation path-length of r n, where n is the number of busses provided to each column of the array. This reduction in path-length can reduce latency of the array, allow for longer latency at each operation, or a combination thereof. Implementing a plurality of busses in a row can likewise include an initial operation on each bus that may occur in the mth column of the systolic array, where m is the number of a given bus and a subsequent operation on each bus may occur in a respective (m+n)th column following the initial operation on each bus, where n is the number of busses and m is the column number corresponding to the prior operation for the respective bus.

During use, each column of a systolic array can be "primed" with a plurality of input partial sums, one for each columnar bus. In one embodiment, each of the plurality of input partial sums is set to a certain initial value, such as zero. In other embodiments, each of the plurality of input partial sums may be configured to carry a different value. Each input partial sum can be provided to an initial row of the systolic array corresponding to the bus that carries the input partial sum (e.g., a first input partial sum to a first row, a second input partial sum to a second row, etc.). Further, each row of a systolic array can be "primed" with a plurality of input data elements or weights, one for each row-oriented bus. Each row-oriented bus can be "primed" with an input data element and a weight. In one embodiment, each of the row-oriented busses can be "primed" with multiple weights. For example, a first weight may be stored in a first weight register and a second weight may be stored in a second weight register of the row-oriented bus. In some embodiments, one or more of the input data element or the weight is set to a certain initial value, such a zero. Each input data element or weight can be provided to an initial column of the systolic array corresponding to the bus that carries the respective input data element or weight (e.g., a first input data element to a first column, a second input data element to a second column, etc.).

Each PE in a given column of PEs in a systolic array configured with multiple columnar busses can be configured to receive an input partial sum corresponding to a bus of the column of PEs and generate an output partial sum also corresponding to the bus of the column of PEs. Each columnar bus may be configured to pass data along a set of processing elements corresponding to the bus, which processing elements perform mathematical operations using data passed along the bus. For ease of reference, the set of processing elements that perform mathematical operations with respect to data passed on a bus may be said to be "coupled to" that bus. One skilled in the art will appreciate that a "bus" may in practice represent a logical data path formed, for example, by circuitry of the processing elements and interconnections between those processing elements. Each PE in the column of PEs may generate the output partial sum by, for example, multiplying a row-level input against a stored weight, and adding a product result to the input partial sum. Each PE can then be configured to provide this output partial sum to a subsequent, non-consecutive PE associated with operations on the relevant columnar bus. In some embodiments, partial sums may pass through consecutive PEs, with each PE being configured to "skip" operations on any partial sum received from a PE not sharing a columnar bus. For example, if the column of the systolic array is provided n busses of input partial sums, each PE of the column of the systolic array can generate an output partial sum, skip n−1 PEs adjacent to the original PE, and provide the output partial sum to the PE after skipping n−1 PEs. Illustratively, if the column of the systolic array is implemented as 4 busses which each carry an input partial sum, the first four PEs of the column of the systolic array will be provided input partial sums. After performing operations on a first input partial sum, the first PE of the column can generate a first output partial sum based on the first input partial sum. The first PE may then skip 3 PEs, the second, third, and fourth PEs in the column, and provide the first output partial sum to the fifth PE as a fifth input partial sum. The fifth PE can generate a fifth output partial sum based on the fifth input partial sum. The fifth PE may then skip 3 PEs, the sixth, seventh, and eighth PEs in the column, and provide the fifth output partial sum to the ninth PE as a ninth input partial sum. Each PE of the column of the systolic array can be configured to skip subsequent PEs in providing the output partial sum. Additionally, each column of the systolic array can be configured to simultaneously enable sequence skipping based on the number of busses provided to the respective column.

Somewhat similarly, when using multiple row-oriented busses, each PE in a given row of PEs can be configured to receive an input data element and/or weight corresponding to a certain bus. Each row-oriented bus may be include a set of processing elements coupled together with interconnects, such that data is passed between elements of the bus. For example, a first PE may be associated with a first row-oriented bus, a second PE may be associated with a second row-oriented bus, etc. Such use of multiple row-oriented busses enables parallelism within a row of the systolic array by enabling multiple PEs to perform operations on a first input simultaneously. Further, the use of multiple row-oriented busses allows for sequence skipping and improves the overall latency of the row. Each PE in the row perform one or more operations on input data elements and/or weights received via that bus by, for example, multiplying the input data element and the weight. Each PE can then be configured to provide the input data element and/or the weight to a subsequent, non-consecutive PE associated with the operations on the relevant row-oriented bus. Thus, the subset of PEs on a row that correspond to a certain bus may in some instances be thought of as a logical "sub-array" representing, for example, a quarter of the total PEs in the array when four row-oriented busses are provided. In a simplified example using only a single columnar bus and four row-oriented busses, the PEs of a first quarter of the columns of an array can represent a first sub-array, with a second quarter of the columns representing a second sub-array etc. In some embodiments, in a systolic array using multiple columnar busses, the subset of PEs on a column that correspond to a certain columnar bus may be thought of as a logical "sub-array."

In some embodiments, when using multiple row-oriented busses and multiple columnar busses, the sub-arrays of PEs may include a subset of PEs on a row that correspond to a certain row-oriented bus and a subset of PEs on a column that correspond to a certain columnar bus. Each logical combination of a row-oriented bus and a columnar bus can correspond to a sub-array. For example, in a systolic array with three row-oriented busses and three columnar busses, the systolic array may include the following sub-arrays: the combination of the first row-oriented bus and the first columnar bus, the combination of the first row-oriented bus and the second columnar bus, the combination of the first row-oriented bus and the third columnar bus, the combination of the second row-oriented bus and the first columnar bus, the combination of the second row-oriented bus and the second columnar bus, the combination of the second row-oriented bus and the third columnar bus, the combination of the first row-oriented bus and the third columnar bus, the combination of the second row-oriented bus and the third columnar bus, and the combination of the third row-oriented bus and the third columnar bus. In some embodiments, where the systolic array includes m row-oriented busses and n columnar busses, the systolic array may include m×n sub-arrays. Each sub-array may be used as an independent systolic array. For example, a 128×128 systolic array including 4 row-oriented busses and 4 columnar busses may be used as 16 independent 32×32 systolic arrays. Alternatively, multiple sub-arrays may be used in various combinations as one or more parallelized systolic arrays. For example, a 128×128 systolic array including 4 row-oriented busses and 4 columnar busses may be used as 8 independent 64×32 or 32×64 arrays, 4 independent 64×64, 32×128, or 128×32 arrays, 2 independent 64×128 or 128×64 arrays, or 1 128×128 array (each of which can provide a level of parallelization depending on the number of row-oriented and columnar busses used).

In some embodiments, PEs of a given sub-array can be non-adjacent and distributed throughout an array. For example, a first sub-array may be made up of the first, fifth, ninth, etc., columns of the sub-array. Each PE of a given sub-array can obtain input data elements and weights on their respective row-oriented bus, and pass such elements and weights through consecutive PEs, with each PE being configured to "skip" operations on any input data element or weight received from a PE not sharing a row-oriented bus. For example, if the row of the systolic array is provided m busses of input data elements and/or weights, each PE of the row of the systolic array can receive an input data element and weight, skip m−1 PEs adjacent to the original PE, and provide the input data element and weight to the PE after skipping m−1 PEs. Thus, input data elements and weights can be passed through adjacent PEs to arrive at a next PE corresponding to a given sub-array.

In other embodiments, PEs of a given sub-array can be grouped within the array into multiple adjacent columns. For example, a first quarter of all columns within the array can represent a first sub-array, a next quarter of all columns can represent a second sub-array, etc. Thus, each PE can be configured to provide an input data set (e.g., an element and weight, though these may be passed at separate times) to a subsequent, consecutive PE associated with the operations on the relevant row-oriented bus. In some embodiments, an input data set may be passed to m consecutive PEs associated with the operations on the relevant row-oriented bus where m is equal to the number of PEs in the row divided by the number of row-oriented busses in the row. Each sub-array may further include an active bus and a plurality of passive busses (e.g., inactive busses) corresponding to a plurality of row-oriented busses. Each sub-array may be configured to perform operations on the input of the active bus. The systolic array may be divided by shifters based on the number of row-oriented busses. For example, if the row of the systolic array includes four row-oriented busses, the systolic array may include four shifters. In other embodiments, the row may include n row-oriented busses and the systolic array may include n−1 shifters. Further, each sub-array may be separated from a subsequent sub-array by a shifter. The shifter may receive the active bus and the plurality of passive busses and shift a different row-oriented bus into the active bus position for the subsequent sub-array. For example, if row-oriented bus 1 is in an active bus position and row-oriented bus 2 is in a passive bus position for sub-array 1, the shifter may be configured to shift row-oriented bus 2 into the active bus position and shift row-oriented bus 1 into the passive bus position. Each sub-array may include any number of passive bus positions. Each shifter may be configured to drop the input of the active position of the previous sub-array. For example, if row-oriented bus 1 is in an active bus position for sub-array 1, shifter 1 located after the row-oriented bus 1 may drop the input of row-oriented bus 1 and may not transmit row-oriented bus 1 to subsequent sub-arrays. Each consecutive sub-array may be provided a decreasing number of row-oriented busses. For example, a first sub-array may receive 5 row-oriented busses, a second sub-array may receive 4 oriented busses, a third sub-array may receive 3 row-oriented busses, a fourth sub-array may receive 2 row-oriented busses, and a fifth sub-array may receive 1 row-oriented bus. Each PE of each sub-array may be configured with the same number of bus-positions further enabling parallelism and increasing efficiency.

In accordance with embodiments of the present disclosure, each shifter may include a plurality of pipelining registers to store inputs from one or more of the row-oriented busses. The pipelining registers may store a given input for one or more clock cycles. The pipelining registers may be configured to store each input that has not already been dropped by a shifter as described above. For example, if a row includes four row-oriented busses, the second shifter, located between the second sub-array and the third sub-array, may store inputs for two row-oriented busses as the first row-oriented bus has been dropped by a first shifter and the second row-oriented bus has been dropped by the second shifter. The shifters can be spaced in the systolic array according to the distance that a given input can travel in a given clock cycle. For example, an input may travel a distance corresponding to four columns in a given clock cycle and the corresponding systolic array may include selector elements with pipelining registers at every four columns of the systolic array.

In some embodiments, the systolic array may include a pipelining block before the first column of the systolic array to store the input data elements and/or weights. The pipelining block may be configured to include a plurality of pipelining registers to store the inputs. In some embodiments, the pipelining block can be located externally to the systolic array. The pipelining block can be configured to store m inputs, where m is the number of row-oriented busses and the number of corresponding input data elements and/or weights. The pipelining block can be configured to store a given input for n clock cycles, where n is based on the position of the row-oriented bus associated with the given input, and provide the stored input to the systolic array. For example, the pipelining block can store an input for a first row-oriented bus for one clock cycle, an input for a second row-oriented bus for two clock cycles, and an input for a third row-oriented bus for three clock cycles. The pipelining block can be aligned with the pipelining such that, after passing through the pipelining block and the shifters, each input is stored for the same number of clock cycles. For example, an input of a first row-oriented bus may be stored by the pipelining block for one clock cycle and the shifters for two clock cycles and an input of a second row-oriented bus may be stored by the pipelining block for two clock cycles and the shifters for one clock cycle such that the input of each row-oriented bus is stored for three clock cycles.

The systolic array may include an aggregator at the end of each column of the systolic array to combine the partial sums of each columnar bus into a total sum for the column. Specifically, the aggregator can be configured to operate on n inputs, where n is the number of columnar busses and the number of corresponding partial sums. The aggregator can be provided each of the n partial sums and provide a total sum for the column. The aggregator may be configured to include a plurality of adders. In some implementations, each adder can be configured to receive two partial sums and perform an addition operation on the two partial sums. For example, if the systolic array includes four busses, the aggregator may include three adders. A first adder can be configured to add the partial sums of the first and second busses and a second adder can be configured to add the partial sums of the third and fourth busses. A third adder can be configured to add the sum generated by the first adder and the sum generated by the second adder. The use of adders in this manner can provide for a physical implementation of chunk-based accumulation, preserving accuracy relative to serialized accumulation over a column.

Each PE of the systolic array can perform multiply-accumulate operations comprising multiple steps, each of which can be implemented at intervals to decrease power consumption and cost of the individual PE. For example, the PEs can be configured to compute (IDE*W+IPS), where IDE is an input data element, W is a weight, and IPS is an input partial sum. This operation can be delineated into a multiplication step and an accumulation step, each of which may be implemented at intervals. The multiplication of IDE and W yields a multiplication result. The multiplication result is accumulated with (e.g. added to) the IPS to result in the output partial sum for the PE.

In general, systolic arrays can operate at a series of intervals. A systolic interval is a time interval where complete or partial calculations are advanced in a systolic array. For example, during each systolic interval, processing elements can operate and communicate data to other processing elements in the array. Illustratively, during a systolic interval a processing element can perform one or more of the following: receive new input data, perform computations such as multiplication or addition, read/write to registers, and generate new output data. Systolic intervals can be uniform time periods. A systolic interval can be determined according to a clock signal or other synchronization signal. One example of a common systolic interval is a full duty cycle of the clock signal. Other examples of systolic intervals can include a partial duty cycle of the clock signal such as uptick to downtick or downtick to uptick, or a systolic interval can last over multiple clock cycles. Systolic arrays generally include a plurality of processing elements that advance data in one or more designated, nonlinear paths through the processing elements based on the systolic intervals, and systolic arrays are different from standard, multi-core, pipelined general purpose/graphical processor units.

In some embodiments, multiple operations can be conducted by each PE of an array, such as both a multiply and accumulate operation. In one embodiment, both the multiply and accumulate operations can occur during the same systolic interval. In another embodiment, a delay may be imposed between these operations. For example, multiplication can be performed by a PE during a first systolic interval, and the accumulation can be performed by the PE during a subsequent systolic interval. A delay register can store the input partial sum for the accumulator to read and use in the subsequent systolic interval. By pipelining the multiply and accumulate operations in different systolic intervals, the area of each PE can be reduced, each PE can be made more energy efficient, the speed of each systolic interval can be increased, and/or any combination thereof.

In accordance with embodiments of the present disclosure, power consumption of an array operating at a given frequency can be further reduced (or, conversely, the frequency of an array of a given power consumption can be increased) by allowing for a higher latency of operations within one or more PEs of the array. For example, power consumption of the array can be reduced by allowing a higher latency during the accumulate operation of a multiply-accumulate PE. Generally described, increasing the allowable latency of operation of a PE can simplify circuitry of the PE, thereby reducing power consumption. For example, by allowing a higher latency during the accumulate operation of a multiply-accumulate PE, the circuitry of the adder can be simplified, reducing the power consumption of the adder. With typical systolic array techniques, however, this increased latency can also reduce an overall frequency of operation of the array, since an adder within a PE is generally expected to conduct an add operation each clock cycle. In accordance with the present disclosure, the latency of an adder can be increased without alteration to frequency by utilizing internally-pipelined adders, which take an input on each systolic interval, process that over n intervals (which represent a latency of the adder), and provide an output after the n intervals has passed. For example, an adder may have a latency of 2 intervals, and may therefore accept inputs (e.g., the output of a multiply operation and an output of a prior PE) on a first interval, conduct an addition operation during two intervals, and provide a sum as an output on a third interval. The adder may include, for example, delay registers to enable operation on a two-cycle cadence.

While increasing the latency of an adder can provide benefits to circuitry cost or power consumption, it can also generally decrease the effective operational speed of the array by the total incurred latency among a chain of operations, which can generally represent the length of a chain (e.g., number of adders) multiplied by the relative increase in latency at each adder. For example, if sums are accumulated across a column of 10 PEs, utilizing a 2-interval latency adder in each PE would delay operational speed of the chain by 10 systolic intervals relative to using a 1-interval latency adder. However, the parallelism provided by use of multiple accumulate busses in each column of the array can conversely decrease the length of each columnar chain of operations, dividing the length by the number of busses provided on each column. By selecting the relative increase in latency and the number of columnar busses to be equal or relatively equal, the effective overall speed of operation of an array can be generally maintained. (Note that the inclusion of an aggregator to add outputs of the columnar busses may slightly delay overall operation, this delay is expected to be small relative to total operating time of the array and acceptable given the advantages of such parallel busses.) In other embodiments, the relative increase in latency and the number of columnar busses may be different numbers, according to the desired operational characteristics of the systolic array.

In one configuration, a systolic array can be configured such that a first input is provided to the first PE of each bus on an interval matching the relative order of busses. For example, a first input can be provided to a first PE of a first bus in a first interval, to the first PE of a second bus in a second interval, etc. In another configuration, because each bus represents an independent chain of operations, an input can be provided to the first PE of each bus of a column or row during the same interval to decrease latency of the array. By providing a first input to each bus of a column or row during the same interval, operations on the second or later busses can begin more quickly, which can decrease the latency of the array.

While providing for multiple busses can provide the above-noted benefits, doing so may also complicate physical implementation and manufacturing of a systolic array. For example, the processing elements of a systolic array are often identical to one another, simplifying physical implementation and manufacturing of those elements. One approach to implementing multiple busses would be to manufacture a different type of processing element for each bus. For example, where four columnar busses are implemented, four types of PEs could be manufactured. A first type of PE may include an adder attached to a wire running vertically at a first horizontal input/output position (e.g., at position 1 along a horizontal axis), and three vertical pass-through wires on three other horizontal positions. A second type of PE may include a pass-through wire at the first horizontal position, an adder at the second position, and two pass-through wires at the third and fourth position. The third and fourth types of PEs may include adders on wires at the third and fourth positions, respectively, and include pass-through wires at other positions. An array could then be created by circulating PE types for each row of the array (e.g., a first row with a first type, a second row with a second type, etc.). While possible, manufacturing and physically implementing a different type of PE for each columnar bus can greatly increase physical implementation and manufacturing complexity. Similarly, manufacturing and physically implementing a different type of PE for each row-oriented bus can greatly increase physical implementation and manufacturing complexity.

In accordance with embodiments of the present disclosure, system cost and complexity can be reduced relative to the above-noted approach by allowing for the provision of uniform PEs throughout a systolic array. Specifically, each PE may include a number of inputs and outputs equal to a desired number of busses. The inputs and outputs may be arranged, for example, at positions along a top and bottom of the PE (e.g., at horizontal positions 1 through 4, for 4 columnar busses or at vertical positions 1 through 4, for 4 row-oriented busses). However, rather than passing each input to a corresponding output at the same position (e.g., input at horizontal position 1 to an output at position 1), the inputs may be shifted by at least one position. For example, an input at position n may be shifted to an output at position n+1, such that an input of a first position is output to a second position, an input at the second position is output to a third position, etc. The inputs may be shifted as described for row-oriented and/or columnar busses. Each PE may include operational elements on a single bus connecting an input and output (e.g., the bus connecting an input at position 1 to an output at position 2). The remaining busses may be pass-through wires. In this manner, each PE may be configured to receive multiple busses without needing to vary the configuration of each PE. For example, in the above configuration, a first PE in a column would output a result to a second output position, which would pass through the second PE via a pass-through wire and be output to a third output position, which would in turn pass through third and fourth PEs via pass-through wires, before being input to a first position of a fifth PE, which could perform operations on the output of the first PE. Thus, multiple columnar busses can be implemented using a single configuration of a PE.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

FIG. 1A illustrates an example 4×4 systolic array 100A including 4 accumulate busses (shown as columnar busses in FIG. 1A) for each column of PEs which can decrease the overall latency of the array as compared to traditional systolic arrays. The systolic array 100A illustratively includes four columns of PEs and four rows of PEs with four PEs in each row, and four PEs in each column. It will be understood that the systolic array 100A is simplified for the purpose of description, and that a systolic array 100A in accordance with the present disclosure may include any number of PEs in each row and column. In one configuration, the number of PEs in each row may be different than the number of PEs in each column. It will be further understood that such a systolic array 100A may be logically organized in any number of rows and any number of columns. In one configuration, the number of rows may be different than the number of columns. The systolic array 100A may be part of a neural network processor in a computer system. For example, the computer system may be configured to provide multi-tenant compute services for data processing applications such as an image recognition service, text-based data processing (e.g., processing of search queries), audio or video data processing, etc.

Each PE may receive a plurality of inputs and produce a plurality of outputs, including at least one input from a non-adjacent PE and at least one output for a non-adjacent PE, which can increase the overall system speed. For example, each PE may receive a row input from an adjacent PE and a column input from a non-adjacent PE. Further, each PE may produce a row output for an adjacent PE and a column output for a non-adjacent PE. Each PE may receive inputs via a row input bus 102 and a column input bus 104 and produce outputs via a column output bus 106 and a row output bus 108. A PE may receive inputs from a left PE of the same row (or from external circuitries) via the row input bus 102. The PE may receive inputs from an above PE of the same column located non-adjacent to the PE (or from external circuitries) via the column input bus 104. The PE may perform arithmetic computations on one or more of the input received via the column input bus 106 and the row input bus 108, skip a number of PEs corresponding to a number of columnar busses in the column, and transmit the column output to a non-adjacent PE of the column (or to the external circuitries) via the column output bus 106. The PE may also forward the inputs received via the row input bus 102 to an adjacent right PE of the same row via the row output bus 108.

The systolic array 100A may perform arithmetic computations, including multiplication and accumulation operations, on a plurality of inputs to produce a plurality of output data sets. For example, each PE may include arithmetic units such as a multiplier and an adder, or a fused multiplier adder. In the example of FIG. 1A, each row of the PEs may be configured to handle one set of input data, and each column of the PEs may be configured to handle multiple sets of input partial sums (e.g., one per columnar bus). In the example of FIG. 1A, each column of the PEs can be configured to handle four sets of input partial sums provided by four columnar busses. Each set may further correspond to a first set during a first systolic interval and a subsequent set during a subsequent systolic interval. In one configuration, the number of columnar busses for two or more columns may be different. For example, a first column may handle four sets of input partial sums provided by four columnar busses and a second column may handle three sets of input partial sums provided by three columnar busses. Each column of the PEs may generate multiple sets of output data sets; in the example of FIG. 1A, four output data sets are generated. In some implementations, each column of the PEs may include an aggregator (described in more detail below) configured to generate one set of output data based on the output data sets generated by each bus of the respective column. In other implementations, the aggregator may be configured to generate more or fewer sets of output data based on the output data sets generated by each bus of the respective column. For example, in a column with four busses, the aggregator may be configured to generate one, two, or four sets of output data. In some instances, output of an aggregator may be configurable. For example, where the aggregator includes multiple stages of adders (e.g., to reduce a set of n inputs by half during each stage, with a final stage providing one aggregate sum of all n inputs), the aggregator may be configured to output the partial sums obtained at any individual stage as the outputs for the column, or may be disabled such that the array provides the n inputs as outputs for the column.

Each column of a systolic array may receive a plurality of input data sets and a plurality of input partial sums for use in mathematical operations. For example, with reference to the leftmost column 112 of FIG. 1A, the column 112 may receive four sets of input data, with each set of input data being handled by a PE in a respective row of the array. As such, the first PE 112a can be configured to obtain a first set of input data, a second PE 112b can be configured to obtain a second set of input data, etc. With further reference to the leftmost column 112 of FIG. 1A, the column 112 may receive four input partial sums, with each input partial sum being handled by a PE in a respective row of the array. As such, the first PE 112a can be configured to obtain a first input partial sum, a second PE 112b can be configured to obtain a second input partial sum, etc. Each PE within a given row of PEs may similarly receive a partial input sum. For example, each PE within the row 110 of PEs (the topmost row) may receive an input partial sum. Further each column within the systolic array may receive a plurality of input partial sums with each plurality of input partial sums including a number of input partial sums equal to the number of columnar busses in the respective column. It will be understood that the systolic array 100A is simplified for the purpose of description, and that the column in accordance with the present disclosure may receive any number of input data sets and any number of input partial sums.

Each PE of the array may perform mathematical operations on the inputs to the PE to generate an output partial sum during one or more systolic intervals. Each PE of the array may be provided (e.g., via the input data sets) with a weight value corresponding to that PE. Each PE may further obtain, from the corresponding input data set received via the row input bus 102, an input data element. The input data element can be multiplied with the weight value to generate a product during a first systolic interval. During the same or a subsequent systolic interval, the PE can add the product to an input partial sum obtained via the column input bus 104, and output a resulting sum (the output partial sum). The resulting sum can be passed via the column output bus 106 to a non-adjacent PE within the same columnar bus as the PE. In accordance with aspects of the present disclosure, output of the resulting sum can occur at least a number i of intervals after obtaining the input data element. For example, where i is 4, the PE 112a may generate a first product (from the first input data set) during a first systolic interval, perform an accumulation with the input partial sum during any of the first, second, third, and fourth systolic intervals, and transmit a partial sum to a non-adjacent PE of the same columnar bus, or to an columnar aggregator, via the column output bus 106 during the fourth systolic interval.

More generally, each PE of the systolic array may perform arithmetic operations on an input partial sum to generate an output partial sum. Each PE may skip a number of rows and transmit an output partial sum to a PE located beneath the PE in the same column and corresponding to the skipped number of rows. In some implementations, the skipped number of rows is equal to the number of busses in the column. For example, if the column has 3 busses providing input partial sums to the PEs of the column, a first PE in the first column may generate an output partial sum and, skipping 3 rows, transmit the output partial sum to a fourth PE in the first column.

Each PE in the column 112 can also propagate the input data sets to other PE columns (e.g., a column 114), which can scale the input data sets with a different set of weights as compared to column 112. Each column of PEs can perform arithmetic operations (e.g., multiplications and additions) to generate output data elements for use by other processing elements in parallel with the column of PEs. In the example of FIG. 1A, the systolic array 100A can generate output data elements for four PEs corresponding to the four columns of the systolic array 100A.

Each column of the systolic array may be divided into sets of PEs representing a logical location within each columnar bus and corresponding to the number of columnar busses in the column. For example, if a column has 4 columnar busses, each set of PEs may include 4 PEs. The first 4 PEs in the column 112 illustratively represent a first PE associated with each columnar bus, with the subsequent 4 PEs representing a second PE of each columnar bus, etc. During a first systolic interval, the first set of PEs in the column (e.g., the initial PEs of each bus) may receive an input partial sum. Each of the first set of PEs can then pass their output partial sum to respective PEs of the second set of PEs. Passing of output partial sums illustratively occurs during a subsequent interval that accounts for a latency of the operations conducted by the first set of PEs.

Figure 1B:
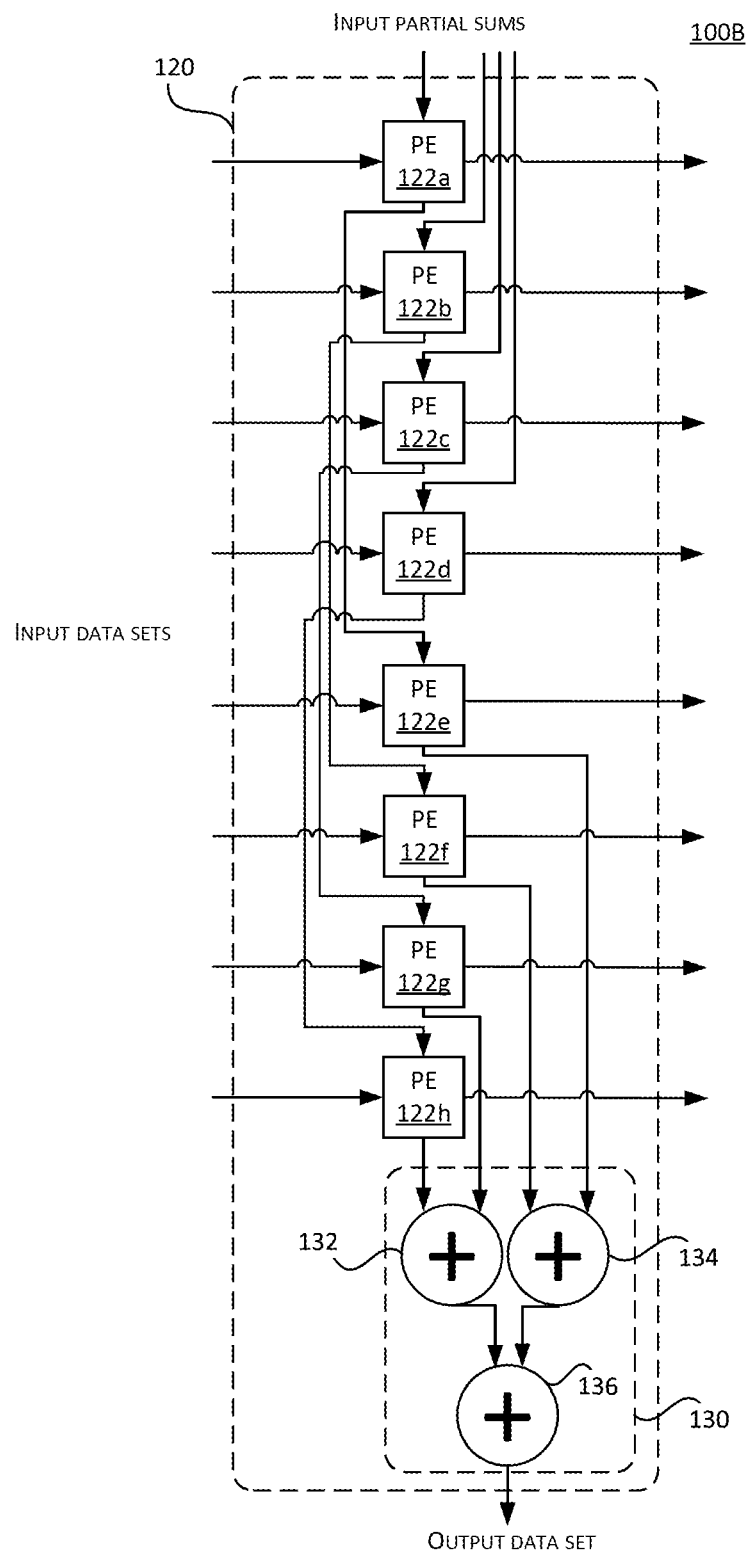
FIG. 1B illustrates an example 1×8 column of a systolic array.

FIG. 1B illustrates an example configuration of an eight-PE column 120 within a systolic array 100B. The array 100B may be similar to the array 100A of FIG. 1A, but illustratively includes 8 rows and one column to better illustrate the interconnections that form multiple columnar busses. Specifically, as shown in FIG. 1B, each PE within a first set of PEs (e.g., PEs 112a-d) provides an output partial sum to corresponding non-adjacent PE of a second set of PEs (e.g., PEs 112e-h), thus forming a four columnar busses. By varying the number of PEs within each set, the number of columnar busses is similarly varied. By varying the number of sets of PEs (e.g., the number of PEs in the column), the path-length of each columnar bus is varied. Thus, each column of an array may be constructed with any number of columnar busses and any length of columnar bus.

To facilitate calculation of a total output sum for a column, the column 120 in FIG. 1B includes an aggregator 130. The aggregator 130 may be configured to add the partial sums generated by each columnar bus of the column 120. In some implementations, the aggregator 130 may include a plurality of adders collectively configured to sum together the outputs of the final PE in each columnar bus. The aggregator 130 can illustratively implement pairwise summation (also known as "cascade summation"), and therefore include a number of adders equal to one less than the number of busses for a column. These adders can be configured such that each row of adders contains a number equal to or greater than half the number of inputs (e.g., from a prior row of adders or from the columnar busses), until a final row of adders contains a single adder that provides a total sum for the column.

For example, in FIG. 1, the aggregator 130 includes three adders: a first adder 132, a second adder 134, and a third adder 136, based on the column 120 containing four columnar busses. Each adder may be configured to add partial sums generated by the column 120 of PEs. For example, the first adder 132 may add a first output partial sum (from a first columnar bus) and a second output partial sum (from a second columnar bus) and generate an output. The second adder 134 may add a third output partial sum (from a third columnar bus) and a fourth output partial sum (from a fourth columnar bus) and generate an output. The third adder 136 may add the outputs of the first adder 132 and the second adder 134 to generate an output of the column.

One skilled in the art will recognize that the use of pairwise summation in the aggregator 130 may substantially reduce the round-off error in summing floating point numbers, relative to use of other aggregation techniques. For example, use of an aggregator 130 implementing pairwise summation on outputs of multiple columnar busses may improve accuracy relative to use of a singular columnar bus, where addition happens iteratively over each PE within the column.

Figure 1C:
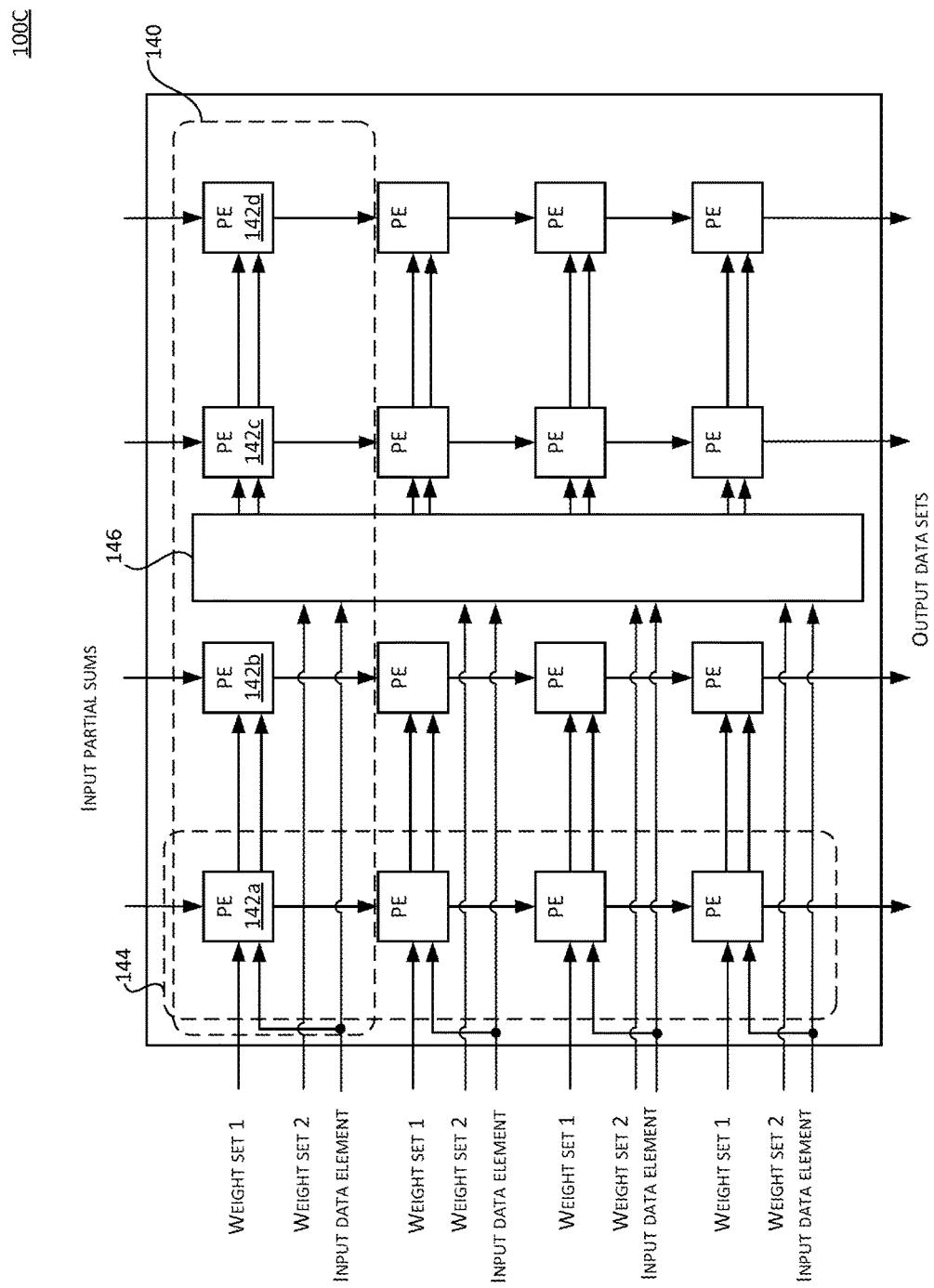
FIG. 1C illustrates an example 4×4 systolic array.
Figure 1D:
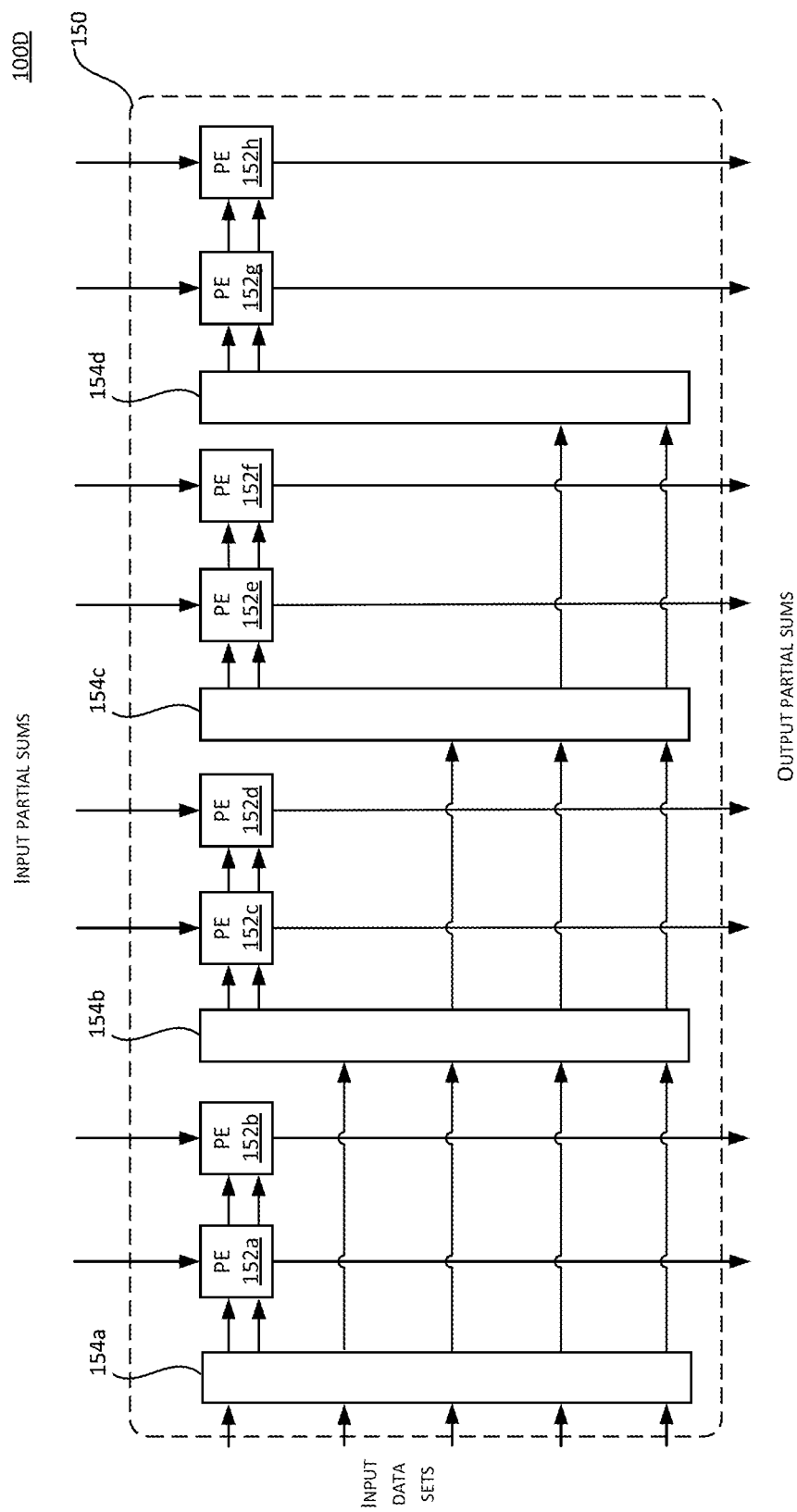
FIG. 1D illustrates an example 8×1 row of a systolic array.
Figure 1E:
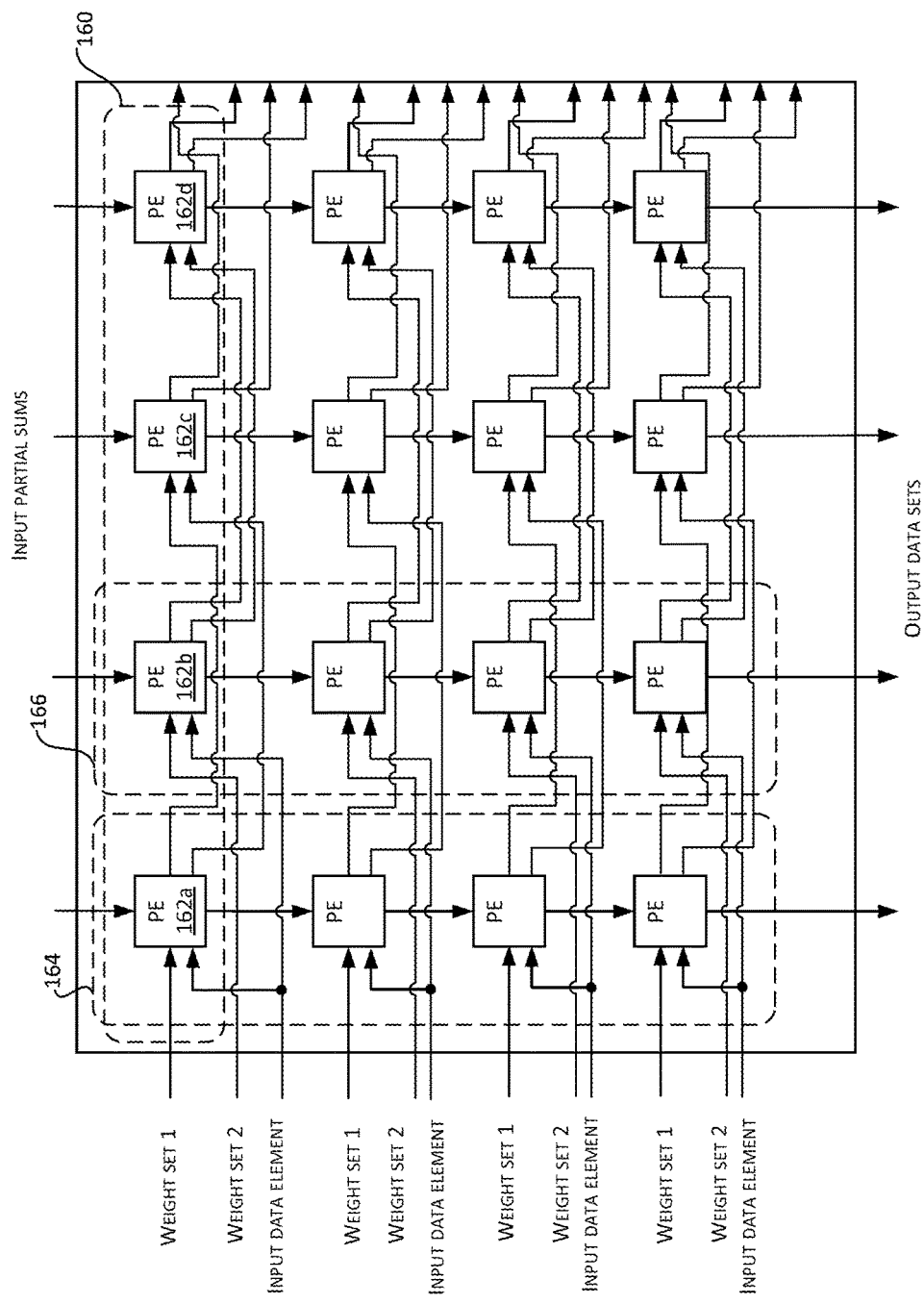
FIG. 1E illustrates an example 4×4 systolic array.
Figure 1F:
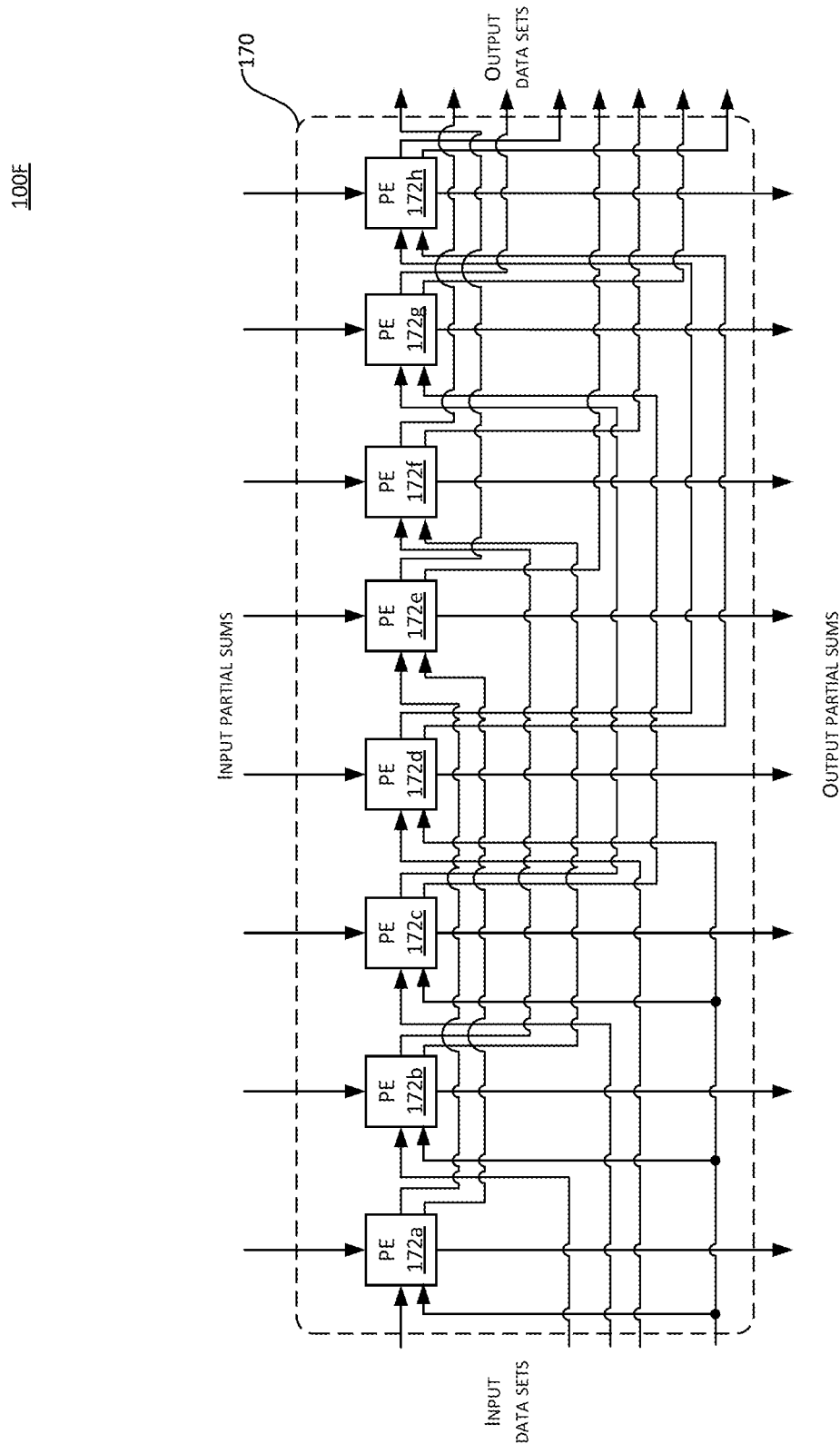
FIG. 1F illustrates an example 8×1 row of a systolic array.
Figure 1G:
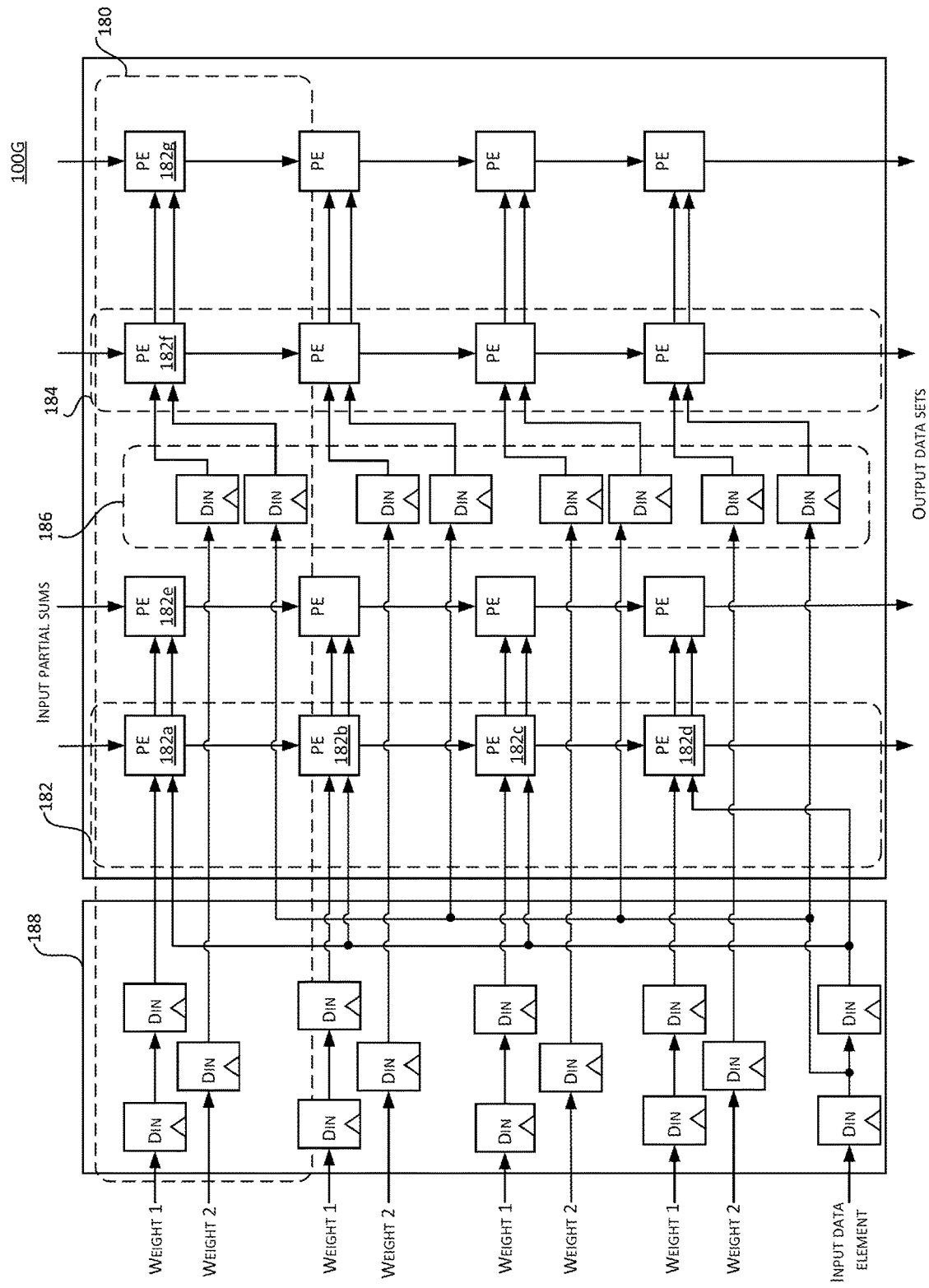
FIG. 1G illustrates an example 4×4 systolic array.
Figure 1H:
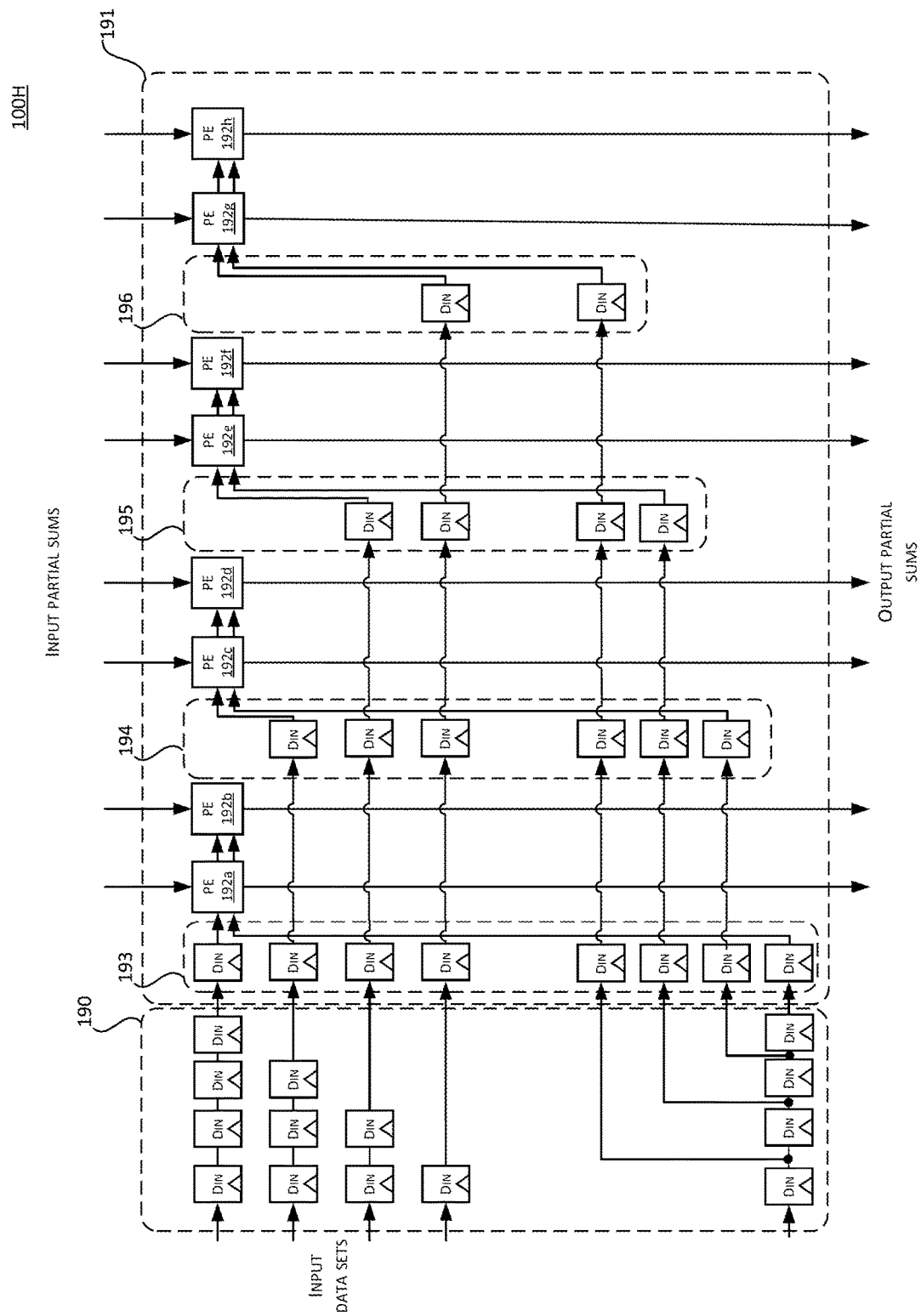
FIG. 1H illustrates an example 8×1 row of a systolic array.
Figure 1I:
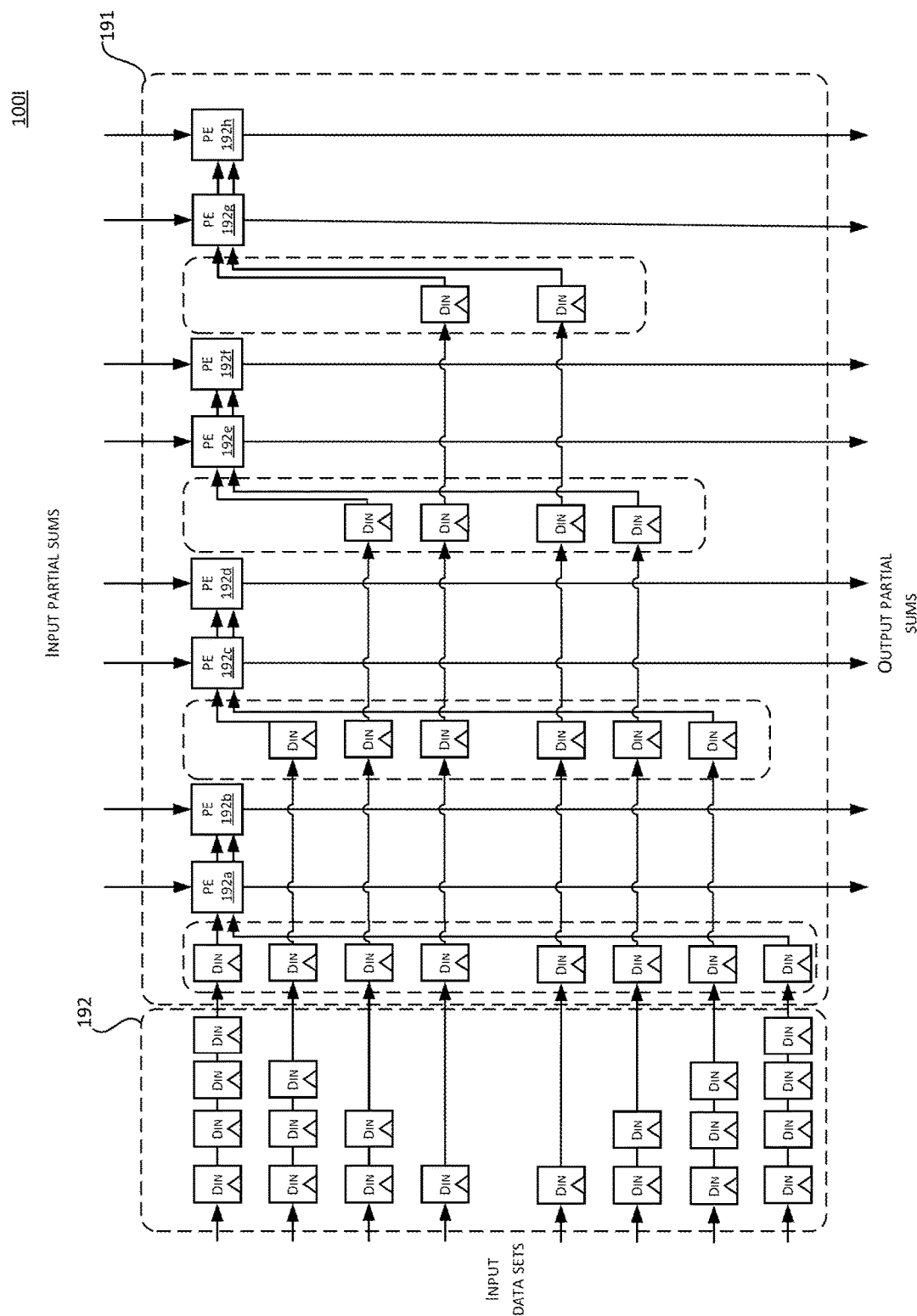
FIG. 1I illustrates an example 8×1 row of a systolic array.

While an aggregator 130 providing pairwise summation is shown in FIG. 1*i*, the aggregator 130 may alternatively implement other aggregation techniques. In some implementations, the column 120 of the PEs may not include an aggregator 130 and may provide an output data set consisting of partial sums generated by each columnar bus of the column 120. In one implementation, the aggregator may be configured to provide multiple output data sets. The multiple output data sets may each correspond to a partial sum generated by each columnar bus of the column 120. For example, if the column includes four columnar busses, the aggregator 130 may provide four output data sets, each output data set corresponding to a partial sum of a columnar bus. In another implementation, the aggregator 130 may be configured to provide more or less output data sets. The aggregator 130 may provide one or more output data sets each corresponding to one or more partial sums. For example, if the column includes four columnar busses, the aggregator 130 may provide two output data sets, a first output data set corresponding to the first two columnar busses and a second output data set corresponding to the second two columnar busses. In some instances, output of the aggregator 130 may be configurable according to a desired use of the array, and may therefore accept instructions as to what outputs should be provided. For example, a compiler may include instructions for the aggregator 130 to output the four inputs to the adders 132 and 134, the two outputs of those adders (which represent the input of adder 136, or the output of adder 136. In some instances, the aggregator 130 may provide a combination of the above outputs (e.g., by providing the four partial sums corresponding to each bus, as well as a final sum for the column).

To better illustrate operation of a systolic array utilizing multiple columnar busses, FIG. 7A-7G illustrates an example four PE column 700 of a systolic array for neural network computations processing multiply-accumulate operations over systolic intervals 0 through 6 according to certain examples of the disclosed technologies. The PE column 700 may be part of a systolic array similar to the systolic array 100A in FIG. 1A, which may extend for any plurality of rows and plurality of columns.

The PE column 700 includes four PEs labeled as PE00, PE10, PE20, and PE30 according to their row and column (RC) number. In the example of FIGS. 7A-7G, the column 700 includes two columnar busses: a first implemented by PEs of the $0^{th}$ and even-numbered rows (e.g., PE00, 20, etc.) and a second implemented by PEs of odd-numbered rows (e.g., PE10, 30, etc.). Other numbers of columnar busses may be implemented. Each PE illustratively includes a multiplier with a single systolic interval latency (e.g., inputs provided at interval n are provided as outputs at interval n+1) and an adder with a two-interval latency (e.g., inputs provided at interval n are provided as outputs at interval n+2). Adders with other latencies, including latencies that differ in number from the number of columnar busses, may be implemented. As shown in FIGS. 7A-7F, each PE of the PE column 700 respectively includes a data register Data RegRC for receiving an input data element, a weight storing register WRC, a multiplier represented by an "X", and an adder or accumulator represented by a "+".

Values provided as input partial sums at systolic intervals 0-6 are shown along the top, with PE00 receiving values A1 and A2 at the illustrated times and PE10 receiving values B1 and B2 at the illustrated times. (While values A1, A2, B1, and B2 are shown for illustrative purposes, in some instances all partial input sums fed to a top row of an array may be set to the same value, which may be zero). Values provided as input data elements at systolic intervals 0-6 are shown along the left column, with PE00 in row 0 receiving values C1 and C2 at the illustrated times, PE10 in row 1 receiving values D1 and D2 at the illustrated times, PE20 in row 2 receiving values E1 and E2 at the illustrated times, and PE30 in row 3 receiving values F1 and F2 at the illustrated times. When no value is illustrated, a zero or NOP can be assumed. Where indicated, the system is initialized with zero values for clarity and to facilitate understanding. However, other examples can occur at different states and/or with other internal values. Other example configurations for individual PEs may include technology discussed with respect to FIG. 2 and FIG. 10.

FIG. 7A-7G show the progression of data as multiply-accumulate operations are performed. The multiply-accumulate operations across the shown intervals include (as discussed in more detail below): multiplying weight W00 by input data element C1 and accumulating input partial sum A1; multiplying W00 by input data element C2 and accumulating input partial sum A2; multiplying weight W10 by input data element D1 and accumulating input partial sum B1; multiplying W10 by input data element D2 and accumulating input partial sum B2; multiplying weight W20 by input data element E1 and accumulating a first input partial sum from PE00; multiplying W20 by input data element E2 and accumulating a second input partial sum from PE00; multiplying weight W30 by input data element F1 and accumulating a first input partial sum from PE10; and multiplying W30 by input data element F2 and accumulating a second input partial sum from PE10. The technology disclosed herein can extend to additional sequences of input data elements and input partial sums.

Figure 7A:
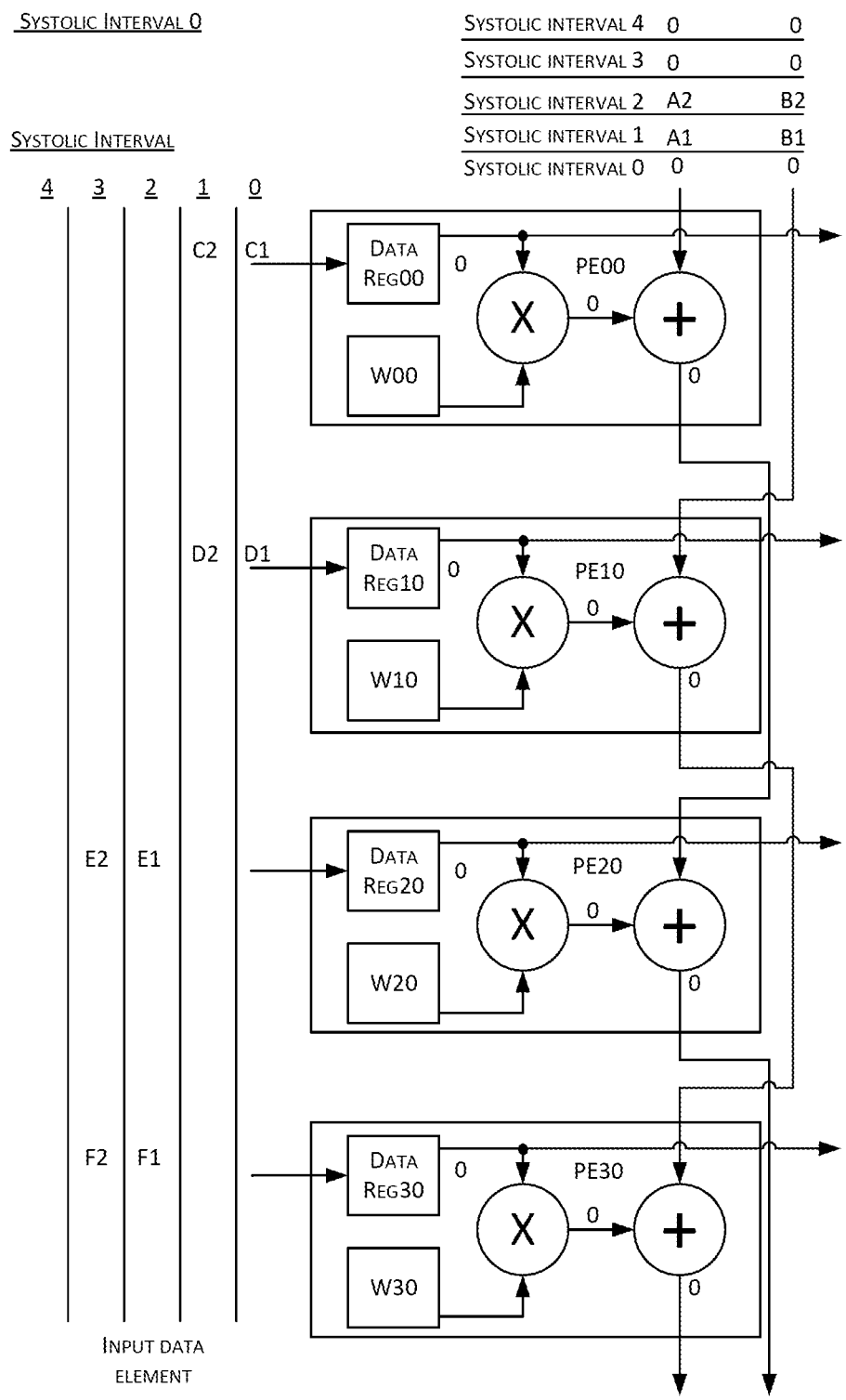
FIG. 7A-7G shows an example systolic array processing data over a sequence of systolic intervals.

FIG. 7A shows the state of the PE column 700 at systolic interval 0. The weights W00, W10, W20, and W30 are pre-loaded. In PE00, an input data element C1 is received for writing to and storing in Data Reg00 for use during the next systolic interval. In PE10, an input data element D1 is received for writing to and storing in Data Reg10 for use during the next systolic interval. All other inputs and other states are initialized to zero. While FIG. 7A shows the first input data set to each columnar bus being loaded in the same systolic interval, embodiments of the present disclosure may alternatively load the first input data set to a second or later bus on a second or later interval.

Figure 7B:
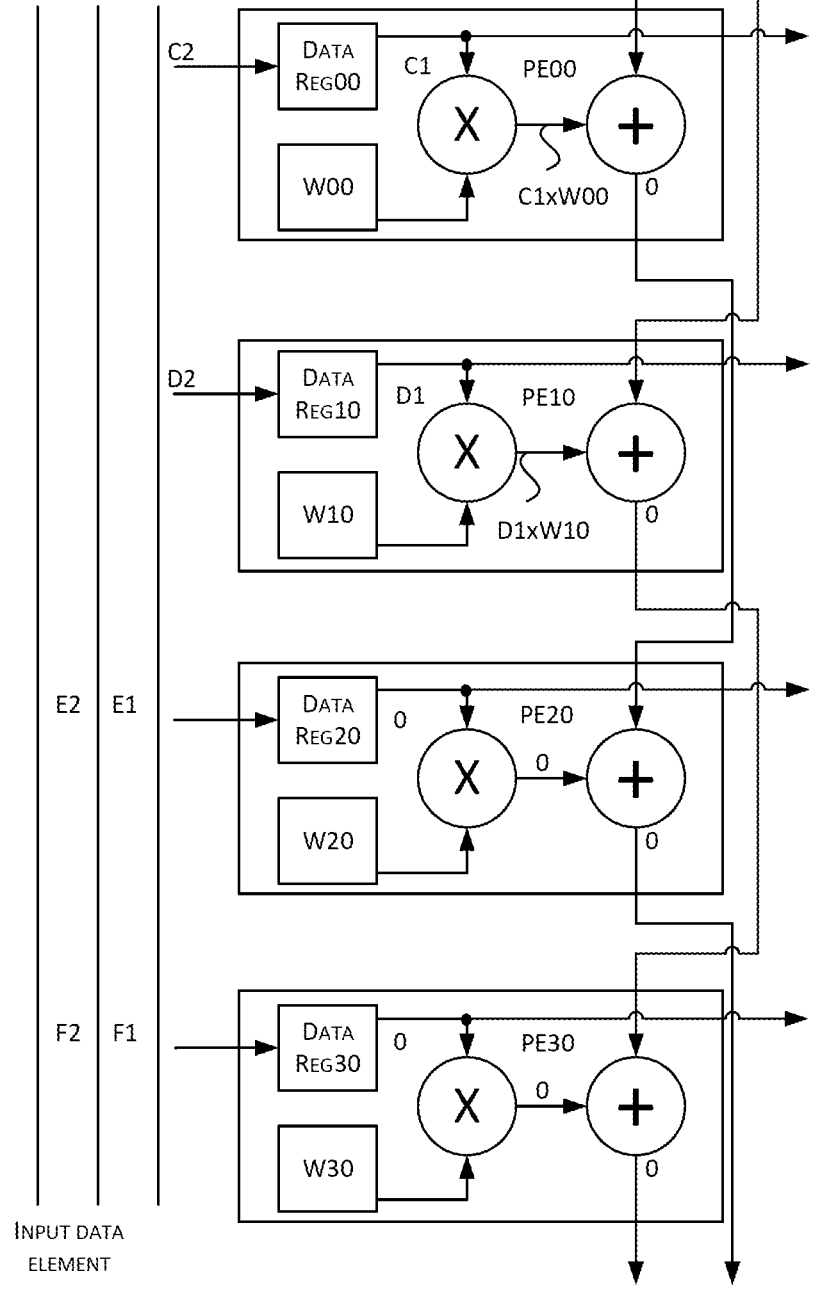

FIG. 7B shows the state of the PE column 700 at systolic interval 1. In PE00, an input data element C2 is received for writing to and storing in Data Reg00 for use during the next systolic interval. The stored input data element C1 is read from Data Reg00 and provided as an input to both the multiplier of PE00 and a data register of a PE in a subsequent column. The multiplier in PE00 multiplies C1 by W00 to generate a multiplication result C1×W00, which is provided to an adder for PE00. The input partial sum A1 is also received at the adder for PE00. Each adder is pipelined with a latency of 2 intervals, and as such processes the respective input partial sum and the respective multiplication result during a time period corresponding to the latency (e.g., the subsequent 2 intervals).

In PE10, an input data element D2 is received for writing to and storing in Data Reg10 for use during the next systolic interval. The stored input data element D1 is read from Data Reg10 and provided as an input to both the multiplier of PE10 and a data register of a PE in a subsequent column. The multiplier in PE10 multiplies D1 by W10 to generate a multiplication result D1×W10, which is provided to an adder for PE10 for use in an adder operation. The input partial sum B1 is also provided to the adder for PE10 for use in the adder operation.

Figure 7C:
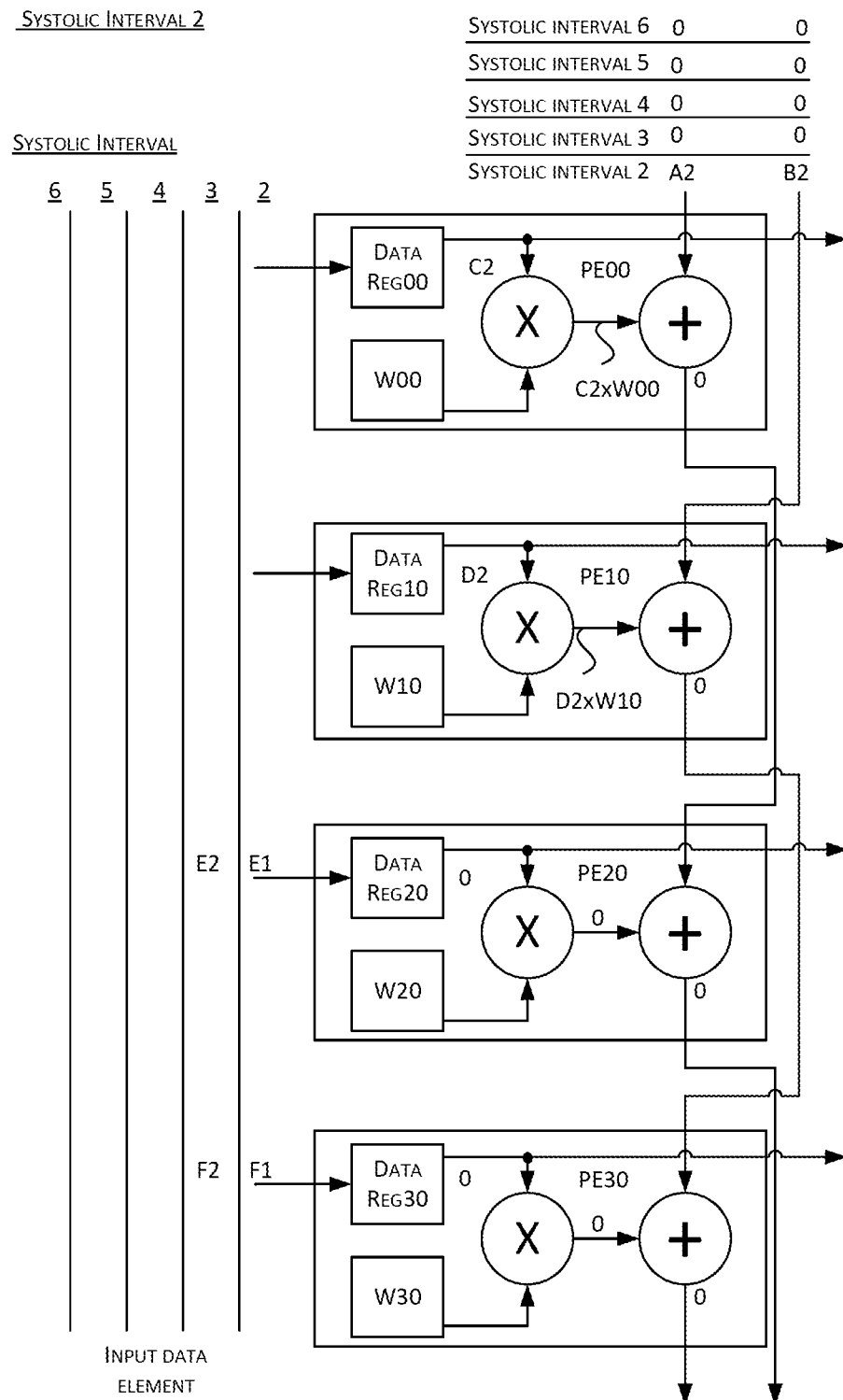

FIG. 7C shows the state of the PE column 700 at systolic interval 2. In PE00, the input data element C2 is read from Data Reg00 and provided as an input to both the multiplier of PE00 and a data register of a PE in a subsequent column. The multiplier in PE00 multiplies C2 by W00 to generate a multiplication result C2×W00, which is provided to the adder for PE00 for use in an adder operation. The input partial sum A2 is also received at the adder for PE00 for use in the later operation. Note that during systolic interval 2, the adder of PE00 continues to conduct an add operation between the multiplication result C1×W00 and the input partial sum A1, as obtained during interval 1.

In PE10, the input data element D2 is read from Data Reg10 and provided as an input to both the multiplier of PE10 and a data register of a PE in a subsequent column. The multiplier in PE10 multiplies D2 by W10 to generate a multiplication result D2×W10, which is provided to the adder for PE10 for use in an adder operation. The input partial sum B2 is also received at the adder for PE10 for use in the adder operation. Note that during systolic interval 2, the adder of PE10 continues to conduct an add operation between the multiplication result D1×W10 and the input partial sum B1, as obtained during interval 1.

In PE20, an input data element E1 is received for writing to and storing in Data Reg20 for use during the next systolic interval.

In PE30, an input data element F1 is received for writing to and storing in Data Reg30 for use during the next systolic interval.

Figure 7D:
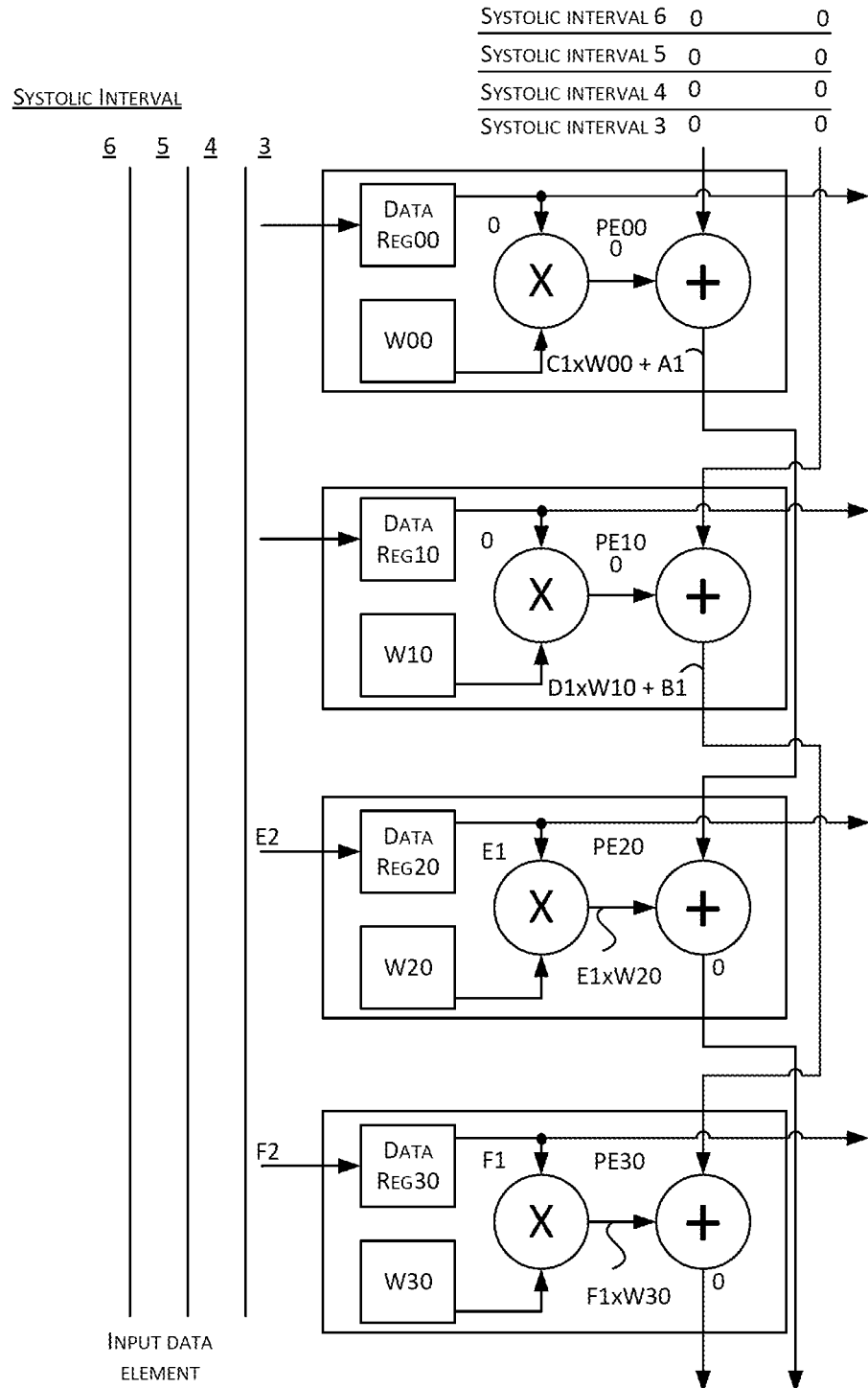

FIG. 7D shows the state of the PE column 700 at systolic interval 3. In PE00, the adder completes the addition of A1 and C1×W00 and generates an addition result, A1+C1×W00. The addition result, A1+C1×W00, is communicated to PE20, skipping row PE10 based on the column including two busses, as an input partial sum. The additional result of a PE within a given column can generally be referred to herein as a "partial sum" for the column, or simply a "columnar partial sum." As data flows between PEs coupled to a columnar bus, this columnar partial sum may be updated to reflect the set of operations performed on the columnar partial sum (e.g., the addition to the columnar partial sum of an output of a multiplier of the PE). A final PE of a columnar bus may then output the final "partial sum" for the columnar bus, which when combined with partial sums for other columnar busses, represents a final sum for the column. Note that during systolic interval 3, the adder of PE00 continues to conduct an add operation between the multiplication result C2×W00 and the input partial sum A2, as obtained during interval 2.

In PE10, the adder completes the addition of B1 and D1×W10 and generates an addition result, B1+D1×W10. The addition result, B1+D1×W10, is communicated to PE30, skipping row PE20 based on the column including two busses, as an input partial sum. Note that during systolic interval 3, the adder of PE10 continues to conduct an add operation between the multiplication result D2×W10 and the input partial sum B2, as obtained during interval 2.

In PE20, an input data element E2 is received for writing to and storing in Data Reg20 for use during the next systolic interval. The stored input data element E1 is read from Data Reg20 and provided as an input to both the multiplier of PE20 and a data register of a PE in a subsequent column. The multiplier in PE20 multiplies E1 by W20 to generate a multiplication result E1×W20, which is provided to the adder for PE20 for use in an adder operation. The input partial sum, C1×W00+A1, is received from PE00 and is also provided to the adder for PE20 for use in the adder operation.

In PE30, an input data element F2 is received for writing to and storing in Data Reg30 for use during the next systolic interval. The stored input data element F1 is read from Data Reg30 and provided as an input to both the multiplier of PE30 and a data register of a PE in a subsequent column. The multiplier in PE30 multiplies F1 by W30 to generate a multiplication result F1×W30, which is provided to the adder for PE30 for use in an adder operation. The input partial sum, D1×W00+B1, is received from PE10 and also provided to the adder for PE30 for use in the adder operation.

Figure 7E:
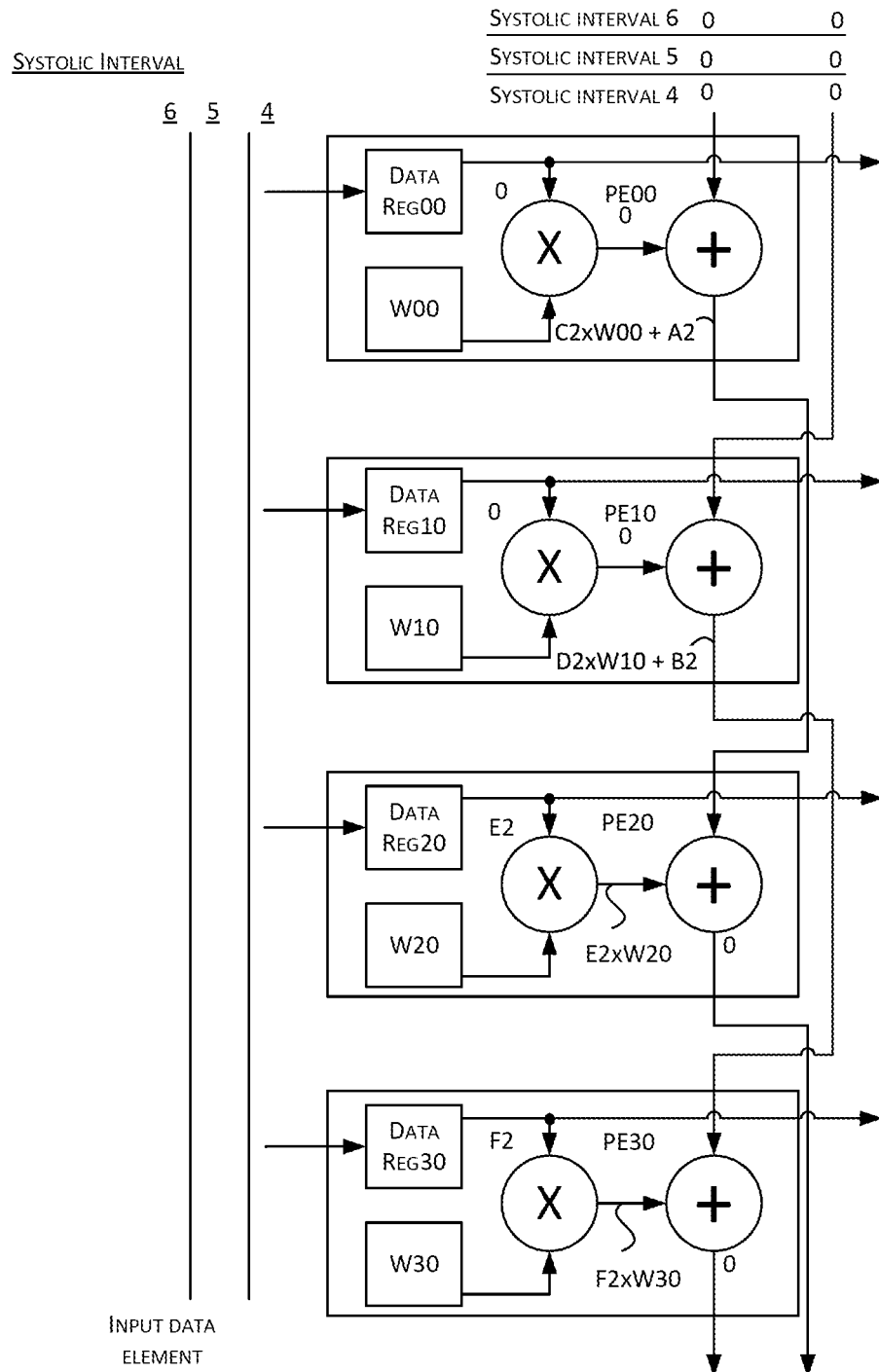

FIG. 7E shows the state of the PE column 700 at systolic interval 4. In PE00, the adder completes the addition of A2 and C2×W00 and generates an addition result, A2+C2×W00. The addition result, A2+C2×W00, is communicated to PE20, skipping row PE10 based on the column including two busses, as an input partial sum.

In PE10, the adder completes the addition of B2 and D2×W10 and generates an addition result, B2+D2×W10. The addition result, B2+D2×W10, is communicated to PE30, skipping row PE20 based on the column including two busses, as an input partial sum.

In PE20, the stored input data element E2 is read from Data Reg20 and provided as an input to both the multiplier of PE20 and a data register of a PE in a subsequent column. The multiplier in PE20 multiplies E2 by W20 to generate a multiplication result E2×W20, which is provided the adder for PE20 for use in an adder operation. The input partial sum, C2×W00+A2, is received from PE00 and is also provided to the adder for PE20 for use in the adder operation. Note that during systolic interval 4, the adder of PE20 continues to conduct an add operation between the multiplication result E1×W20 and the input partial sum C1×W00+A1, as obtained during interval 3.

In PE30, the stored input data element F2 is read from Data Reg30 and provided as an input to both the multiplier of PE30 and a data register of a PE in a subsequent column. The multiplier in PE30 multiplies F2 by W30 to generate a multiplication result F2×W30, which is stored in an adder for PE30 for use in a later adder operation. The input partial sum, D2×W00+B2, is received from PE10 and stored in the adder for PE30 for use in the later adder operation. Note that during systolic interval 4, the adder of PE30 continues to conduct an add operation between the multiplication result F1×W30 and the input partial sum D1×W00+B1, as obtained during interval 3.

Figure 7F:
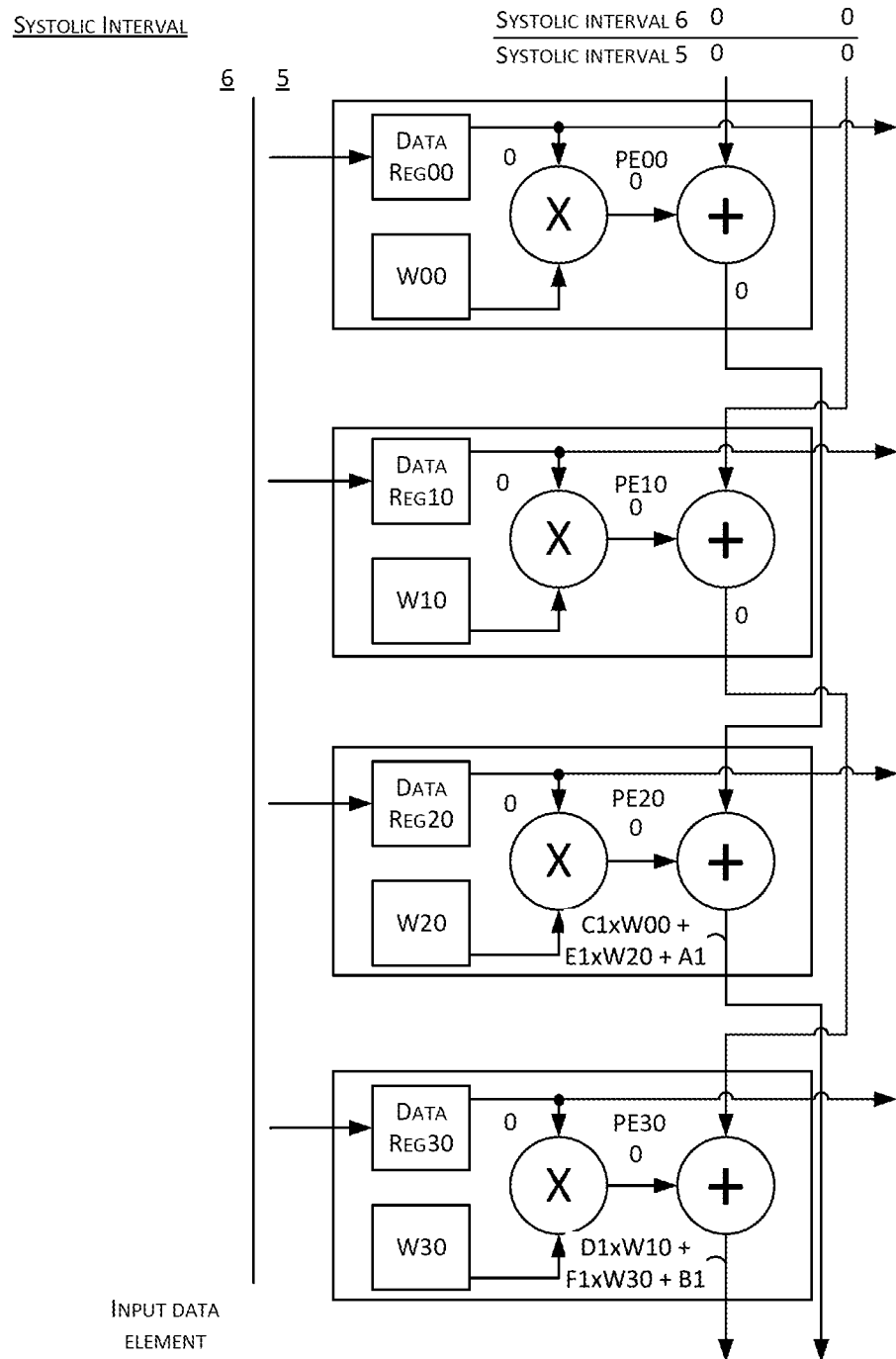

FIG. 7F shows the state of the PE column 700 at systolic interval 5. In PE20, the adder completes the addition of E1×W20 with C1×W00+A1 and generates an addition result, E1×W20+A1+C1×W00. The addition result, E1×W20+A1+C1×W00, is communicated to a later PE, skipping one row based on the column including two busses, as an input partial sum. In one embodiment, the addition result can be communicated to an aggregator or as an output partial sum. Note that during systolic interval 5, the adder of PE20 continues to conduct an add operation between the multiplication result E2×W20 and the input partial sum C2×W00+A2, as obtained during interval 4.

In PE10, the adder completes the addition of F1×W30 and D1×W10+B1 and generates an addition result, F1×W30+B1+D1×W10. The addition result, F1×W30+B1+D1×W10, is communicated to a later PE, skipping one row based on the column including two busses, as an input partial sum. In one embodiment, the addition result can be communicated to an aggregator or as an output partial sum. Note that during systolic interval 5, the adder of PE30 continues to conduct an add operation between the multiplication result F2×W30 and the input partial sum D2×W00+B2, as obtained during interval 4.

Figure 7G:
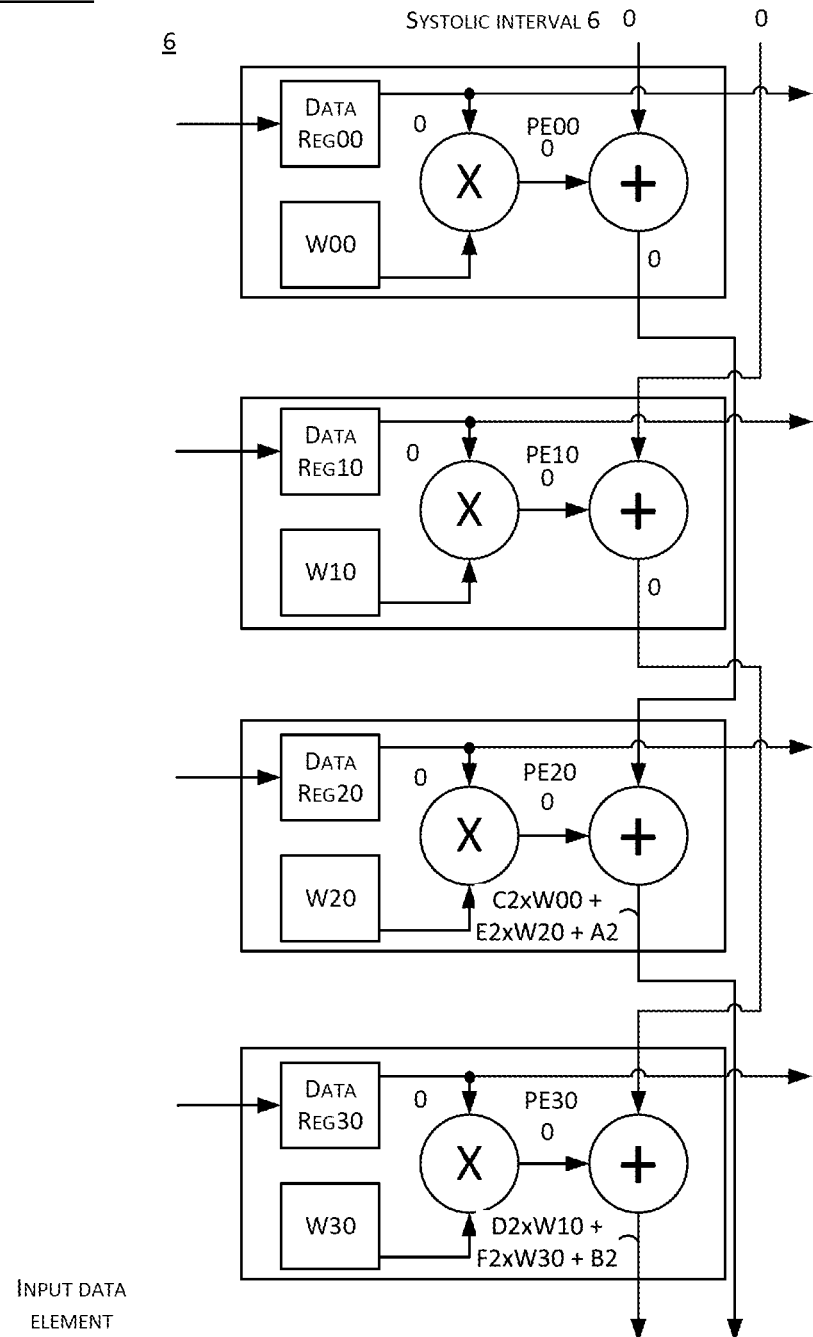

FIG. 7G shows the state of the PE column 700 at systolic interval 6. In PE20, the adder completes the addition of E2×W20 and C2×W00+A2 and generates an addition result, E2×W20+A2+C2×W00. The addition result, E2×W20+A2+C2×W00, is communicated to a later PE, skipping one row based on the column including two busses, as an input partial sum. In one embodiment, the addition result can be communicated to an aggregator or as an output partial sum.

In PE30, the adder completes the addition of F2×W30 and D2×W10+B2 and generates an addition result, F2×W30+B2+D2×W10. The addition result, F2×W30+B2+D2×W10, is communicated to a later PE, skipping one row based on the column including two busses, as an input partial sum. In one embodiment, the addition result can be communicated to an aggregator or as an output partial sum.

The examples states of data flow illustrated in FIG. 7A-7G can be performed for one or more starting input data elements and for any number of starting input partial sums. The number of columns, rows, and columnar busses can continue for any plurality of columns, rows, and columnar busses. The individual PE's can implement further technology such as illustrated and discussed with FIG. 2, FIG. 6A, FIG. 6B, and FIG. 6C, including technology for energy saving.

FIG. 1C illustrates an example configuration of a 4×4 systolic array. The array 100C may be similar to the array 100A of FIG. 1A and similarly includes four rows and four columns (e.g., a first row 140 and a first column 144). However, the systolic array 100C includes multiple row-oriented busses for each row of the systolic array 100C. Further, the systolic array 100C is configured according to a grouped approach, where each group of the grouped approach corresponds to a sub-array of the array and/or a row-oriented bus.

Figure 3A:
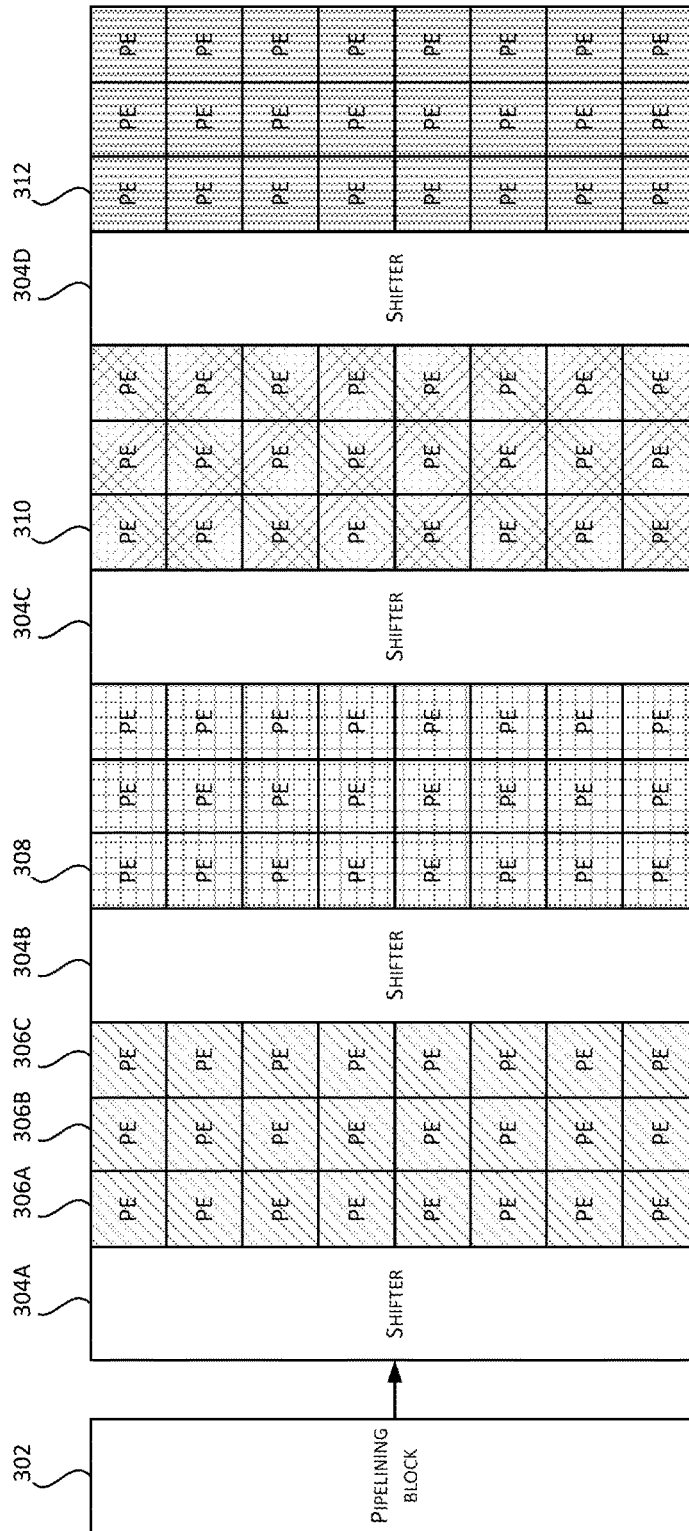
FIG. 3A illustrates an example systolic array, according to certain examples of the disclosed technologies.

FIG. 3A illustrates an example configuration of a systolic array configured according to the grouped approach. A systolic array includes a number of PEs and a number of row-oriented busses in each row. Further, the array is divided into a plurality of sub-arrays where the number of sub-arrays is equal to the number of PEs in a row of the systolic array divided by the number of row-oriented busses. In the example of FIG. 3A, the array 300A includes 12 PEs in each row and 4 row-oriented busses in each row and therefore each sub-array includes 3 PEs. In the array 300A, columns 306A, 306B, and 306C correspond to one sub-array. Further, columns 308, 310, and 312 further correspond to a first column of a respective sub-array of the array 300A. Each sub-array is configured to perform operations on an input of a different row-oriented bus as shifters are configured to shift a new bus to the active bus for each sub-array. In the example of FIG. 3A, the first shifter 304A shifts a first row-oriented bus to the active bus for the sub-array including column 306A, the shifter 304B shifts a second row-oriented bus to the active bus for the sub-array including column 308, the third shifter 304C shifts a third row-oriented bus to the active bus for the sub-array including column 310, and the fourth shifter 304D shifts a fourth row-oriented bus to the active bus for the sub-array including column 312. Each sub-array may correspond to a different row-oriented bus of the row. In other embodiments, a number of consecutive sub-arrays may correspond to the same row-oriented bus of the row. The array 300A may further include a pipelining block 302 configured to store the inputs for the array 300A prior to providing the inputs to the array 300A.

With further reference to FIG. 1C, the systolic array 100C is divided into a number of sub-arrays. Specifically, as shown in FIG. 1C, each PE within a first set of PEs (e.g., PEs 142a, 142c) of a first row 140 of the array 100C provides a weight and an input data element to an adjacent PE of a second set of PEs (e.g., PEs 142b, 142d) of the first row 140 of the array 100c thus forming two sub-arrays. In some embodiments, the systolic array may include multiple row-oriented busses configured to provide input data elements and/or weights. The systolic array 100C may include a number of row-oriented busses where each sub-array is connected to a row-oriented bus to provide a weight and a row-oriented bus to provide an input data element. In some embodiments, each sub-array may be connected to the same row-oriented bus. For example, as shown in FIG. 1C, each sub-array may be connected to a distinct row-oriented bus to provide a weight and a row-oriented bus that provides an input data element to each sub-array. Further, though not shown in FIG. 1C, each sub-array may be connected to a distinct row-oriented bus to provide an input data element and a row-oriented bus that provides a weight to each sub-array. Though not shown in FIG. 1C, each PE within the second set of PEs may provide a weight and an input data element as an output data set. In some embodiments, the systolic array may include an additional set of PEs (e.g., a fifth and sixth PE of each row) and may include a third row-oriented bus to provide each PE within the third set of PEs a weight (not shown in FIG. 1C). Further, each PE may perform mathematical operations on the input data element and the weight. By varying the number of PEs in a set, the path-length of the row-oriented busses may be varied. Each row of an array may be constructed with any number of row-oriented busses and any length of row-oriented bus.

As shown in FIG. 1C, a first PE (e.g., PE 142a) of the first sub-array (e.g., PEs 142a, 142b) is provided an input data element and a first weight at a first time and passes the input data element and the first weight to a second PE (e.g., PE 142b) of the first sub-array. Further, at a subsequent time, a first PE (e.g., PE 142c) of the second sub-array (e.g., PEs 142c, 142d) is provided the input data element and a second weight and passes the input data element and a second weight to a second PE (e.g., PE 142d) of the second sub-array. As shown in FIG. 1C, each PE of a given row is provided the same input data element as each other PE of the given row. In one implementation, a given row may be provided multiple input data elements (e.g., a first input data element may be provided to the first row-oriented bus, a second input data element may be provided to the second row-oriented bus). In such implementation, each PE of a given row may be provided the same weight as each other PE of a given row.

To facilitate passing the weights and input data elements to subsequent PEs of the systolic array 100C, the systolic array 100C in FIG. 1C includes a shifter 146 (e.g., a shifting element, a switching element, etc.). The shifter 146 may be configured to shift one or more row-oriented busses to one or more active busses for a subsequent sub-array. In the example of FIG. 1C, weight set 1 and the input data element are provided to the active busses (i.e., the active bus positions) of the first sub-array and the shifter 146 shifts the weight set 2 and the input data element to the active busses for the second sub-array. In some embodiments, the shifter 146 may include one or more pipelining registers configured to store a weight and input data element for the second sub-array for a set of systolic intervals before providing the weight and input data element to a PE of the second sub-array (e.g., PEs 142c, 142d). In one example, the weight set 1 corresponding to a first row-oriented bus may be provided to PE 142a during a first systolic interval and the weight set 2 corresponding to a second row-oriented bus may be provided to a pipelining register during the first systolic interval. Further, the input data element corresponding to a third row-oriented bus may be provided to PE 142a and a pipelining register during a first systolic interval. Further, during a second systolic interval, the pipelining register may provide the input data element to PE 142c and PE 142a may provide the input data element to PE 142b. During a third systolic interval, the PE 142c may provide the input data element to PE 142d. By varying the number of row-oriented busses, the number of pipelining registers may be varied. Thus the shifter 146 may include any number of pipelining registers. In some embodiments, the first row-oriented bus (e.g., weight set 1) may not be provided to the shifter 146. In other embodiments, the weight corresponding to the first row-oriented bus (e.g., PEs 142a, 142b) may be stored by the shifter 146 for a series of systolic intervals.

FIG. 1D illustrates an example eight-PE-row 150 of a systolic array 100D. The row 150 may be similar to a row of the array 100C of FIG. 1C and illustratively includes eight columns and one row. However, the row 150 further includes a greater number of row-oriented busses and corresponding shifters configured in a grouped approach. Specifically, as shown in FIG. 1D, the row 150 includes five row-oriented busses, the first four row-oriented busses are configured to provide weights to the row 150, and the last row-oriented bus is configured to provide an input data element to the row 150. Further, the row 150 is divided into four sub-arrays based at least in part on the four row-oriented busses configured to provide weights to the row 150. In one implementation, multiple row-oriented busses may provide multiple input data elements to the row 150 and one row-oriented bus is configured to provide a weight to the row 150. In the example of FIG. 1D, each row-oriented bus is connected to (e.g., implemented as, includes, is configured as) two PEs. In other embodiments, each row-oriented bus can be configured to include any number of PEs.

The row 150 further includes a plurality of shifters that separate each of the sub-arrays of the array. A first shifter 154a provides inputs to a first sub-array (e.g., PEs 152a, 152b), a second shifter 154b provides inputs to a second sub-array (e.g., PEs 152c, 152d), a third shifter 154c provides inputs to a third sub-array (e.g., PEs 152e, 152f), and a fourth shifter 154d provides inputs to a fourth sub-array (e.g., PEs 152g, 152h). Each shifter may be configured to shift a row-oriented bus into the active bus position. In the example of FIG. 1D, the topmost (i.e., first) position is considered the active bus position. Further, each shifter may be configured to shift the row-oriented bus corresponding to the input data element into a second active bus position. The first shifter 154a shifts the first and fifth row-oriented busses into active bus positions for the first sub-array, the second shifter 154b shifts the second and fifth row-oriented busses into active bus positions for the second sub-array, the third shifter 154c shifts the third and fifth row-oriented busses into active bus positions for the third sub-array, and the fourth shifter 154d shifts the fourth and fifth row-oriented busses into active bus positions for the fourth sub-array. Each shifter may be configured to receive n row-oriented busses, provide two row-oriented busses to a sub-array, and provide n−1 row-oriented busses to a subsequent shifter. For example, the first shifter 154a receives five row-oriented busses and provides four row-oriented busses to the second shifter 154b which then provides three row-oriented busses to the third shifter 154c which then provides two row-oriented busses to the fourth shifter 154d.

Each row-oriented bus may include any number of PEs. Each of the PEs for a given row-oriented bus may be provided a corresponding weight and input data element. In some embodiments, the last PE (e.g., the rightmost PE) of a given set of PEs may provide the weight and input data element as an output data set. The row can further provide a number of output data sets equal to the number of row-oriented busses. In some embodiments, the input data element may be provided as multiple output data sets equal to the number of row-oriented busses.

FIG. 1E illustrates an example configuration of a 4×4 systolic array. The array 100E may be similar to the array 100C of FIG. 1C and similarly includes four rows and four columns. Further, each row of the array 100E includes multiple row-oriented busses as in FIG. 1C. However, the systolic array 100E includes rows and corresponding row-oriented busses configured in an interleaved approach v. the grouped approach of FIG. 1C. In the interleaved approach of FIG. 1E, each of the row-oriented busses are interleaved within a given row of the array 100E. The systolic array may further include one or more sub-array corresponding to the multiple row-oriented busses.

Figure 3B:
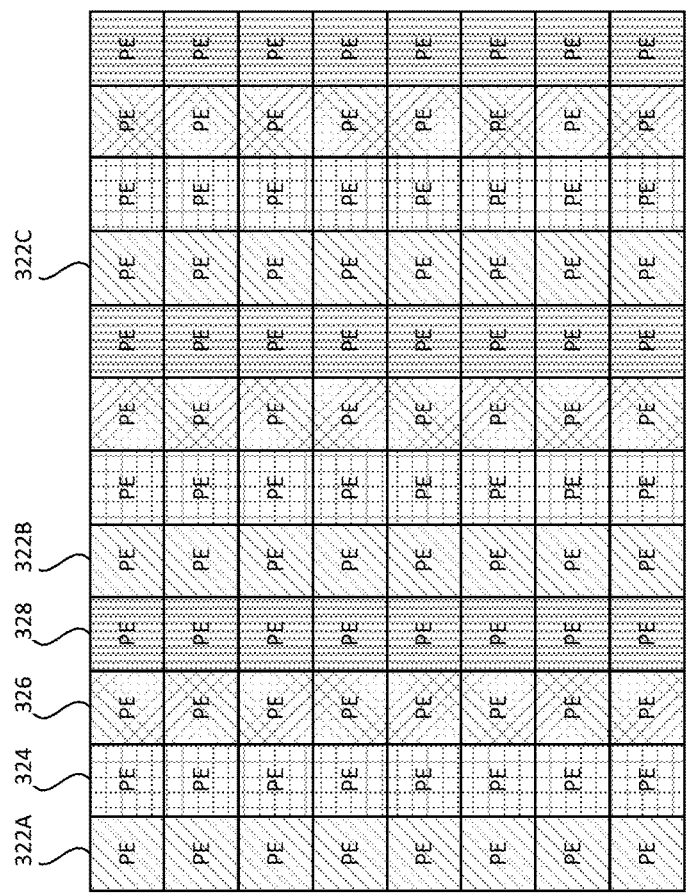
FIG. 3B illustrates an example systolic array, according to certain examples of the disclosed technologies.

FIG. 3B illustrates an example configuration of a systolic array configured according to the interleaved approach. A systolic array includes a number of PEs and a number of row-oriented busses in each row. Further, the array is divided into a plurality of sub-arrays. Each sub-array may correspond to a row-oriented bus. In the example of FIG. 3B, the array 300B includes 12 PEs in each row and 4 row-oriented busses in each row and teach sub-array includes 3 PEs. In the array 300B, columns 322A, 322B, and 322C correspond to one sub-array. Further, columns 324, 326, and 328 further correspond to a first column of a respective sub-array of the array 300A. Each sub-array comprises a series of non-adjacent PEs where a PE of the sub-array is configured to perform an operation on an input and provide the input to a subsequent, non-adjacent PE of the sub-array. Each row-oriented bus is configured to provide an input to a PE, skip n−1 PEs, and provide the input to a subsequent PEs, where n is equal to the number of row-oriented busses. Further, in the interleaved approach, the array 300B does not include shifters as seen in the grouped approach of the array 300A.

In some embodiments, a systolic array may be configured according to a combination of the grouped approach of FIG. 3A and the interleaved approach of FIG. 3B. In the combined approach, the systolic array includes a number of PEs and a number of row-oriented busses in each row. The systolic array is further divided into a number of sub-arrays. As in FIG. 3A, in the current example, a row-oriented bus may correspond to multiple adjacent PEs. However, unlike FIG. 3A and similar to FIG. 3B, the row-oriented bus, after passing the input through multiple adjacent PEs, may skip multiple PEs and provide the input to a subsequent set of PEs. Therefore, in the current example, the array retains the use of a row-oriented bus involving multiple adjacent PEs from FIG. 3A and retains the use of a row-oriented bus configured to skip one or more PEs from FIG. 3B. The array may or may not include the shifters and/or pipelining block of FIG. 3A.

With further reference to FIG. 1E, the systolic array 100E includes a plurality of PEs abutted together in the interleaved approach. Further, the systolic array 100E does not include any shifters due to being configured in the interleaved approach. Each row of the systolic array 100E includes four row-oriented busses and four corresponding sub-arrays. Specifically, a first sub-array corresponds to PEs 162a and 162c and a second sub-array corresponds to PEs 162b and 162d. Further, as shown in FIG. 1E, each PE within a first set of PEs (e.g., PEs 162a, 162b) of a first row 160 of the array 100E provides a weight and an input data element to an adjacent PE of a second set of PEs (e.g., PEs 162c, 162d) of the first row 140 of the array 100E. In the example of FIG. 1E, each row-oriented bus skips one PE before providing the weight and input data element to a subsequent PE. In other embodiments, a row-oriented bus may skip any number of PEs. Further, in contrast to FIG. 1C, the outputs of the second set of PEs (e.g., PEs 162c, 162d) are provided as output data sets which may be provided to a subsequent set of PEs. In other embodiments, the outputs of the second set of PEs may be provided as output data sets of the array 100E.

In the example of FIG. 1E, a column 164 corresponds to a first column of the first row-oriented bus and a column 166 corresponds to a first column of the second row-oriented bus. Each PE of the columns 164, 166 may receive an initial weight and input data element during an initial clock cycle before providing the weight and input data element to subsequent PEs at a subsequent clock cycle. Further, each PE performs mathematical operations on the input data element and weight and each PE may be provided the same input data element. In some embodiments, the systolic array may include multiple row-oriented busses configured to provide input data elements and/or weights. By varying the number of sets of PEs (e.g., the number of PEs in the row), the path-length of the row-oriented busses may be varied. Further, by varying the number of PEs within each set, the number of row-oriented busses is similarly varied. Thus, each row of an array may be constructed with any number of row-oriented busses and any length of row-oriented bus.

As shown in FIG. 1E, each first PE of each sub-array (e.g., PEs 162a, 162b) is provided an input data element at a first time. As shown in FIG. 1E, each PE of a given row is provided the same input data element as each other PE of the given row. In one implementation, a given row may be provided multiple input data elements (e.g., a first input data element may be provided to the first sub-array, a second input data element may be provided to the second sub-array). In such implementation, each PE of a given row may be provided the same weight as each other PE of the row.

FIG. 1F illustrates an example eight-PE-row 170 of a systolic array 100F. The row 170 may be similar to a row 150 of FIG. 1D and similarly includes eight columns and one row. However, as in FIG. 1E, the row 170 includes row-oriented busses configured in the interleaved approach and does not include shifters. Further, in contrast to the array 100E of FIG. 1E, the row 170 includes a greater number of sub-arrays, row-oriented busses, and PEs in each row. Specifically, as shown in FIG. 1F, the row 170 includes five row-oriented busses, the first four row-oriented busses are configured to provide weights to PEs of the row 170 and the last (e.g., bottom) row-oriented bus is configured to provide an input data element to PEs of the row 170. In one implementation, multiple row-oriented busses may provide multiple input data elements to the row 170 and one row-oriented bus is configured to provide a weight to the row 170. In other implementations, multiple row-oriented busses may provide multiple input data elements to the row 170 and multiple row-oriented busses may provide multiple weights to the row 170. In the example of FIG. 1F, each row-oriented bus is connected to two PEs. In other embodiments, each row-oriented bus can be configured to connect to any number of PEs.

Each of a first set of PEs (e.g., PE 172a, 172b, 172c, 172d) may receive input data sets (e.g., weights and input data elements) via respective row-oriented busses during a first time period. In other embodiments, PEs of the first set of PEs may receive input data sets during different time periods. For example, PEs 172a, 172b may receive an initial weight and an initial input data element during a first time period and PEs 172c, 172d may receive an initial weight and an initial input data element during a second time period. For further example, PE 172a may receive an initial weight and an initial input data element during a first time period, PE 172b may receive an initial weight and an initial input data element during a second time period, PE 172c may receive an initial weight and an initial input data element during a third time period, and PE 172d may receive an initial weight and an initial input data element during a fourth time period. It will be understood that PEs of each set of PEs may receive input data sets during any combination of time periods.

In the example of FIG. 1F, each row-oriented bus provides an input to a PE and skips 3 PEs before providing the input to a subsequent PE. Each of the first four PEs corresponds to a respective row-oriented bus and may receive a corresponding input data set from the row-oriented bus. Further, each of the first four PEs is connected to a second row-oriented bus and may receive a corresponding input data set from the row-oriented bus. A respective row-oriented bus may skip PEs corresponding to other row-oriented busses. Subsequently, each of a second set of PEs (e.g., PE 172e, 172f, 172g, 172h) may receive corresponding input data sets from a respective PE of the first set of PEs corresponding to a same row-oriented bus during a second time period. In other embodiments, each PE of the second set of PEs may receive input data sets during different time periods. It will be understood that the PEs of the second set of PEs may receive input data sets during any combination of time periods.

In the example of FIG. 1F, the row 170 includes a first row-oriented bus and fifth row-oriented bus connected to a PE 172a. The PE 172a is configured to perform one or more operations on the associated inputs and provide the inputs to a PE 172e at a subsequent time. The row 170 further includes a second row-oriented bus which, with the fifth row-oriented bus, is connected to a PE 172b. The PE 172b is configured to perform one or more operations on the associated inputs and provide the inputs to a PE 172f at a subsequent time. The row 170 further includes a third row-oriented bus which, with the fifth row-oriented bus, is connected to a PE 172c. The PE 172c is configured to perform one or more operations on the associated inputs and provide the inputs to a PE 172g at a subsequent time. The row 170 further includes a fourth row-oriented bus which, with the fifth row-oriented bus, is connected to a PE 172d. The PE 172d is configured to perform one or more operations on the associated inputs and provide the inputs to a PE 172h at a subsequent time.

FIG. 1G illustrates an example configuration of a 4×4 systolic array. The array 100G may be similar to the array 100C of FIG. 1C and similarly includes four rows and four columns. Further, the systolic array includes row-oriented busses configured according to the grouped approach and includes a shifter. However, the systolic array 100G also includes a pipelining block containing multiple pipelining registers and the shifter also contains multiple pipelining registers. In the example of FIG. 1G, a column 182 corresponds to a first column of a first sub-array and a column 184 corresponds to a first column of the second sub-array. Each PE of the column 182 (e.g., PEs 182a, 182b, 182c, and 182d) receives an initial weight and input data element during a first clock cycle. An initial weight and input data element for the second sub-array is provided to a shifter 186 prior to being provided to a PE of the second sub-array. The shifter 186 may contain a plurality of pipelining registers configured to store the weight and input data element for one or more clock cycles. The shifter 186 may shift one or more row-oriented busses to one or more active busses and store the corresponding inputs for one or more clock cycles.

FIG. 1G further includes a pipelining block 188 that includes a plurality of pipelining registers. Each of the pipelining registers may store a respective input data element or weight for one or more clock cycles. In the example of FIG. 1G, the pipelining registers of the pipelining block 188 are oriented in rows (e.g., pipelining busses) corresponding to the row-oriented busses where each row-oriented bus of each row of the systolic array corresponds to a row of the pipelining block 188. In other embodiments, the pipelining block may include any number of rows of pipelining registers and any number of pipelining registers. The number of rows of pipelining registers may be based on a number of sub-arrays in each row. In some embodiments, a row of pipelining registers may correspond to each sub-array of a row. The number of pipelining registers in the pipelining block 188 can be based on the number of sub-arrays in a given row. Further, the number of pipelining registers included in the pipelining block 188 for a given row-oriented bus corresponds to the position of the corresponding sub-array. For example, in the example of FIG. 1G, in a row 180, a weight 1 corresponds to a first row-oriented bus and is provided to two pipelining registers, a weight 2 corresponds to a second row-oriented bus and is provided to one pipelining register. In other embodiments, each row of the pipelining block 188 includes at least n pipelining registers, where n can be any number. A row-oriented bus in a first position may correspond to m+n pipelining registers, a row-oriented bus in a second position may correspond to m+n−1 pipelining registers, and a row-oriented bus in a last position may correspond to n+1 pipelining registers, where n can be any number and m can correspond to the number of sub-arrays in the row. In other embodiments, each row of the pipelining block 188 includes the same number of pipelining registers. For example, each row of the pipelining block 188 for a row of the systolic array may include n pipelining registers, where n can be any number.

The number of pipelining registers on a row-oriented bus in the pipelining block 188 that corresponds to each sub-array of a row may be based on the number of sub-arrays in a row of the systolic array. The row-oriented bus may correspond to a weight or an input data element. The number of pipelining registers that a given input may be provided to may correspond to the sub-array that the input data element is provided to. In a system with n sub-arrays, the input may be provided to n pipelining registers of the pipelining block 188 and then provided to the first sub-array, the input may be provided to n−1 pipelining registers and then provided to the second sub-array, and the input data element may be provided to n−m pipelining registers and then provided to a (m+1)th sub-array where m is any number. In the example of FIG. 1G, the systolic array 100G includes four rows and each row includes two row-oriented busses to provide weights and a third row-oriented bus to provide an input data element. The input data element may be provided to a first and a second pipelining register and then provided to the first sub-array and the input data element may be provided to the first pipelining register and then provided to the second sub-array.

The plurality of pipelining registers within the shifter 186 may be configured to "balance" the number of clock cycles that inputs of each row-oriented bus are stored. For example, if a first sub-array corresponds to two pipelining registers of the pipelining block 188 and a second sub-array corresponds to one pipelining register of the pipelining block 188, the shifter 186 may provide an additional pipelining register to the second row-oriented bus and the third row-oriented bus such that each input of each sub-array is stored for the same number of clock cycles (e.g., two clock cycles).

Each pipelining register may store a weight or input data element for a systolic interval corresponding to latency of each PE. For example, if each PE takes three clock cycles to perform operations on an input data element and/or weight, each pipelining register may store a weight or input data element for three clock cycles. Further, each pipelining register may store the weight or input data element for a systolic interval corresponding to the number of PEs in a given sub-array. In the example of FIG. 1G, each sub-array includes two PEs and each pipelining register may store a corresponding weight or input data element for a number of clock cycles based on the two PEs. For example, if each PE takes three clock cycles to perform operations on an input data element and/or weight and each row-oriented bus is connected to two PEs, each pipelining register may store the weight or input data element for six clock cycles.

FIG. 1H illustrates an example eight-PE-row 191 of a systolic array 100H. The row 191 may be similar to a row of the array 100G of FIG. 1G and illustratively includes eight columns and one row. However, the row 191 further includes multiple shifters within the row 191. Specifically, as shown in FIG. 1H, the row 191 includes four shifters interposed throughout the row 191 to separate sub-arrays of the row 191. The shifters may shift one or more row-oriented busses to the active busses for a respective sub-array such that each sub-array corresponds to one or more different row-oriented bus. Each shifter may further comprise multiple pipelining registers configured to store a respective input for one or more clock cycles.

In the example of FIG. 1H, the row 191 includes a first row-oriented bus to provide a weight and a fifth row-oriented bus to provide an input data element to a first PE of a first sub-array (PE 192a). PE 192a may then pass the input data element and a weight to a subsequent PE (PE 192b). The row 191 further includes a second row-oriented bus to provide a weight and a fifth row-oriented bus to provide an input data element to a first PE of a second sub-array (PE 192c). PE 192c may then pass the input data element and a weight to a subsequent PE (PE 192*d*). The row 191 further includes a third row-oriented bus to provide a weight and a fifth row-oriented bus to provide an input data element to a first PE of a third sub-array (PE 192*e*). PE 192*e* may then pass the input data element and a weight to a subsequent PE (PE 192*f*). The row 191 further includes a fourth row-oriented bus to provide a weight and a fifth row-oriented bus to provide an input data element to a first PE of a fourth sub-array (PE 192*g*). PE 192*g* may then pass the input data element and a weight to a subsequent PE (PE 192*h*).

The row 191 may be configured to receive input data elements and weights from a pipelining block 190. The pipelining block 190 may include a plurality of pipelining registers organized in rows. The number of rows of the pipelining block 190 dedicated to providing a first element of the input data set (e.g., an input data element or weight) may correspond to the number of sub-arrays of the row 191. The number of pipelining registers in each row of the pipelining block 190 dedicated to providing a first element (e.g., a weight or input data element) to the row 191 may be based on the number of sub-arrays of the row 191. Where n is equal to the number of sub-arrays, a first row of the pipelining block 190 may include n pipelining registers. In the example of FIG. 1H, the row 191 includes four row-oriented busses to deliver a first element (e.g., a weight) to the row 191 and the first row of the pipelining block 190 includes four pipelining registers. The number of pipelining registers in each subsequent row of the pipelining block 190 dedicated to providing the first element to the row 191 may be decremented by 1. A second row of the pipelining block 190 may include n−1 pipelining registers, a third row of the pipelining block 190 may include n−2 pipelining registers, and a mth row of the pipelining block 190 may include n−m+1 pipelining registers. In one embodiment, a first row of the pipelining block 190 may include n−1 pipelining registers. In other embodiments, it will be understood that any number of pipelining registers can be included in each row of the pipelining block 190. The pipelining block 190 may include executable computer instructions that allow a user to set the number of clock cycles that each input is stored. In some embodiments, the systolic array 100H may not include a pipelining block 190 or be connected to a pipelining block and the row 191 may be configured to receive an input data element and/or weights without the respective inputs being stored by a pipelining block 190. Further, in some embodiments, the pipelining block 190 may be configured separately from the systolic array 100H.

The pipelining block 190 may include a row to provide a second element of the input data set (e.g., an input data element or a weight to the row). The row of the pipelining block 190 dedicated to provide a second element to the row 191 may include n pipelining registers where n is equal to the number of sub-arrays. In other embodiments, the row of the pipelining block 190 dedicated to providing a second element may include n−1 pipelining registers. In the example of FIG. 1H, the row of the pipelining block 190 dedicated to the second element includes four pipelining registers. The row of the pipelining block 190 dedicated to the second element may provide the second element to a set of PEs after passing through a pipelining register of the n pipelining registers. Where n is equal to the number of pipelining registers, the second element may be passed through n pipelining registers and then passed to the 1st set of PEs (e.g., PE 192*a*, 192*b*), n−1 pipelining registers and then passed to the 2nd set of PEs (e.g., PE 192*c*, 192*d*), n−2 pipelining registers and then passed to the 3rd set of PEs (e.g., PE 192*e*, 192*f*), n−3 pipelining registers and then passed to the 4$^{th}$ set of PEs (e.g., PE 192*g*, 192*h*). The second element for each set of PEs may pass through a same, initial pipelining register. The pipelining block 190 may provide an input data element and a weight to a first PE of a given sub-array in the same clock cycle.

The row 191 may further include a plurality of shifters 193, 194, 195, and 196 throughout the row 191, each shifter may include a plurality of pipelining registers configured to store a respective input data element or weight for one or more clock cycles. The number of shifters in the row 190 may be based on the number of sub-arrays in the row 190. For example, where the row includes n sub-arrays, the row may include n shifters. In other embodiments, the number of shifters in a row of a systolic array may be any number of shifters. In the example of FIG. 1H, the row 191 includes four sub-arrays and four shifters. The first shifter of the row 191 includes four pipelining registers for the weight and four pipelining registers for the input data element, the second shifter of the row 191 includes three pipelining registers for the weight and three pipelining registers for the input data element, the third shifter of the row 191 includes two pipelining registers for the weight and two pipelining registers for the input data element, and the fourth shifter of the row 191 includes one pipelining register for the weight and one pipelining register for the input data element. Each shifter may be placed before a respective sub-array. In some embodiments, a shifter may not be placed before the first sub-array.

Each of a first set of PEs (e.g., PE 192*a*, 192*c*, 192*e*, 192*g*) may receive input data sets during a first time period. The first time period may be based on the number of row-oriented busses and the input data sets may be stored in a number of pipelining registers for a number of clock cycles before the first time period. Each of the first set of PEs may subsequently provide the input data sets to a subsequent, adjacent PE of a second set of PEs (e.g., PE 192*b*, 192*d*, 192*f*, 192*h*) during a second time period. The number of PEs in each sub-array may be based on the distance that a given input data element or weight can be driven in a clock cycle. For example, if a given input can be driven across five PEs in one clock cycle, a sub-array may include five adjacent PEs. In other embodiments, the number of adjacent PEs in a given sub-array may exceed the distance that a given input data element or weight can be driven in a single clock cycle and the sub-array may include one or more pipelining registers configured to store the input. For example, if a given input data element or weight can be driven across five PEs in a single clock cycle and a row-oriented bus is connected to twelve adjacent PEs, the row-oriented bus may include a first pipelining register after the first five adjacent PEs and a second pipelining register after the first ten adjacent PEs. Further, if the systolic array is configured to run at 1 GHZ, a shifter may be implemented every 1,000 microns.

FIG. 1I illustrates an example eight-PE-row 191 of a systolic array 100I. The row 191 may be similar to the row 100H of FIG. 1H and illustratively includes eight columns and one row. However, the row 191 is connected to a pipelining block configured to receive multiple input data elements and multiple weights. Specifically, as shown in FIG. 1I, the pipelining block includes four busses to receive weights and four busses to receive input data elements.

The row 191 may be configured to receive input data sets from a pipelining block 192. The pipelining block 192 may include a plurality of pipelining registers organized in busses or rows. The number of rows of the pipelining block 192 dedicated to providing a first element of the input data set (e.g., an input data element or weight) and a second element of the input data set (e.g., an input data element or weight) may correspond to a number of sub-arrays of the row 191. For example, in a row with 4 sub-arrays, the pipelining block 192 may include four rows for the first element and four rows for the second element. In some embodiments, the pipelining block may include an unequal number of rows for the first and second elements. It will be understood that the pipelining block 192 may include any number of rows for the first element and any number of rows for the second element. The number of pipelining registers in each row of the pipelining block 192 may be based on the number of sub-arrays of the row 191. Where n is equal to the number of sub-arrays, a first row for the input data element and a first row for the weight may include n pipelining registers. The number of pipelining registers in each subsequent row of the pipelining block 192 for the input data element and each subsequent row of the pipelining block 192 for the weight may be decremented by 1. A second row of the pipelining block 192 for the weight and a second row of the pipelining block 192 for the input data element may include n−1 pipelining registers, a third row of the pipelining block 192 for the weight and a third row of the pipelining block 192 for the input data element may include n−2 pipelining registers, and a mth row of the pipelining block 192 for the weight and a mth row of the pipelining block 192 for the input data element may include n−m+1 pipelining registers. In one embodiment, a first row of the pipelining block 192 for the weight and a first row of the pipelining block 192 for the input data element may include n−1 pipelining registers. In other embodiments, it will be understood that any number of pipelining registers can be included in each row of the pipelining block 192.

The row 191 may receive a plurality of input data elements and a plurality of weights from the pipelining block 192. The row 191 may include a plurality of shifters and each shifter may include a plurality of pipelining registers. The row 191 may include a plurality of sub-arrays corresponding to a combination of an input data element of the plurality of input data elements and a weight of the plurality of weights.

Figure 2:
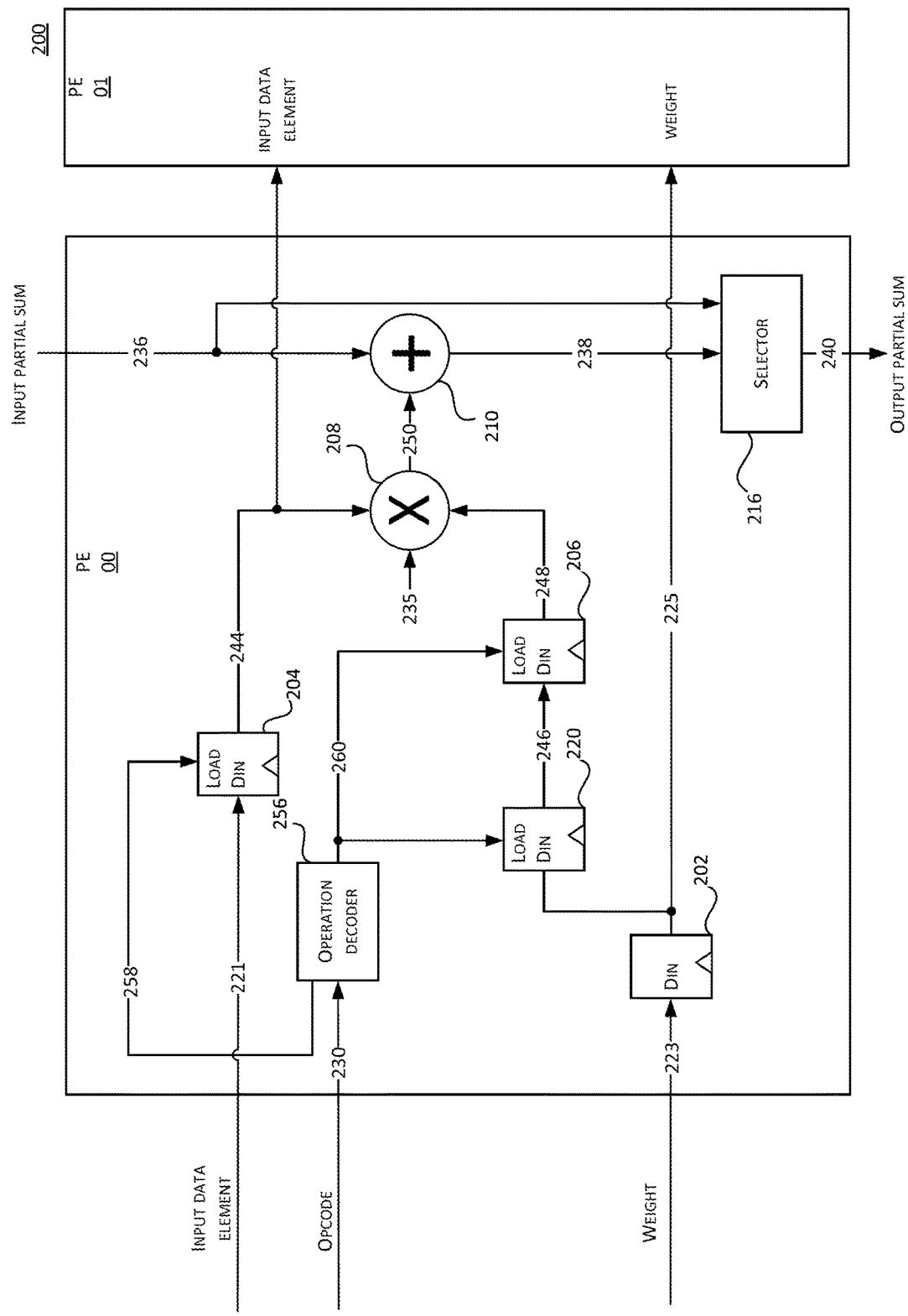
FIG. 2 illustrates a processing element for neural network computations, according to certain examples of the disclosed technologies.

FIG. 2 illustrates an example configuration of a PE at a position 00 (e.g., a first row and first column) in a systolic array 200 and performing arithmetic operations on an input partial sum and an input data set. The systolic array 200 includes a plurality of processing elements including at least PE00 and PE01. The PE00 may include a first weight register 202, an input data element register 204, a second weight register 206, a multiplier 208, an adder 210, a selector circuit 216, a cached weight register 220, and an operation decoder 256. The PE00 may be configured to receive an input data element 221, a weight 223, an opcode 230, and an input partial sum 236 to perform the arithmetic computations according to some embodiments.

The PE00 may receive the input data element 221 via a first input port for arithmetic calculations and generation of an output partial sum 240. The input data element 221 may correspond to an input data set, or any array of input data elements. The PE00 may receive one input data element at a time, in uniform time periods, from the input dataset. For example, a uniform time period may correspond to a clock cycle or multiple clock cycles (e.g., to account for latency of operation of the PE). The input data set may be similar to an input feature map comprising input feature map elements. As an example, the input data set may correspond to an input image, an audio clip, a video clip, a text portion, or any other data which may be provided for data processing to identify a certain pattern or an object. In some instances, the input data set may correspond to an intermediate output dataset, which has gone through an activation function, e.g., ReLu or Sigmoid. Each input data element 221 may be a floating-point data type or any suitable data type. Each input data element 221 may include 8-bits, 16-bits, or any suitable number of bits. The input data element 221 may be stored in the input data element register 204 for a period of time.

The PE00 may receive the weight 223 via a second input port for arithmetic calculations and generation of an output partial sum 240. In some implementations, the weight 223 may belong to a set of weight values corresponding to a convolution filter. The weight 223 may be pre-loaded in the PE00 prior to receiving the input data element 221. In some embodiments, the PE00 may receive one weight value at a time, in uniform time periods, from the set of weight values, to pre-load each PE in a given row with a respective weight value. The PE may pass the weight value to the next PE in the respective row until each PE in the given row has been pre-loaded. Each PE may cache the respective weight value to use for computations with the input data elements. Each weight 223 may be a floating-point data type or any suitable data type. Each weight 223 may include 8-bits, 16-bits, or any suitable number of bits. The weight 223 may be stored in a cached weight register 220 for a period of time.

The PE00 may receive the input partial sum 236 for a current operation via a third input port. The input partial sum 236 may be used in an addition operation by the adder 210.

In some implementations, the PE00 may include a plurality of pass-through wires to enable data from a prior PE (or input) corresponding to a different columnar bus to pass through the PE to a subsequent PE (or output) corresponding to that different columnar bus. Each pass-through wire may be associated with a corresponding input and output port on the PE. Each of the plurality of pass-through wires may be isolated from other elements of the PE00 (e.g., those shown in FIG. 2) and from any other pass-through wires. The number of pass-through wires is illustratively equal to (or greater than) the number of busses minus one, such that each columnar bus other than the columnar bus corresponding to the current PE can pass data through the PE to a subsequent PE corresponding to the respective bus.

Though not shown in FIG. 2, the PE00 may receive a zero data element indicator for a current operation via a fourth input port to determine a status of the input data element 221. The PE00 may also be configured to receive a zero weight indicator via a fifth port to determine a status of the weight 223.

The operation decoder 256 may be configured to decode the opcode 230 to determine an operation to be executed by the PE00 for different instructions represented by different opcode values. In some embodiments, a first opcode value may correspond to an instruction to shift the weights from one PE to another in the systolic array. A second opcode value may correspond to an instruction to start the arithmetic computations by the PE. For example, once the weights have been pre-loaded in the systolic arrays, the input data elements may be read from the memory and the arithmetic computations may be performed as the input data elements pass through the array. A third opcode value may correspond to an instruction to execute NOPs. The NOPS may be used to space two systolic array instructions, or when there are no input data elements to be read from the memory. For example, the NOPs may be used to space the instructions to shift the weights, and the instructions to start the arithmetic computations. For example, for a 4×4 array, it may take up to 4 cycles to shift the weights into all the PEs in the array before starting the arithmetic computations so 4 NOP cycles may be needed. The operation decoder 256 may be configured to decode the opcode 230 to generate a NOP 258, and the start computations signal 260. The operation decoder 256 may be configured to provide the start computations signal 260 to the second weight register 206 and the cached weight register 220 that is connected to the multiplier 208 and to the adder 210. The operation decoder 256 may also be configured to provide the start computations signal 260 to the multiplier 208. The operation decoder 256 may be configured to provide the NOP 258 to the input data element register 204. The opcode 230 may include any suitable number of bits, e.g., two, four, etc. In some implementations, the opcode decoder 256 can also decode the opcode to determine a data type to provide a data type control signal 235 to indicate to the multiplier which data types to operate on.

In some implementations, the input data element 221, the weight 223, and the opcode 230 may belong to the row input bus 102. In some implementations, a splitter (not shown) may be used in the PE00 to split the row input bus 102 into different internal busses to carry the input data element 221, the weight 223, and the opcode 230 within the PE00. For example, the input data element 221 and the weight 223 may belong to a first row input bus and the opcode 230 may belong to a second row input bus.

The NOP 258 may be used to allow the input data element register 204 to skip storing of the input data element 221 in certain conditions. In some embodiments, the input data element 221 may be loaded into the input data element register 204 based on the NOP 258. The input data element 221 may be loaded when the opcode 230 does not indicate a NOP (e.g., the NOP 258 is "0"). The input data element may not be loaded when the opcode 230 indicates a NOP (e.g., the NOP 258 is "1").

The input data element register 204 may be configured to store the input data element 221, or skip storing of the input data element 221 to provide a stored input data element 244 based on the NOP 258 for a current operation. In some implementations, the input data element register 204 may store a Din input if a load input is "1", and may hold the previous value if the load input is "0." For example, if the NOP 258 is "1," the input data element register 204 may store a new value for the input data element 221, and if the NOP 258 is "0," the input data element register 204 may skip storing the new value for the input data element 221. Thus, in some instances, the input data element register 204 may only store non-zero value of the input data element 221. According to certain embodiments, skipping the storing of the new value by the input data element register 204 may result in not toggling the stored input data element 244 and holding the previous value of the stored input data element 244.

The first weight register 202 may be configured to store the weight 223 for a current operation. The first weight register 202 may be configured to provide the first stored weight 225 to the cached weight register 220 and a subsequent PE01. The cached weight register 220 may be configured cache the first stored weight 225 to provide a cached weight 246 based on the start computations signal.

The second weight register 206 may be configured to store the cached weight 246 to provide a second stored weight 248 based on the start computations signal 260 to the multiplier 208 for the multiplication operation. In some implementations, the second weight register 206 may store a Din input if a load input is "1," and may hold the previous value if the load input is "0." For example, if the start computations signal 260 is asserted (e.g., the start computations signal 260 is "1"), the cached weight 246 may be loaded into the second weight register 206, else the second weight register 206 may hold the previous value. Thus, the weight 223 previously loaded into the cached weight register 220 may be shifted into the second weight register 206 at the start of the arithmetic computations. In some embodiments, the second stored weight 248, once loaded at the start of the arithmetic computations, remains unchanged as the input data element is fed into the PE00, one element at a time, for computations corresponding to one or more waves through the systolic array.

The PE00 may provide a stored input data set to PE01 for use in arithmetic operations in PE01. The PE00 may provide the stored input data element 244 to a PE01. The PE01 may receive the stored input data element 244 via a first port as an input data element 221. The PE00 may provide the first stored weight value 225 to a PE01. The PE01 may receive the first stored weight value 225 via a second port as a weight 223.

The multiplier 208 and the adder 210 may generally be circuitry configured to perform mathematical operations on input data. The circuitry of the multiplier 208 and the adder 210 may be connected to an input of the PE00 to receive an input for mathematical operations. The circuitry may further be connected to an output of the PE00 to provide an output based on the mathematical operations performed by the circuitry.

The multiplier 208 may perform a multiplication operation between the stored input data element 244 and the second stored weight value 248 to generate a product 250 for use in the accumulation operation. In some implementations, the product 250 may be an integer product, a floating-point product, or any other product. In some implementations, the multiplier 208 may generate a product 250 of 8-bits, 16-bits, 18-bits, 32-bits, or any other number of bits. The multiplier 208 may be implemented using a multiplier circuit. The multiplier 208 may be configured to perform floating-point multiplication, integer multiplication, or multiplication involving any other data type. The multiplier 208 may be implemented using a 16-bit multiplier data path, an 18-bit multiplier data path, or a multiplier data path with any number of bits. The multiplier 208 may be configured to support at least n-bits operations, wherein n is greater than or equal to the number of bits in the input.

The multiplier 208 may contain multiple data paths to enable multiplication operations for multiple data types. The multiplier 208 may contain separate data paths for computing a sign bit, a significand, and an exponent. The multiplier 208 may adjust the functionality in the data paths based at least in part on a data type control signal 235. For example, if the data type control signal 235 indicates a computation using BF16 numbers with an exponent expanded from eight bits to ten bits, the multiplier 208 may map a shorter 7 bit significand into a longer 10-bit significand representation and further utilize the 10-bit exponent of a BF16 number. As another example, if the data type control signal 235 indicates a computation using FP16 numbers with an exponent expanded from five bits to ten bits, the multiplier 208 may further utilize the 10-bit significand of the FP16 number. As a result, both BF16 and FP16 numbers can be represented within the multiplier 208 with a common format (e.g., a 10-bit exponent and a 10-bit significand). The data type control signal 235 may be configured to provide an interpretation of the data type of at least one of the input data element 221 and the weight 223.

The multiplier 208 may provide the adder 210 with the product 250 to perform an addition operation between the product 250 and a stored input partial sum. In some implementations, the multiplier 208 may provide one or more delay registers with the product 250 in order to store the product 250 for a plurality of systolic intervals. The one or more delay registers may provide the stored product to the adder 210. The adder 210 may perform an addition operation on the product 250 and a stored input partial sum to provide an addition result 238. The adder 210 may be configured as a pipelined adder and may be configured to generate the addition result 238 over a plurality of clock cycles to enable lower power consumption and circuit cost of the PE00. In some implementations, the time period between the PE00 receiving a first input data set and a subsequent PE, located on the same columnar bus as PE00, receiving a first input data set may be set equal to the latency of the adder 210. The adder 210 may be implemented using an adder circuit. The adder 210 may be configured to perform floating-point addition, integer addition, or non-integer addition. The adder 210 may be configured to perform addition on inputs with 8-bits, 16-bits, 18-bits, 32-bits, 34-bits, or any number of bits. The adder 210 may be implemented using a 16-bit adder data path, an 18-bit adder data path, a 32-bit adder data path, a 34-bit adder data path, or an adder data path with any number of bits. The adder 210 may be configured to support at least m-bits operations, wherein m is equal to or larger than the value of the multiplier data path. The adder data path may be configured to be a superset of the multiplier data path.

The multiplier 208 and the adder 210 may be integrated together to provide a fused multiply-accumulate operation. The fused multiply-accumulate operation may consist of a single step multiply add operation. The multiplier 208 and the adder 210 may be configured such that no rounding is performed on the output of the multiplier 208. In another implementation, the PE00 may perform rounding on the output of the multiplier 208. The multiplier 208 may be configured to provide an accurate product 250 to the adder 210.

The selector circuit 216 may receive the addition result 238 and the input partial sum 236 to generate an output partial sum 240. The selector circuit 216 may select either the addition result 238 or the input partial sum 236 to provide as an output partial sum 240 via a sixth port. In some embodiments, the selector circuit 216 may contain at least one multiplexer, the multiplexer may select the addition result 238 or the input partial sum 236 to be produced.

The PE00 may provide the output partial sum 240 to a, non-adjacent (e.g., non-consecutive) subsequent PE in the same column for use in subsequent mathematical operations by the subsequent PE. The PE00's output partial sum 240 may "skip" a number of PEs located immediately below the PE00, such that the output partial sum 240 is provided to a next PE corresponding to the columnar bus of the PE00. In some implementations, the number of PEs skipped may be equal to a number of busses minus one. For example, if a column includes four busses, the number of PEs skipped may equal three. Skipping PEs may be accomplished, for example, by outputting the output partial sum 240 to a pass-through wire of a subsequent PE, which may in turn be connected to one or more pass-through wires until the output partial sum 240 is provided to an input port of an adder of a subsequent PE.

Figure 6A:
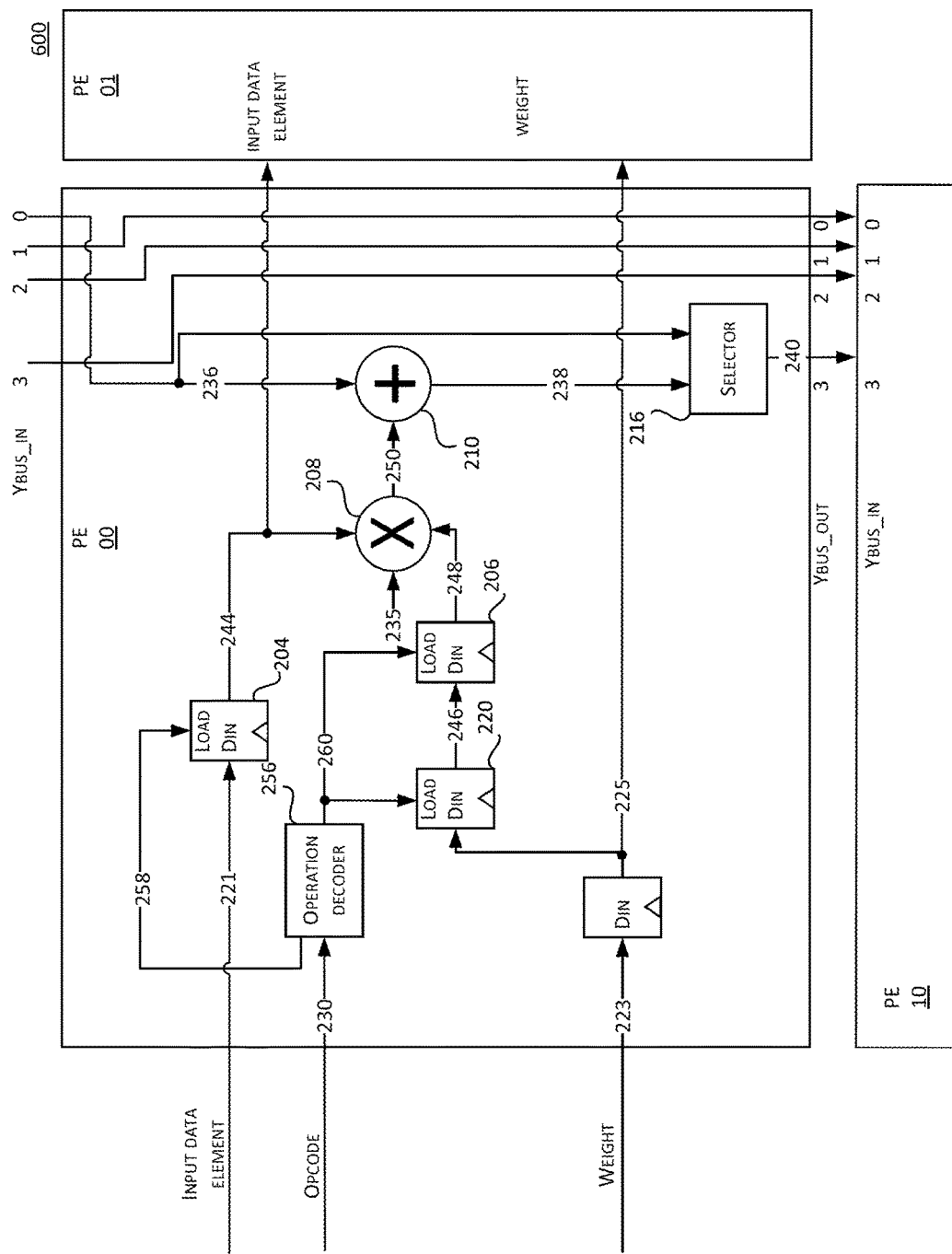
FIG. 6A illustrates a processing element for neural network computations, according to certain examples of the disclosed technologies.
Figure 6B:
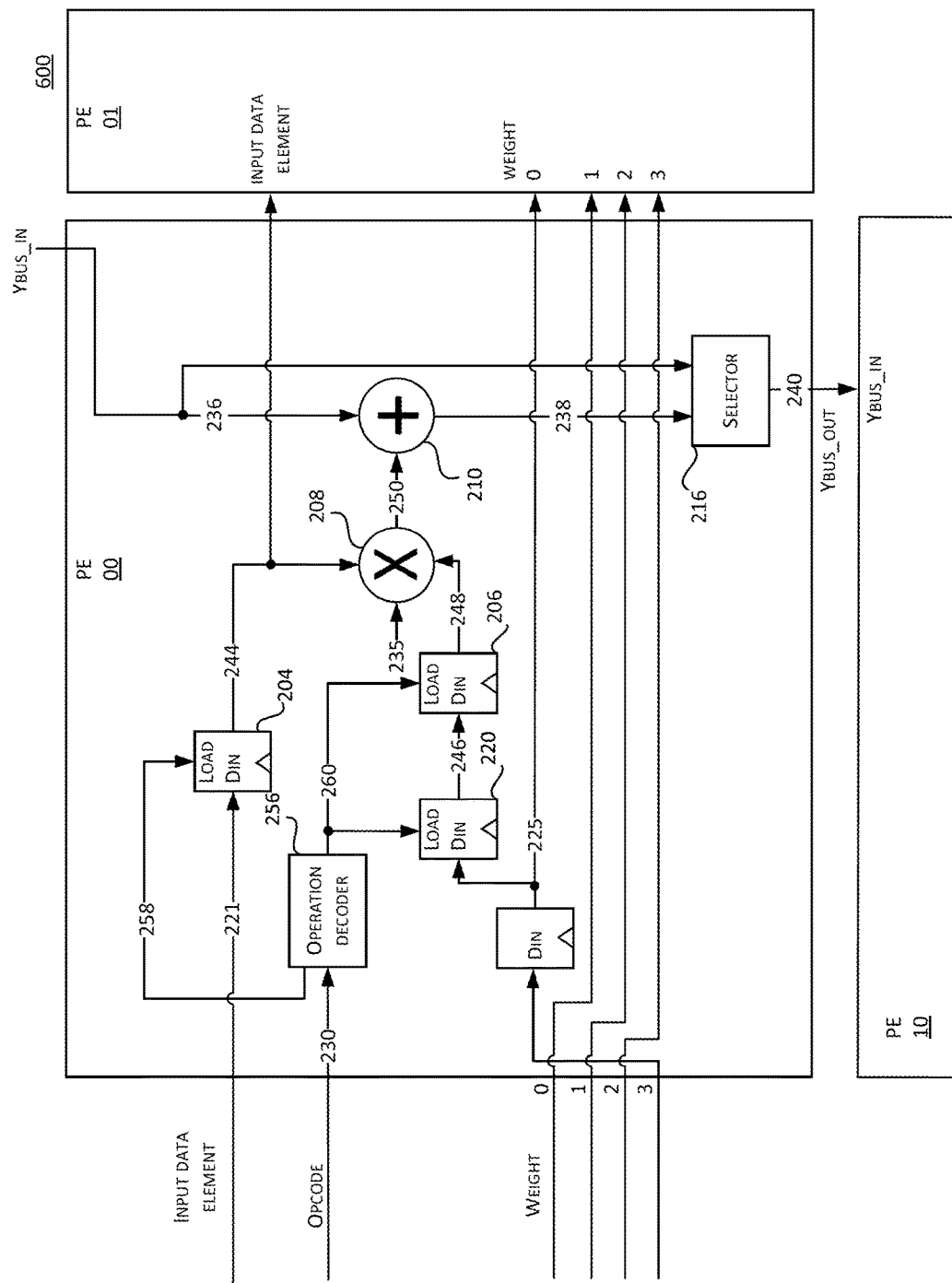
FIG. 6B illustrates a processing element for neural network computations, according to certain examples of the disclosed technologies.
Figure 6C:
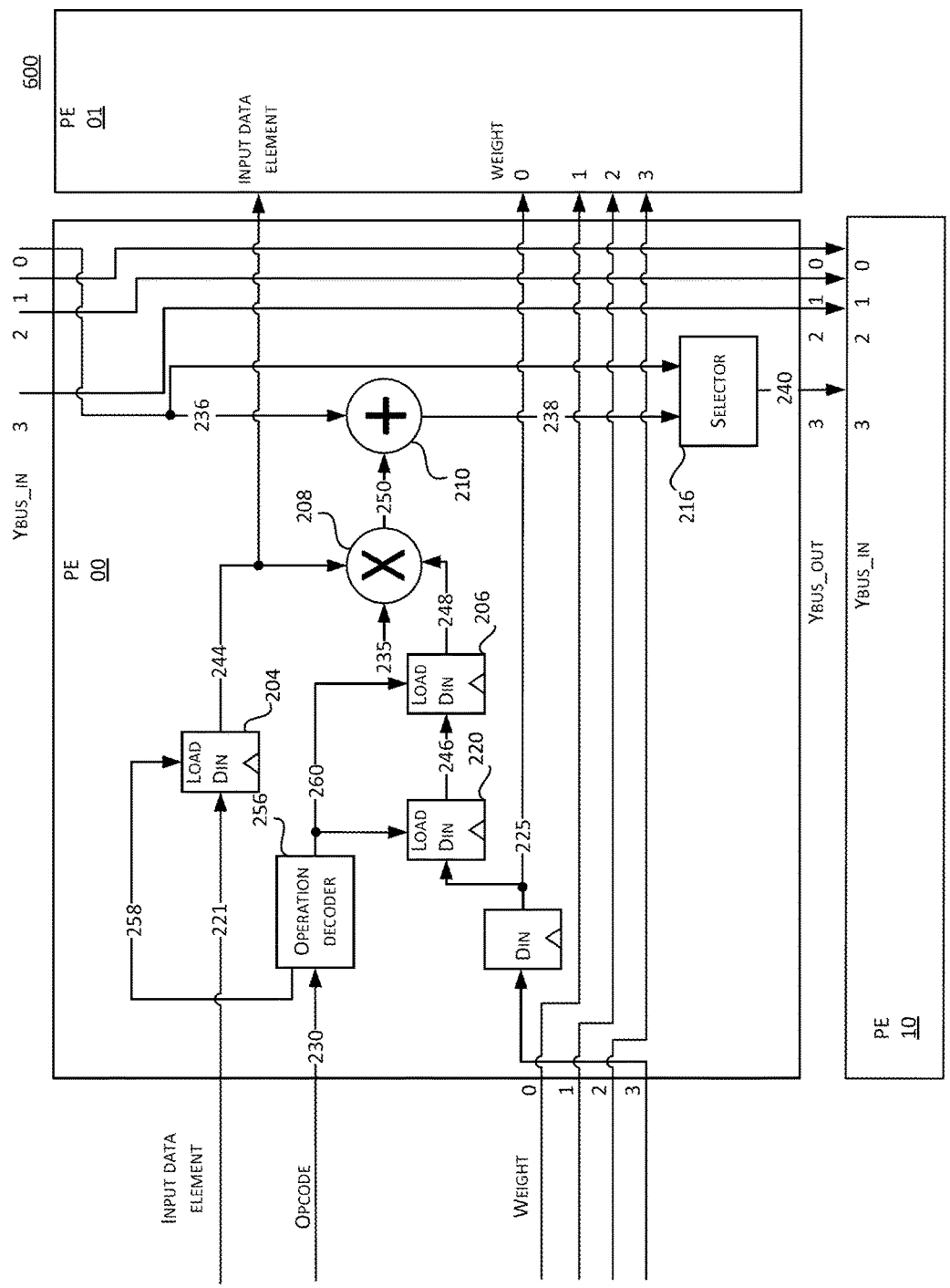
FIG. 6C illustrates a processing element for neural network computations, according to certain examples of the disclosed technologies.

FIG. 6A-6C illustrates an embodiment 600 of the systolic array 200 of FIG. 2, with the PE00 modified to implement a plurality of busses. FIG. 6A illustrates an embodiment of the systolic array 200 of FIG. 2 implementing a plurality of columnar busses. Specifically, the PE00 of FIG. 6A is configured to receive a plurality of $ybus_{inputs}$ in lieu of the singular input partial sum as illustrated in FIG. 2. The PE00 is also configured to produce a plurality of $ybus_{outputs}$ in lieu of the singular output partial sum as illustrated in FIG. 2. The PE00 includes a set of inputs and a set of outputs corresponding to the plurality of $ybus_{inputs}$ and the plurality of $ybus_{outputs}$. The plurality of $ybus_{inputs}$ and the plurality of $ybus_{outputs}$ may both correspond to the number of columnar busses of the column of the corresponding PE. For example, in FIG. 6A, the column of PE00 includes four columnar busses and, therefore, PE00 is configured to receive four $ybus_{inputs}$ and four $ybus_{outputs}$. It will be understood that in other implementations, the number of columnar busses may be any number, and therefore the number of $ybus_{inputs}$ and $ybus_{outputs}$ may be any number.

The plurality of $ybus_{inputs}$ may be connected to a plurality of interconnects which may then be connected to the plurality of $ybus_{outputs}$. One of the plurality of $ybus_{inputs}$ may correspond to a partial sum input for the respective PE and the corresponding interconnect may be connected to the adder of the PE. In some embodiments, each interconnect may correspond to one or more columnar busses of the plurality of columnar busses. Every other $ybus_{input}$ of the plurality of the plurality of $ybus_{inputs}$ may correspond to an interconnect that does not communicate with any elements of the PE. The term "active interconnect" as used herein generally refers to the interconnect which is connected to circuitry of the PE that acts on the signal flowing over the interconnect (such as the adder), and the term "passive interconnect" generally refers to those interconnects that are not connected to circuitry of the PE that modify or act on signal flowing over the interconnect (e.g., the adder). Each interconnect of the plurality of interconnects may be electronically isolated from each other interconnect of the plurality of interconnects. For example, each passive interconnect may correspond to a pass-through wire that is not electronically coupled to any of the other interconnects, while the active interconnect corresponds to wire that is electronically coupled to the adder of the PE (e.g., in addition to other elements, such as selector 216).

Each $ybus_{input}$ of the plurality of $ybus_{inputs}$ may correspond to a columnar position and each $ybus_{output}$ of the plurality of $ybus_{outputs}$ may correspond to a columnar position. The columnar positions may be aligned with respect to a horizontal or x axis such that when two PEs are placed together in vertical alignment, signals transmitted a given $ybus_{output}$ of an upper PE is communicated to a corresponding $ybus_{input}$ of the lower PE. Thus, data of PE00 written to $ybus_{output}$ 3 may be received at $ybus_{input}$ 3 of a subsequent row (e.g., PE10).

Each $ybus_{input}$ may be connected, through an interconnect, to a $ybus_{output}$ of a different columnar position. For example, interconnects may connect a given $ybus_{input}$ n to a $ybus_{output}$ n−1, with a lowest $ybus_{input}$ connecting to a highest $ybus_{output}$. For example, in FIG. 6A, $ybus_{input}$ 0 may be connected to $ybus_{output}$ 3, $ybus_{input}$ 1 may be connected to $ybus_{output}$ 0, $ybus_{input}$ 2 may be connected to $ybus_{output}$ 1, and $ybus_{input}$3 may be connected to $ybus_{output}$2. In this way, inputs at a given input position (e.g., defined relative to a horizontal axis) can be shifted (and, if appropriate, processed) before being output to a different output position. While FIG. 6A shows a shift of a single position, other shifts are possible. To enable a single configuration of PE to be utilized across an array using multiple columnar busses of a number m, it is generally desirable that such a shift result in a given input traveling through all possible input positions for a vertical arrangement of m PEs. For example, where 7 columnar busses are implemented, a shift of 3 may be utilized, such that an input at position 0 of a first PE would be shifted to position 3, 6, 2, 5, 1, and 4 when passing through a subsequent 6 PEs.

Each ybus$_{output}$ of the PE00 is configured to be coupled to a respective ybus$_{input}$ of a second PE10, which ybus$_{inputs}$ are located at the same input positions as the ybus$_{inputs}$ of PE00. Further, each ybus$_{output}$ is configured to physically abut the respective ybus$_{input}$ of a second PE10 and to provide an electrical signal to the respective ybus$_{input}$ of a second PE10 without the electrical signal traversing intervening circuitry. Thus, by "stacking" a number of PEs using the configuration shown in FIG. 6A, data may flow between the PEs. In one embodiment, the ybus$_{outputs}$ and ybus$_{inputs}$ are spaced along a horizontal axis, as shown in FIG. 6A. However, spacing in other directions (e.g., where the lower edge of a PE is not horizontal) is also possible. To provide for shifting of data between interconnects of two connected PEs, each ybus$_{input}$ of the second PE10 may correspond, via an interconnect, to a ybus$_{input}$ of the PE00 in a different columnar position. For example, the input at position 3 of the PE00 would be connected, via an interconnect to the input at position 2 of the PE10, the input at position 2 of the PE00 would be connected, via an interconnect, to the input at position 1 of the PE10, etc.

The use of shifting interconnects as shown in FIG. 6A enables operational the creation of distinct operational pipelines for each columnar bus, without modifying a configuration of PEs across rows of an array. Specifically, where a configuration of each PE is uniform, the shifting of the ybus$_{inputs}$ allows the output of an active interconnect at a given PE to be provided to an passive interconnect of a number of subsequent PEs equal to a number of skipped rows (e.g., the number of columnar busses minus 1). For example, if a first ybus$_{input}$ of a first PE is connected to the adder of the first PE and the column includes four columnar busses, a result of the adder's operation may be provided to a ybus$_{output}$ whose position is shifted relative to the ybus$_{input}$. That result may therefore, within a column, be subsequently provided to passive interconnects of the next three PEs and provided to the adder of a fourth PE, which illustratively represents a next PE of the same columnar bus. In this manner, the configuration of FIG. 6A reduces manufacturing complexity when providing PEs support multiple columnar busses.

FIG. 6B illustrates an embodiment of the systolic array 200 of FIG. 2, with the PE00 modified to implement a plurality of row-oriented busses. Specifically, the PE00 of FIG. 6B is configured to receive a plurality of xbus$_{inputs}$ in lieu of the singular weight as illustrated in FIG. 2. The PE00 is also configured to produce a plurality of xbus$_{outputs}$ in lieu of the singular weight as illustrated in FIG. 2. The PE00 includes a set of inputs and a set of outputs corresponding to the plurality of xbus$_{inputs}$ and the plurality of xbus$_{outputs}$. The plurality of xbus$_{inputs}$ and the plurality of xbus$_{outputs}$ may both correspond to the number of row-oriented busses of the row of the corresponding PE. For example, in FIG. 6B, the row of PE00 includes four row-oriented busses and, therefore, PE00 is configured to receive four xbus$_{inputs}$ and produce four xbus$_{outputs}$. It will be understood that in other implementations, the number of row-oriented busses may be any number, and therefore the number of xbus$_{inputs}$ and xbus$_{outputs}$ may be any number. In other implementations, the PE00 of FIG. 6B may be configured to receive the plurality of xbus$_{inputs}$ in lieu of the singular input data element as illustrated in FIG. 6B. The PE00 of FIG. 6B may be also configured to produce a plurality of xbus$_{outputs}$ in lieu of the singular input data element as illustrated in FIG. 6B.

The plurality of xbus$_{inputs}$ may be connected to a plurality of interconnects which may then be connected to the plurality of xbus$_{outputs}$. Each interconnect may be configured to carry a first input (e.g., a weight) during a first systolic interval and a second input (e.g., an input data element) during a second systolic interval. In some embodiments, each interconnect may correspond to one or more row-oriented busses of the plurality of row-oriented busses. One of the plurality of xbus$_{inputs}$ may correspond to a weight for the respective PE and the corresponding interconnect may be connected to the first weight register of the PE. Every other xbus$_{input}$ of the plurality of the plurality of xbus$_{inputs}$ may correspond to an interconnect that does not communicate with other elements of the PE. The interconnect connected to the first weight register can therefore be considered an active interconnect, while the other interconnects can be considered passive interconnects.

Each xbus$_{input}$ of the plurality of xbus$_{inputs}$ may correspond to a row-oriented position and each xbus$_{output}$ of the plurality of xbus$_{outputs}$ may correspond to a row-oriented position. The row-oriented positions may be aligned with respect to a vertical or y axis such that when two PEs are placed together in horizontal alignment, signals transmitted by a given xbus$_{output}$ of a left PE are communicated to a corresponding xbus$_{input}$ of a right PE. Thus, data of PE00 written to xbus$_{output}$ 3 may be received at xbus$_{input}$ 3 of a subsequent column (e.g., PE01).

Each xbus$_{input}$ may be connected, through an interconnect, to a xbus$_{output}$ of a different row-oriented position. For example, interconnects may connect a given xbus$_{input}$ n to a xbus$_{output}$ n−1, with a highest xbus$_{input}$ connecting to a lowest xbus$_{output}$. For example, in FIG. 6B, xbus$_{input}$ 3 may be connected to xbus$_{output}$ 0, xbus$_{input}$ 2 may be connected to xbus$_{output}$ 3, xbus$_{input}$ 1 may be connected to xbus$_{output}$ 2, and xbus$_{input}$ 0 may be connected to xbus$_{output}$ 1. In this way, inputs at a given input position (e.g., defined relative to a vertical axis) can be shifted (and, if appropriate, processed) before being output to a different output position. While FIG. 6B shows a shift of a single position, other shifts are possible. To enable a single configuration of PE to be utilized across an array using multiple row-oriented busses of a number m, it is generally desirable that such a shift result in a given input traveling through all possible input positions for a horizontal arrangement of m PEs. For example, where 7 row-oriented busses are implemented, a shift of 3 may be utilized, such that an input at position 0 of a first PE would be shifted to position 3, 6, 2, 5, 1, and 4 when passing through a subsequent 6 PEs.

Each xbus$_{output}$ of the PE00 is configured to be coupled to a respective xbus$_{input}$ of a second PE01, which xbus$_{inputs}$ are located at the same input positions as the xbus$_{inputs}$ of PE00. Further, each xbus$_{output}$ is configured to physically abut the respective xbus$_{input}$ of a second PE01 and to provide an electrical signal to the respective xbus$_{input}$ of a second PE01 without the electrical signal traversing intervening circuitry. Thus, by joining a number of PEs using the configuration shown in FIG. 6B, data may flow between the PEs. In one embodiment, the xbus$_{outputs}$ and xbus$_{inputs}$ are spaced along a vertical axis, as shown in FIG. 6B. However, spacing in other directions (e.g., where the rightmost edge of a PE is not vertical) is also possible. To provide for shifting of data between interconnects of two connected PEs, each xbus$_{input}$ of the second PE01 may correspond, via an interconnect, to a xbus$_{input}$ of the PE00 in a different row-oriented position.

For example, the input at position 3 of the PE00 would be connected, via an interconnect to the input at position 2 of the PE01, the input at position 2 of the PE00 would be connected, via an interconnect, to the input at position 1 of the PE01, etc.

The use of shifting interconnects as shown in FIG. 6B enables operational the creation of distinct operational pipelines for each row-oriented bus, without modifying a configuration of PEs across columns of an array. Specifically, where a configuration of each PE is uniform, the shifting of the $xbus_{inputs}$ allows the output of an active interconnect at a given PE to be provided to an passive interconnect of a number of subsequent PEs equal to a number of skipped columns (e.g., the number of row-oriented busses minus 1). For example, if a first $xbus_{input}$ of a first PE is connected to the first weight register of the first PE and the row includes four row-oriented busses, a result of the first weight register's operation may be provided to a $xbus_{output}$ whose position is shifted relative to the $xbus_{input}$. That result may therefore, within a row, be subsequently provided to passive interconnects of the next three PEs and provided to the first weight register of a fourth PE, which illustratively represents a next PE of the same row-oriented bus. In this manner, the configuration of FIG. 6B reduces manufacturing complexity when providing PEs support multiple row-oriented busses.

FIG. 6C illustrates an embodiment of the systolic array 200 of FIG. 2, with the PE00 modified to implement a plurality of row-oriented busses and a plurality of columnar busses. Specifically, the PE00 of FIG. 6C is configured to receive a plurality of $xbus_{inputs}$ and a plurality of $ybus_{inputs}$ in lieu of the singular weight and the singular input partial sum as illustrated in FIG. 2. As further described with respect to FIG. 6A and FIG. 6B, the PE00 is also configured to produce a plurality of $xbus_{outputs}$ and a plurality of $ybus_{outputs}$ in lieu of the singular weight and the singular input partial sum as illustrated in FIG. 2. In FIG. 6C, the row of PE00 includes four row-oriented busses and the column of PE00 includes four columnar busses. It will be understood that in other implementations, the number of row-oriented busses and the number of columnar busses may be any number, and therefore the number of $xbus_{inputs}$ and $xbus_{outputs}$ and the number of $ybus_{inputs}$ and $ybus_{outputs}$ may be any number. In FIG. 6C, the PE00 includes the same number of row-oriented busses and the same number of columnar busses. In other implementations, the PE00 may include different numbers of row-oriented busses and columnar busses. For example, the PE00 may include five row-oriented busses and three columnar busses.

Figure 4:
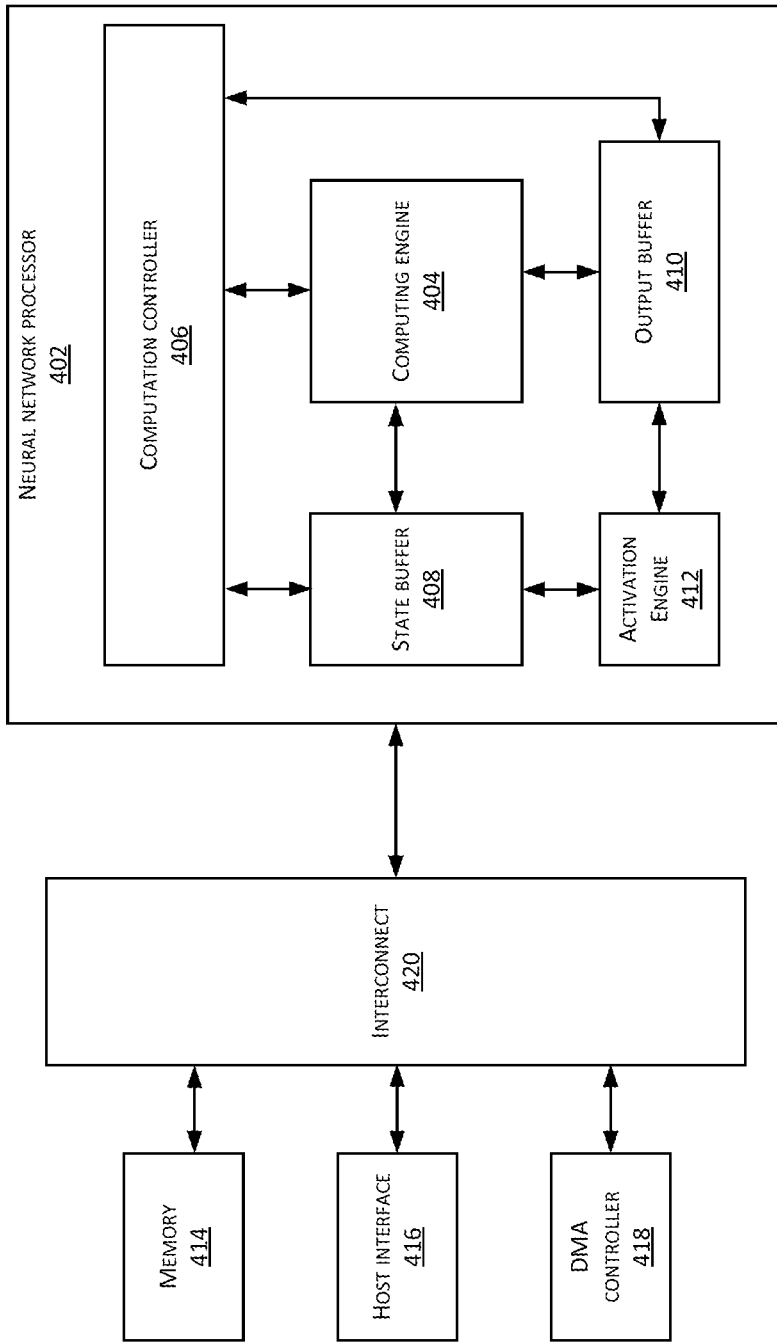
FIG. 4 shows an apparatus for neural network computations according to some examples of the disclosed technologies.

FIG. 4 shows an apparatus 400 for neural network computations according to some examples of the disclosed technologies. The apparatus 400 may be part of a computer system, e.g., a host server. For example, the host server may provide multi-tenant compute services for data processing applications such as an image recognition service, text-based data processing (e.g., processing of search queries), audio data processing, video data processing, etc. In some examples, a host device may operate a software application and communicate with the apparatus 400 to make a prediction based on computations with a prediction model utilizing a neural network processor. For example, the host device can make the prediction by identifying information included in an input data set for an image, text, audio, video, etc. using the prediction model.

The apparatus 400 may include a neural network processor 402 coupled to memory 414, a host interface 416, and a direct memory access (DMA) controller 418 via an interconnect 420. The neural network processor 402 may include a computing engine 404, a computation controller 406, a state buffer 408, an output buffer 410, and an activation engine 412. The neural network processor 402 can provide the computing resources to support the computations with the prediction model. The neural network processor 402 may be implemented as a system on chip (SoC), a field programmable gate array (FPGA), or any suitable circuit.

The memory 414 may be configured to store instructions, input data sets (e.g., pixel data of an image) and the weights (e.g., weights corresponding to certain visual and/or nonvisual features) received from the host device. The memory 414 may also be configured to store outputs of the neural network processor 402 (e.g., one or more image recognition decisions on the input images in the form of output data sets). The memory 414 may include any suitable memory, e.g., dynamic random access memory (DRAM), synchronous DRAM (SDRAM), double data rate DRAM (DDR DRAM), storage class memory (SCM), flash memory, etc.

The host interface 416 may be configured to enable communication between the host device and the neural network processor 402. For example, the host interface 416 may be configured to transmit memory descriptors including the memory addresses of the stored data (e.g., input data sets, weights, results of computations, etc.) between the host device and the neural network processor 402. The host interface 416 may include, e.g., a peripheral component interconnect express (PCIe) interface, or any suitable interface for communicating with the host device. The host device may include a host processor and a host memory.

The DMA controller 418 may be configured to perform DMA operations to transfer data between the neural network processor 402 and the host device. For example, as discussed above, the host device can store the instructions, input data sets, and the weights in the memory 414. The host device can provide the memory addresses for the stored instructions, data, and the weights to the neural network processor 402 (e.g., in the form of memory descriptors). The neural network processor 402 can then obtain the stored instructions, data, and the weights based on the memory addresses provided by the host device. The neural network processor 402 can also store the results of computations (e.g., one or more image recognition decisions) in the memory 414, and provide the memory addresses for the stored results to the host device.

The state buffer 408 may be configured to provide caching of data used for computations at the computing engine 404. The data cached at the state buffer 408 may include, e.g., the input data sets and the weights acquired from the memory 414, as well as intermediate outputs of computations at the computing engine 404. The caching can reduce the effect of memory access bottleneck (e.g., caused by the latencies at the memory 414, the DMA controller 418, the interconnect 420, etc.) on the performance of the computing engine 404. The state buffer 408 can be an on-chip memory device and may include a static random access memory (SRAM) or any suitable memory.

The computation controller 406 may be configured to provide controls to various components of the neural network processor 402 to perform neural network computations. In some implementations, the computation controller 406 may read the instructions stored in the memory 414 and schedule the executions of the instructions by the computing engine 404. In the first example, the computation controller 406 may perform scheduling of loading the weights into the computing engine 404 prior to reading the input data elements from the state buffer 408. For example, as discussed with reference to FIG. 2, the computation controller 406 may provide the opcode 230 to the computing engine 404 based on the instructions received from the host device. The computation controller 406 may provide appropriate values of the opcode 230 to the computing engine 404 which may be decoded by each PE in the computing engine to perform a corresponding operation. For example, the computing engine 404 may use the opcode 230 to pre-load the weights in all the PEs in the computing engine 404. Once the weights have been pre-loaded, the computation controller 406 may perform scheduling of loading the input data elements into the computing engine 404, sequentially, in systolic intervals, from the state buffer 408 to start the arithmetic computations.

In another example, the computation controller 406 may perform scheduling of loading the weights and the input data elements into the computing engine 404, sequentially, in systolic intervals, from the state buffer 408. The computation controller 406 may schedule loading of the weights and the input data elements in a respective first PE of each row in the systolic array 100A using a respective row data bus. For example, a respective input data element and a weight value may be loaded per cycle in the first PE of the respective row.

In another example, the computation controller 406 may schedule loading of the weights in the systolic array 100A in parallel for each row using a respective column data bus for each PE in a given row. For example, weights for each row may be loaded in parallel per cycle. In some implementations, the computation controller 406 may determine a data type for the input data set based on the instructions received from the host device. The instructions may be in the form of an opcode. The data type may indicate a size and a type of the input data element, e.g., 4-bit, 8-bit, 16-bit, signed, unsigned, or floating point.

The computing engine 404 may be configured to perform computations for the neural network. In some examples, the computing engine 404 may include a set of PEs configured to perform one or more arithmetic operations involved in the neural network computations. Each PE may perform multiply-accumulate operations using input data sets and associated weights.

In another example, the weights may be pre-loaded prior to reading the input datasets from the state buffer 408. In another example, the weights and the input datasets may be read simultaneously from the state buffer 408. The weights and the input datasets can be obtained from the state buffer 408 using one or more interfaces. In certain examples, the computing engine 404 may delay the arithmetic computations to reduce the dynamic power consumption of the systolic array 100A by storing the input partial sum 236 for a set of clock cycles as discussed with reference to FIG. 2, and provide the computations results to be stored in the output buffer 410. Further, the computing engine 404 may reduce system latency of the systolic array 100A by using columnar busses to perform multiple arithmetic computations simultaneously in a column of the systolic array as discussed with reference to FIGS. 1A and 1B.

The output buffer 410 may include a set of registers to store the output data sets generated by the computing engine 404. In some implementations, the output buffer 410 may also enable additional processing such as, e.g., a pooling operation to reduce the size of the stored outputs. In some implementations, the computing engine 404 can be operated to perform computations for a particular neural network layer, and the output buffer 410 can process the outputs of that neural network layer and store the processed output datasets (with or without processing by the activation engine 412) at the state buffer 408. The processed output datasets may be used by the computing engine 404 as the intermediate outputs. In some examples, the output buffer 410 may include adders to accumulate the partial sums generated for different sets of filters and input data sets to generate a convolution output array. The final output value of the convolution output array stored in the state buffer 408 can be retrieved by the computation controller 406 for storing at the state buffer 408.

The activation engine 412 may be configured to apply one or more activation functions (e.g., ReLu function) on the output of the output buffer 410. For example, the activation engine 412 may include one or more lookup tables (e.g., in the form of multiplexer circuits) that can map the input to one of the candidate outputs representing the result of applying the activation function to the input. In some examples, the activation engine 412 may also include a bypass path to allow outputs from the output buffer 410 to be stored directly at the state buffer 408 when activation functions are not to be applied.

Figure 5:
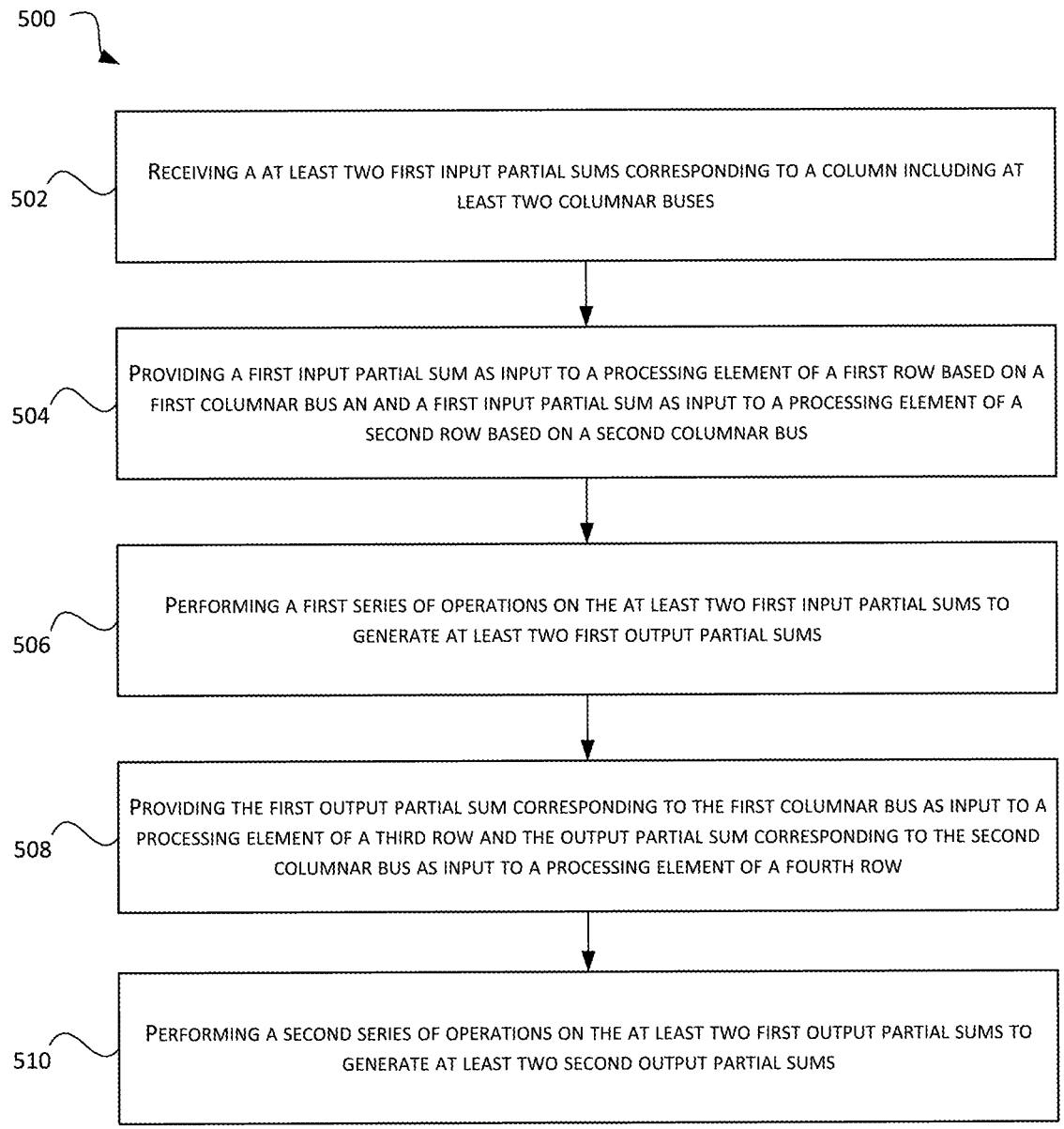
FIG. 5 shows a method executed by a systolic array for neural network computations, according to some examples of the disclosed technologies.

FIG. 5 shows a method 500 executed by a computing engine 404 utilizing a systolic array, according to some examples of the disclosed technologies. The array may be similar, for example, to the array 100A, and include multiple PEs similar to, e.g., the PE 112a. The systolic array may include a plurality of PEs configured in a plurality of rows and a plurality of columns. For example, the systolic array might include 65,536 PEs which are further divided into 256 rows and 256 columns. Each column of the systolic array may be implemented as a plurality of columnar busses.

In block 502, the computing engine 404 receives a plurality of first input partial sums for concurrent mathematical operations. The first input partial sums may represent, for example, an image to be classified according to a trained machine learning model.

In block 504, a computing engine 404 provides to each columnar bus of the plurality of columnar busses a first input partial sum from the plurality of first input partial sums. In some embodiments, the plurality of first input partial sums may be equal to zero or represent a logical zero, or may be otherwise common values among busses. In other embodiments, the first partial input sums may vary among busses. The computation controller 406 may schedule provision of the plurality of first input partial sums during a first systolic interval or a first clock cycle. More specifically, the engine 404 can provide the plurality of first input partial sums as inputs to a first set of processing elements of a first plurality of rows of the systolic array. The first set of processing elements of the first plurality of rows may correspond to a number of rows located at the top of the systolic array or first in the systolic array. For example, the processing elements may correspond to the PEs of the first four rows in relation to the top of the systolic array. For further example, in relation to FIG. 1B, the processing elements may correspond to the first four PEs which are PE 122a, PE 122b, PE 122c, and PE 122d. Each of the n first processing elements may receive a respective first input partial sum of the plurality of first input partial sums. In the example of FIG. 5, each of the n first processing elements may receive a first input partial sum during a first systolic interval or a first clock cycle. However, in other embodiments, the processing elements of the first plurality of rows may receive a first input partial sum during different systolic intervals. The topmost PE of each column may illustratively receive the first input partial sum directly, while subsequent PEs of the processing elements may receive the respective first input partial sums via pass-through wiring. For the example in FIG. 1B, the PE 122a may receive each of the four first input partial sums with one first input partial sum provided to the adder circuit of the PE 122a and the other three first input partial sums provided to pass-through wiring in PE 122a. Further, the PE 122b may receive the three first input partial sums passed through PE 122a with one first input partial sum provided to the adder circuit of the PE 122b and the other two first input partial sums provided to pass-through wiring in PE 122b.

In a block 506, each of the processing elements of the first plurality of rows performs an operation (e.g., a multiply-accumulate operation) on the respective first input partial sum. Based on the operation, each of the processing elements may generate a respective first output partial sum. For example, each processing element of the first plurality of rows may perform a multiplication operation between a stored input data element 244 and a second stored weight 248 as seen in FIG. 2, using a multiplier. Each processing element may further perform an addition between its respective input partial sum and the product of the multiplication operation, using an adder. The adder 210 may be configured to be a high latency adder (e.g., with a latency greater than one systolic interval) and may store the input partial sum for a set of clock cycles. The adder 210 may complete the addition during a subsequent systolic interval based on the time period between each processing element of the first plurality of rows receiving a first input data set and a second input data set. The adder 210 may provide an addition result 238 to a selector circuit 216. The selector circuit may then generate a first output partial sum 240. The processing elements of the first plurality of rows may generate a plurality of first output partial sums based on the first series of operations.

In a block 508, the processing elements of the first plurality of rows provide the plurality of first output partial sums to processing elements of a second plurality of rows as input partial sums to those rows. The processing elements of the second plurality of rows may correspond to a number of rows of the systolic array, immediately below the first plurality of rows. For example, where the first plurality of rows may correspond to the first four rows in relation to the top of the systolic array, the second plurality of rows may correspond to the next four rows in relation to the top of the systolic array. For further example, in relation to FIG. 1B, the processing elements of the second plurality of rows may correspond to the next four PEs which are PE 122e, PE 122f, PE 122g, and PE 122h. More specifically, each PE of the first set of rows may provide its output partial sum to a next PE of its columnar bus. For example, where four busses are provided in a column, a first of a column PE can provide its output to the fifth PE, a second PE can provide its output to a six PE, etc. Each of the processing elements of the second plurality of rows illustratively receives its input partial sum during another systolic interval. In one embodiment, each PE of the second plurality of rows receives its input partial sum during a second systolic interval, immediately subsequent to the first systolic interval. In another embodiment, each PE of the second plurality of rows receives its input partial sum during a subsequent systolic interval not immediately subsequent to the first systolic interval, with a delay between the first systolic interval and the subsequent systolic interval matching a latency of operation of each PE. For example, where a multiply-accumulate operation in a PE requires 4 systolic intervals, each PE of the second plurality of rows receives its input partial sum during a fifth systolic interval. In one embodiment, all PEs of the second plurality of rows receives its input partial sum during the same systolic interval (e.g., all during the fifth interval). In other embodiments, the processing elements of the second plurality of rows may receive their respective input partial sum during different systolic intervals (e.g., a fifth row during a fifth interval, a sixth row during a sixth interval, etc.). In some implementations, each of the processing elements of the second plurality of rows may receive a second input partial sum via pass-through wiring existing in prior PEs of the column.

In a block 510, each of the processing elements of the second plurality of rows may perform a second operation on their respective input partial sum. Based on the operation, each of the processing elements of the second plurality of rows may generate a respective output partial sum. For example, each processing element of the second plurality of rows can perform a multiplication operation (e.g., as part of a multiply-accumulate operation) between a stored input data element 244 and a second stored weight 248 as seen in FIG. 2, via a multiplier. Each PE can further conduct an addition of a product provided by the multiplier and its input partial sum. The adder 210 may for example be a high latency adder and may store the input partial sum for a set of systolic intervals. The adder 210 may provide an addition result 238 to a selector circuit 216. The selector circuit may then generate a second output partial sum 240. The processing elements of the second plurality of rows may generate a plurality of second output partial sums based on the second series of operations.

Figure 8:
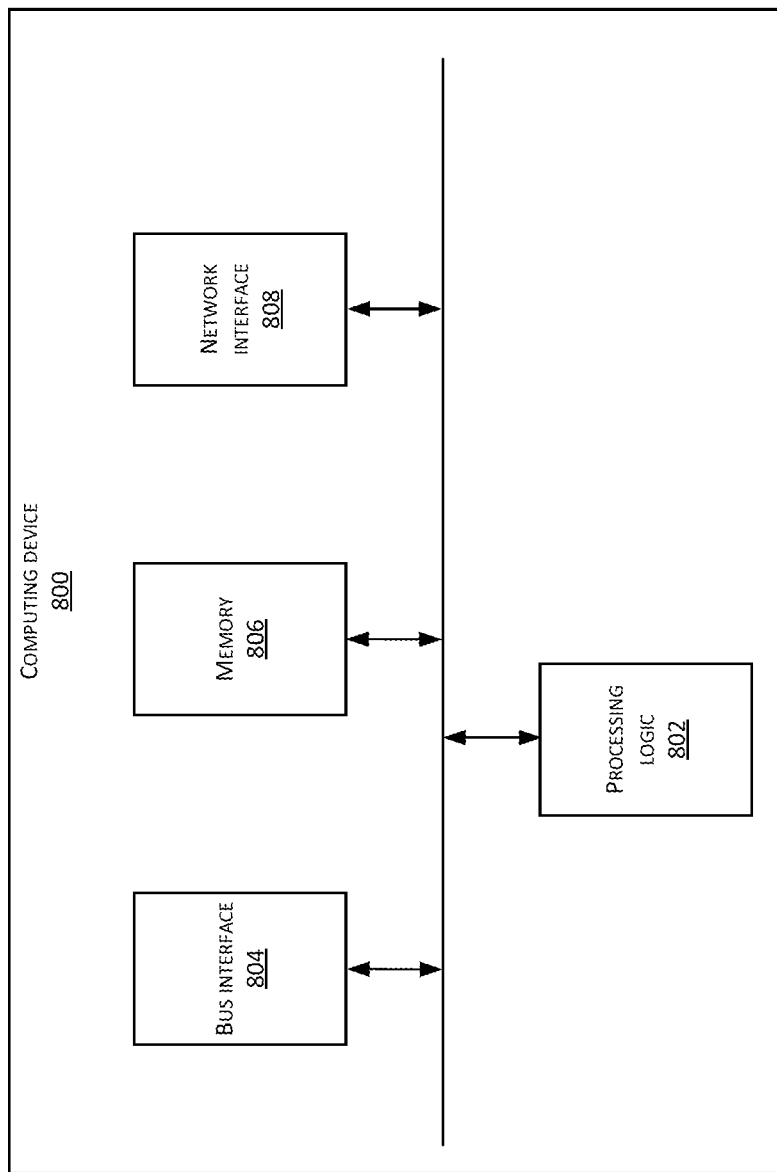
FIG. 8 illustrates an example of a computing device, according to certain aspects of the disclosure.

FIG. 8 illustrates an example of a computing device 800. Functionality and/or several components of the computing device 800 may be used without limitation with other examples disclosed elsewhere in this disclosure, without limitations. A computing device 800 may perform computations to facilitate processing of a task. As an illustrative example, computing device 800 can be part of a server in a multi-tenant compute service system. Various hardware and software resources of computing device 800 (e.g., the hardware and software resources associated with data processing) can be allocated to a client upon request.

In one example, the computing device 800 may include processing logic 802, a bus interface module 804, memory 806, and a network interface module 808. These modules may be hardware modules, software modules, or a combination of hardware and software. In certain instances, modules may be interchangeably used with components or engines, without deviating from the scope of the disclosure. The computing device 800 may include additional modules, which are not illustrated here for the ease of illustration. In some implementations, the computing device 800 may include fewer modules. In some implementations, one or more of the modules may be combined into one module. One or more of the modules may be in communication with each other over a communication channel 810. The communication channel 810 may include one or more busses, meshes, matrices, fabrics, a combination of these communication channels, or some other suitable communication channel.

The processing logic 802 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 802 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 806. The processing logic 802 may also include hardware circuities for performing artificial neural network computations including, for example, a neural network processor, etc.

The access to the processing logic 802 can be granted to a client to provide the personal assistant service requested by the client. For example, the computing device 800 may host a virtual machine, on which an image recognition software application can be executed. The image recognition software application, upon execution, may access the processing logic 802 to predict, for example, an object included in an image. As another example, access to the processing logic 802 can also be granted as part of bare-metal instance, in which an image recognition software application executing on a client device (e.g., a remote computer, a smart phone, etc.) can directly access the processing logic 802 to perform the recognition of an image.

The memory 806 may include either volatile or non-volatile, or both volatile and nonvolatile types of memory. The memory 806 may, for example, include random access memory (RAM), read only memory (ROM), Electrically Erasable Programmable Read-Only Memory (EEPROM), flash memory, and/or some other suitable storage media. In some cases, some or all of the memory 806 may be internal to the computing device 800, while in other cases some or all of the memory may be external to the computing device 800. The memory 806 may store an operating system comprising executable instructions that, when executed by the processing logic 802, provides the execution environment for executing instructions providing functionality to perform convolution computations for the computing device 800. The memory 806 may also store, for example, software applications for performing artificial neural network computations. The memory may also store and maintain several data structures and tables for facilitating the functionality of the computing device 800.

The bus interface module 804 may enable communication with external entities, such as a host device and/or other components in a computing system, over an external communication medium. The bus interface module 804 may include a physical interface for connecting to a cable, socket, port, or other connection to the external communication medium. The bus interface module 804 may further include hardware and/or software to manage incoming and outgoing transactions. The bus interface module 804 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 804 may include the physical layer for any of these bus protocols, including a connector, power management, and error handling, among other things. In some implementations, the computing device 800 may include multiple bus interface modules for communicating with multiple external entities. These multiple bus interface modules may implement the same local bus protocol, different local bus protocols, or a combination of the same and different bus protocols.

The network interface module 808 may include hardware and/or software for communicating with a network. This network interface module 808 may, for example, include physical connectors or physical ports for wired connection to a network, and/or antennas for wireless communication to a network. The network interface module 808 may further include hardware and/or software configured to implement a network protocol stack. The network interface module 808 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 800 may include multiple network interface modules, each configured to communicate with a different network. For example, in these implementations, the computing device 800 may include a network interface module for communicating with a wired Ethernet network, a wireless 802.11 network, a cellular network, an Infiniband network, etc. In some examples, the computing device 800 may receive a set of parameters, such as the aforementioned weight values for convolution computations, from a server through network interface module 808.

The various components and modules of the computing device 800, described above, may be implemented as discrete components, as a System on a Chip (SoC), as an ASIC, as an NPU, as an FPGA, or any combination thereof. In some examples, the SoC or other component may be communicatively coupled to another computing system to provide various services such as traffic monitoring, traffic shaping, computing, etc. In some examples of the technology, the SoC or other component may include multiple subsystems as disclosed herein.

Various example embodiments of the disclosure can be described by the following clauses:

Clause 1. A systolic processor comprising:
  a systolic array of processing elements arranged in rows and columns, each row of the systolic array including a plurality of row-oriented buses;
  wherein the systolic array of processing elements is divided into a first sub-array of processing elements and a second sub-array of processing elements, each sub-array of processing elements including one or more consecutive columns of the systolic array, each sub-array of processing elements further including, for each row, an active row-oriented bus and one or more inactive row-oriented busses, each processing element configured to perform a mathematical operation on an input of the active row-oriented bus corresponding to the respective sub-array;
  a first shifter element interposed between the first and second sub-arrays, wherein the first shifter element comprises circuitry configured, for each row of the array, to shift a data element transmitted on an inactive bus of the first sub-array to an active bus of the second sub-array;

wherein each processing element is further configured to:

perform the mathematical operation on a weight and an input data element, and provide the weight and the input data element to a subsequent column of the respective sub-array.

Clause 2. The systolic processor of Clause 1, wherein the systolic processor further comprises a pipelining block of pipelining registers, wherein the pipelining block is configured to store a plurality of inputs for one or more systolic intervals and provide the plurality of inputs to the active bus and the one or more inactive busses of the first sub-array.

Clause 3. The systolic processor of Clause 1, wherein each sub-array of processing elements includes, for each row, a plurality of active row-oriented busses.

Clause 4. The systolic processor of Clause 1, wherein the first shifter element comprise a plurality of pipelining registers, each pipelining register configured to store an output of the first sub-array for one or more systolic intervals.

Clause 5. The systolic processor of Clause 1 further comprising a second shifter element, the second shifter element located before the first sub-array, the second shifter element comprising circuitry configured, for each row of the array, to provide an input for each of the active bus and the one or more inactive busses of the first sub-array.

Clause 6. A systolic processor comprising:

a systolic array of processing elements arranged in rows and columns;

wherein the systolic array of processing elements is divided into a plurality of sub-arrays of processing elements, each sub-array of the processing elements including a plurality of consecutive columns of the systolic array, each sub-array of the processing elements further including, for each row, an active bus and one or more inactive busses, each processing element of a sub-array configured to perform a mathematical operation on an input of the active bus corresponding to the respective sub-array; and a plurality of shifter elements dispersed within the systolic array, each shifter element comprising circuitry configured, for each row of the array, to obtain an output and provide the output to an active bus of a sub-array.

Clause 7. The systolic processor of Clause 6, wherein the active bus and the one or more inactive busses comprise a plurality of row-oriented busses.

Clause 8. The systolic processor of Clause 6, wherein each sub-array of the processing elements includes, for each row, a plurality of active busses.

Clause 9. The systolic processor of Clause 6, wherein each processing element is further configured to:

perform the mathematical operation on a weight and an input data element; and provide the weight and the input data element to a subsequent column of the respective sub-array.

Clause 10. The systolic processor of Clause 6, wherein the systolic processor further comprises a pipelining block of pipelining registers in a plurality of pipelining busses, wherein the pipelining block is configured to store a plurality of inputs for one or more systolic intervals and provide the plurality of inputs to the active bus and the one or more inactive busses of a first sub-array.

Clause 11. The systolic processor of Clause 10, wherein a number of pipelining registers within a respective row of the pipelining block is based on a number of sub-arrays of the plurality of sub-arrays.

Clause 12. The systolic processor of Clause 10, wherein a number of pipelining busses of the pipelining block is based on a number of busses of the active bus and the one or more inactive busses.

Clause 13. The systolic processor of Clause 6, wherein each shifter element comprises a plurality of pipelining registers, the plurality of pipelining registers configured to store a plurality of inputs for one or more systolic intervals.

Clause 14. The systolic processor of Clause 6, wherein the plurality of shifter elements includes a first shifter element configured, for each row of the systolic array, to receive a first input and provide the first input to an active bus of a first sub-array.

Clause 15. The systolic processor of Clause 6, wherein the plurality of shifter elements includes a first shifter element configured, for each row of the systolic array, to obtain an output from an inactive bus of a first sub-array and provide the output to an active bus of a second sub-array.

Clause 16. The systolic processor of Clause 6, wherein a number of consecutive columns of the plurality of consecutive columns is based on a distance that a row-oriented bus can be driven in a clock cycle.

Clause 17. The systolic processor of Clause 6, wherein the systolic array includes m columns, wherein the plurality of sub-arrays includes n sub-arrays, wherein the plurality of consecutive columns includes m/n consecutive columns.

Clause 18. A systolic processor comprising:

a systolic array of processing elements arranged in rows and columns, each row of the systolic array including a plurality of row-oriented busses, each row-oriented bus corresponding to a number of consecutive processing elements;

wherein each row-oriented bus is configured as an active row-oriented bus for a subset of consecutive columns of the systolic array, each processing element of the subset of consecutive columns of the systolic array configured to perform a mathematical operation on an input of the active row-oriented bus; and a plurality of shifter elements, each shifter element configured to select a row-oriented bus for a given subset of consecutive columns, wherein selecting the row-oriented bus comprises selecting the row-oriented bus for the active row-oriented bus of the given subset of consecutive columns, each shifter element interposed within the systolic array.

Clause 19. The systolic processor of Clause 18, wherein the systolic array is divided into a plurality of sub-arrays based on a number of the plurality of row-oriented busses.

Clause 20. The systolic processor of Clause 18, wherein the systolic processor further comprises a pipelining block of pipelining registers, wherein the pipelining registers are configured to store a plurality of inputs for one or more systolic intervals and provide the plurality of inputs to a first column of the systolic array.

Clause 21. The systolic processor of Clause 20, wherein a number of pipelining registers within the pipelining block is based on a number of row-oriented busses.

Clause 22. The systolic processor of Clause 18, wherein each processing element is configured to perform a mathematical operation on an input of the respective active row-oriented bus.

Clause 23. The systolic processor of Clause 22, wherein each processing element is further configured to:
perform the mathematical operation on a weight and an input data element; and
provide the weight and the input data element to a subsequent column of the given subset of consecutive columns.

Clause 24. The systolic processor of Clause 18, wherein each shifter element comprises a plurality of pipelining registers, the plurality of pipelining registers configured to store a plurality of inputs for one or more systolic intervals.

Clause 25. The systolic processor of Clause 18, wherein the plurality of shifter elements includes a first shifter element configured, for each row of the systolic array, to select a first row-oriented bus for the active bus of a first subset of consecutive columns.

Clause 26. The systolic processor of Clause 25, wherein the plurality of shifter elements includes a second shifter element configured, for each row of the systolic array, to select a second row-oriented bus for the active bus of a second subset of consecutive columns, wherein the first subset of consecutive columns is separated from the second subset of consecutive columns by at least the second shifter element.

Various additional example embodiments of the disclosure can be described by the following clauses:

Clause 1. A systolic processor comprising:
a systolic array of processing elements arranged in rows and columns, each processing element of the processing elements comprising:
a multiplier configured to multiply an input data element by a weight to generate a multiplier product, and
an adder configured to generate an output partial sum by adding the multiplier product and an input partial sum;
wherein the columns comprise a first, second, third, and fourth column each comprising a plurality of processing elements;
wherein the processing elements the first and third columns are configured to perform mathematical operations using data passed along a first row-oriented bus, and wherein the processing elements of the second and fourth columns are configured to perform mathematical operations using data passed along a second row-oriented bus;
wherein each processing element of the first column is configured to output a respective input data element and a respective weight along the first row-oriented bus to a corresponding processing element in the third column, wherein the first column and the third column are separated within the columns by at least the second column;
wherein each processing element of the second column is configured to output a respective input data element and a respective weight along the second row-oriented bus to a corresponding processing element in the fourth column, wherein the second column and the fourth column are separated within the columns by at least the third column.

Clause 2. The systolic processor of Clause 1, wherein each processing element of the first column and each processing element of the second column are configured to receive a respective weight and a respective input data element in a first systolic interval.

Clause 3. The systolic processor of Clause 1, wherein each processing element of the first column and each processing element of the second column are configured to receive a respective weight and a respective input data element in a first systolic interval, wherein each processing element of the third column and each processing element of the fourth column are configured to receive a respective weight and a respective input data element in a second systolic interval, wherein the first and second systolic intervals are separated within systolic intervals by at least one intervening systolic interval.

Clause 4. The systolic processor of Clause 1, wherein each row of the rows comprises a plurality of row-oriented busses.

Clause 5. A systolic circuit comprising:
a systolic array comprising a plurality of processing elements arranged into rows and columns, each row of the systolic array including a plurality of row-oriented buses, each row-oriented bus configured to pass data along a set of processing elements in non-adjacent columns for use in the performance of mathematical operations by the set of processing elements corresponding to the row-oriented bus, each processing element within an individual column of the systolic array configured to:
receive a respective weight and a respective input data element,
perform one or more operations on the weight and the input data element, and
provide the weight and the input data element to a processing element of a subsequent column corresponding to the row-oriented bus of the individual column, wherein the subsequent column is separated within the systolic array from the individual column by one or more intervening columns corresponding to a different row-oriented bus.

Clause 6. The systolic circuit of Clause 5, wherein:
each processing element of the plurality of processing elements comprises:
a multiplier, and
an adder;
wherein the one or more operations comprises a multiplication operation by the multiplier.

Clause 7. The systolic circuit of Clause 5, wherein each row of the systolic array is configured to receive a plurality of input data elements.

Clause 8. The systolic circuit of Clause 5, wherein each row of the systolic array is configured to receive a plurality of weights.

Clause 9. The systolic circuit of Clause 5, wherein each processing element is further configured to store the weight and the input data element for one or more systolic intervals.

Clause 10. The systolic circuit of Clause 5, wherein the systolic array is divided into sub-arrays of non-adjacent columns of processing elements, each sub-array of processing elements corresponding to a row-oriented bus, the individual column and the subsequent column are separated by a number of columns within the systolic array equal to one less than a number of sub-arrays.

Clause 11. The systolic circuit of Clause 5, wherein the individual column and the subsequent column are separated by a number of columns within the systolic array based on the distance that a row-oriented bus can be driven in a clock cycle.

Clause 12. The systolic circuit of Clause 5, wherein a first processing element of each row-oriented bus of the plurality of row-oriented busses is configured to receive a weight and an input data element during a first systolic interval.

Clause 13. The systolic circuit of Clause 5, wherein the performing one or more operations on the weight and the input data element comprises:
 performing a first one or more operations on a first weight and the input data element during a first systolic interval; and
 performing a second one or more operations on a second weight and the input data element during a second systolic interval.

Clause 14. The systolic circuit of Clause 5, wherein each processing element is configured to receive a same input data element.

Clause 15. A method comprising:
receiving a first weight corresponding to a first row-oriented bus of a row of a systolic array and a second weight corresponding to a second row-oriented bus of the row of the systolic array;
receiving a first input data element corresponding to the first row-oriented bus and a second input data element corresponding to the second row-oriented bus;
at a processing element of the row and a first column of the systolic array:
 performing a set of operations on the first weight and the first input data element, and
 providing the first weight and the first input data element to a processing element of a third column of the systolic array, wherein the first column and the third column are separated by at least a second column of the systolic array; and at a processing element of the row and the second column of the systolic array:
 performing the set of operations on the second weight and the second input data element, and
 providing the second weight and the second input data element to a processing element of a fourth column of the systolic array, wherein the second column and the fourth column are separated by at least the third column of the systolic array.

Clause 16. The method of Clause 15, wherein:
the processing element of the row and the first column and the processing element of the row and the second column each comprise:
 a multiplier, and
 an adder;
wherein the set of operations comprises a multiplication operation by the multiplier.

Clause 17. The method of Clause 15, wherein performing the set of operations on the first weight and the input data element and performing the set of operations on the second weight and the input data element occur in parallel during the same set of systolic intervals.

Clause 18. The method of Clause 15, wherein the first column and the third column are separated by a number of columns within the systolic array equal to one less than a number of row-oriented busses of the row.

Clause 19. The method of Clause 15, wherein each processing element of the first column and each processing element of the second column are configured to receive a respective weight and a respective input data element during a first systolic interval.

Clause 20. The method of Clause 19, wherein each processing element of the third column and each processing element of the fourth column are configured to receive a respective weight and a respective input data element during a second systolic interval, wherein the first systolic interval and the second systolic interval are separated within systolic intervals by at least one intervening systolic interval.

Clause 21. The method of Clause 15, wherein the first input data element and the second input data element are a same input data element.

Clause 22. The method of Clause 15, further comprising:
at the processing element of the row and the first column of the systolic array:
 storing the first weight and the first input data element for one or more systolic intervals, and
at the processing element of the row and the first column of the systolic array:
 storing the second weight and the second input data element for one or more systolic intervals.

Clause 23. The method of Clause 15, wherein the systolic array is divided into sub-arrays of non-adjacent columns of processing elements, each sub-array of processing elements corresponding to a row-oriented bus, wherein the row is configured to receive a plurality of input data elements, the plurality of input data elements based on a number of sub-arrays.

Clause 24. The method of Clause 15, wherein the systolic array is divided into sub-arrays of non-adjacent columns of processing elements, each sub-array of processing elements corresponding to a row-oriented bus, wherein the row is configured to receive a plurality of weights, the plurality of weights based on a number of sub-arrays.

Various additional example embodiments of the disclosure can be described by the following clauses:

Clause 1. A processing element enabling multiple row-oriented busses within a systolic array, the processing element comprising:
a set of input ports;
a set of output ports;
 wherein the set of output ports is configured to be coupled to a subsequent processing element including a second set of input ports, such that individual output ports are coupled to individual input ports of the second set of input ports;
an adder configured to:
 generate a partial sum by performing an addition operation based on an input, and
 output the partial sum; and
a plurality of interconnects for multiple row-oriented busses, each interconnect connecting i) an individual input port, of the set of input ports, to ii) an individual output port, of the set of output ports, that is configured to be coupled to an individual input port of the subsequent processing element;

wherein the plurality of interconnects comprise:
an active interconnect configured to obtain the input from a first input port of the set of input ports and to provide the input to a first output port of the set of output ports, and
one or more passive interconnects configured to pass through a data element from an individual input port of the set of input ports to the subsequent processing element without modification of the data element.

Clause 2. The processing element of Clause 1, wherein the subsequent processing element comprises:
an adder configured to:
generate a second partial sum by performing a second addition operation based on the data element, and
output the second partial sum; and
a second plurality of interconnects for multiple row-oriented busses, each interconnect connecting i) an individual input port, of the second set of input ports, to ii) an individual output port, of a second set of output ports;
wherein the second plurality of interconnects comprises an active interconnect configured to obtain the data element from a first input port of the second set of input ports and to provide the data element to a first output port of the second set of output ports.

Clause 3. The processing element of Clause 2, wherein a passive interconnect of the one or more passive interconnects of the processing element corresponds to the active interconnect of the second plurality of interconnects of the subsequent processing element.

Clause 4. The processing element of Clause 1, wherein the subsequent processing element comprises:
a second plurality of interconnects for multiple row-oriented busses, each interconnect connecting i) an individual input port, of the second set of input ports, to ii) an individual output port, of a second set of output ports;
wherein the second plurality of interconnects comprise one or more passive interconnects configured to passthrough the input from an individual input port, of the second set of input ports, to an individual output port, of the second set of output ports, without modification of the input.

Clause 5. The processing element of Clause 1, wherein a set of inputs are provided to the set of input ports, the set of inputs comprising a weight and an input data element.

Clause 6. A processing element within a systolic array, the processing element comprising:
a set of input ports;
a set of output ports;
wherein the set of output ports is configured to be coupled to a subsequent processing element including a second set of input ports, such that individual output ports are coupled to individual input ports of the second set of input ports;
a plurality of interconnects, each interconnect connecting i) an individual input port, of the set of input ports, to ii) an individual output port, of the set of output ports, that is configured to be coupled to an individual input port of the subsequent processing element;

wherein the plurality of interconnects comprise:
an active interconnect configured to obtain an input from a first input port of the set of input ports and to provide the input to a first output port of the set of output ports, and
one or more passive interconnects configured to pass through a data element from an individual input port of the set of input ports to the subsequent processing element without modification of the data element; and
a multiplier configured to:
generate a multiplier product by performing a multiplication operation based on the input, and
output the multiplier product.

Clause 7. The processing element of Clause 6, wherein the multiplier is further configured to receive a weight from the first input port.

Clause 8. The processing element of Clause 7, wherein the multiplication operation is further based on an input from a second input port, wherein the multiplier is further configured to receive an input data element from the second input port.

Clause 9. The processing element of Clause 6, wherein the multiplier is further configured to:
receive a weight from the first input port during a first systolic interval; and
receive an input data element from the first input port during a second systolic interval.

Clause 10. The processing element of Clause 9, wherein each input port of the set of input ports is configured to:
receive a respective weight during a first systolic interval; and
receive the input data element during a second systolic interval.

Clause 11. The processing element of Clause 6, the processing element further comprising:
an adder configured to:
generate a partial sum by performing an addition operation based on the multiplier product, and
output the partial sum.

Clause 12. The processing element of Clause 6, wherein the one or more passive interconnects correspond to interconnects that are electronically isolated from the multiplier of the processing element.

Clause 13. The processing element of Clause 6, wherein each interconnect of the plurality of interconnects are for one or more row-oriented busses of the multiple row-oriented busses.

Clause 14. The processing element of Clause 6, wherein a passive interconnect of the one or more passive interconnects of the processing element corresponds to an active interconnect of a second plurality of interconnects of the subsequent processing element.

Clause 15. The processing element of Clause 6, wherein the active interconnect of the processing element corresponds to a passive interconnect of a second plurality of interconnects of the subsequent processing element.

Clause 16. A processing element within a systolic array, the processing element comprising:
a set of input ports;
a set of output ports;
a plurality of interconnects for multiple row-oriented busses, each interconnect connecting i) an individual input port, of the set of input ports, to ii) an individual output port, of the set of output ports, that is configured to be coupled to an individual input port of a subsequent processing element;

wherein the plurality of interconnects comprise:
an active interconnect configured to obtain an input from a first input port of the set of input ports and to provide the input to a first output port of the set of output ports, and
one or more passive interconnects configured to pass through a data element from an individual input port of the set of input ports to the subsequent processing element without modification of the data element; and
circuitry coupled to the active interconnect and configured to perform a mathematical operation on the input.

Clause 17. The processing element of Clause 16, wherein the circuitry is further configured to receive a weight from the first input port of the set of input ports.

Clause 18. The processing element of Clause 17, wherein the circuitry is further coupled to a second active interconnect of the plurality of interconnects, the second active interconnect configured to obtain an input data element from a second input port of the set of input ports, the circuitry further configured to receive the input data element from a second input port of the set of input ports.

Clause 19. The processing element of Clause 16, wherein the circuitry is further configured to:
receive a weight from the first input port of the set of input ports during a first systolic interval; and
receive an input data element from the first input port of the set of input ports during a second systolic interval.

Clause 20. The processing element of Clause 19, wherein each input port of the set of input ports is configured to:
receive a respective weight during a first systolic interval; and
receive the input data element during a second systolic interval.

Clause 21. The processing element of Clause 16, wherein the mathematical operation comprises multiplying two or more inputs.

Clause 22. The processing element of Clause 16, wherein the one or more passive interconnects correspond to interconnects that are electronically isolated from the circuitry of the processing element.

Clause 23. The processing element of Clause 16, wherein the set of output ports is configured to be coupled to a subsequent processing element including a second set of input ports, such that individual output ports are coupled to individual input ports of the second set of input ports.

Various additional example embodiments of the disclosure can be described by the following clauses:

Clause 1. A processing element enabling multiple columnar busses within a systolic array, the processing element comprising:
a set of inputs, each input located at a respective input position of a set of input positions on the processing element;
a set of outputs, each output located at a respective output position of a set of output positions on the processing element;
wherein the set of inputs is configured to be coupled to a prior processing element including a second set of outputs at the set of output positions, such that individual outputs of the second set of outputs are coupled to individual inputs of the set of inputs;
wherein the set of outputs are configured to be coupled to a subsequent processing element including a second set of inputs at the set of input positions, such that individual outputs of the set of outputs are coupled to individual inputs of the second set of inputs;
a plurality of interconnects for multiple columnar busses, each interconnect connecting i) an individual input, of the set of inputs, at a given input position to ii) an individual output, of the set of outputs, that is configured to be coupled to an individual input of the subsequent processing element that is at a different input position than the given input position, wherein the different input position is adjacent to the given input position within the set of input positions;
a multiplier configured to multiply an input data element by a weight to generate a multiplier product; and
an adder coupled to the multiplier and to a first interconnect of the plurality of interconnects, the adder configured to:
obtain a first partial sum from the input of the first interconnect,
generate a second partial sum by adding the multiplier product to the first partial sum, and
output the second partial sum to the output of the first interconnect.

Clause 2. The processing element of Clause 1, wherein one or more interconnects of the plurality of interconnects are passive interconnects that are electronically isolated from the multiplier and the adder of the processing element.

Clause 3. The processing element of Clause 1, wherein the set of output positions and the set of input positions are spaced along a horizontal axis, wherein each input position is aligned with respect to the horizontal axis with an output position of the set of output positions, and wherein each interconnect connects an individual input at a given position along the horizontal axis to an individual output at a different position along the horizontal axis.

Clause 4. The processing element of Clause 1, further comprising at least one delay register configured to:
store the multiplier product for one or more systolic intervals; and
provide the multiplier product to the adder.

Clause 5. A processing element for a systolic array, the processing element comprising:
a set of inputs, each input located at a respective input position of a set of input positions on the processing element;
a set of outputs, each output located at a respective output position of a set of output positions on the processing element;
wherein each output of the set of outputs is configured to be coupled to a subsequent processing element including a second set of inputs at the set of input positions, such that individual outputs of the set of outputs are coupled to individual inputs of the second set of inputs;
a plurality of interconnects for multiple input busses, each interconnect connecting i) an individual input, of the set of inputs, at a given input position to ii) an individual output, of the set of outputs, that is configured to be coupled to an individual input of the second set of inputs of the subsequent processing element, wherein the individual input of the second set of inputs is at a different input position than the given input position; and an adder configured to:
- generate a partial sum by performing an addition operation based on an input of a first interconnect, and
- output the partial sum.

Clause 6. The processing element of Clause 5, wherein the set of output positions and the set of input positions are spaced along a horizontal axis, wherein each input position is aligned with respect to the horizontal axis with an output position of the set of output positions, and wherein each interconnect connects an individual input at a given position along the horizontal axis to an individual output at a different position along the horizontal axis.

Clause 7. The processing element of Clause 5, wherein a number of inputs within the set of inputs is based on a number of input buses.

Clause 8. The processing element of Clause 5, wherein an output of the first interconnect is configured to be coupled to an input of the subsequent processing element at a first input position, and wherein a second interconnect, of the plurality of interconnects, is configured to be connected to an input of the set of inputs at the first input position.

Clause 9. The processing element of Clause 5, wherein the individual output of each interconnect is configured to be coupled to an input of the subsequent processing element at an input position that is m positions away from the input position of the individual input of that interconnect on the processing element, and wherein m is selected such that when a number of instances of the processing element of Clause 5 equal to the number of input busses are coupled together, an electrical signal travels through each of the set of input positions without repetition.

Clause 10. The processing element of Clause 5, wherein the individual output of each interconnect is configured to be coupled to an input of the subsequent processing element at an input position that is m positions away from the input position of the individual input of that interconnect on the processing element, and wherein m is selected such that when m instances of the processing element of Clause 5 are coupled together, an adder of a first instance of the processing element is coupled to an adder of a second instance of the processing element that is non-adjacent to the first instance of the processing element.

Clause 11. The processing element of Clause 5, wherein the set of output positions and the set of input positions are spaced along a vertical axis, wherein each input position is aligned with respect to the vertical axis with an output position of the set of output positions, and wherein each interconnect connects an individual input at a given position along the vertical axis to an individual output at a different position along the vertical axis.

Clause 12. A processing element for a systolic array, the processing element comprising:
- a set of inputs, each input located at a respective input position of a set of input positions on the processing element;
- a set of outputs, each output located at a respective output position of a set of output positions on the processing element;
wherein the set of outputs are configured to be coupled to a subsequent processing element including a second set of inputs at the set of input positions, such that individual outputs of the set of outputs are coupled to individual inputs of the second set of inputs;
- a plurality of interconnects, each interconnect connecting i) an individual input, of the set of inputs, at a given input position to ii) an individual output of the set of outputs that is configured to be coupled to an individual input of the subsequent processing element that is at a different input position than the given input position; and
- circuitry coupled to a first interconnect of the plurality of interconnects and configured to perform a mathematical operation on data received from the input of the first interconnect.

Clause 13. The processing element of Clause 12, wherein the set of output positions and the set of input positions are spaced along a horizontal axis, wherein each input position is aligned with respect to the horizontal axis with an output position of the set of output positions, and wherein each interconnect connects an individual input at a given position along the horizontal axis to an individual output at a different position along the horizontal axis.

Clause 14. The processing element of Clause 12, wherein the set of output positions and the set of input positions are spaced along a vertical axis, wherein each input position is aligned with respect to the vertical axis with an output position of the set of output positions, and wherein each interconnect connects an individual input at a given position along the vertical axis to an individual output at a different position along the vertical axis.

Clause 15. The processing element of Clause 12, wherein the output of the first interconnect is configured to be coupled to an input of the subsequent processing element at a first input position, and wherein a second interconnect, of the plurality of interconnects, is configured to be connected to an input of the set of inputs at the first input position.

Clause 16. The processing element of Clause 12, wherein each output of the set of outputs is configured to physically abut an individual input of the subsequent processing element and to provide an electrical signal to the individual input of the subsequent processing element without the electrical signal traversing intervening circuitry.

Clause 17. The processing element of Clause 12, wherein the plurality of interconnects are for multiple columnar buses in the systolic array.

Clause 18. The processing element of Clause 12, wherein the circuitry comprises:
- a multiplier configured to calculate a product; and
- an adder configured to calculate a sum based on the product and an input partial sum, wherein the input partial sum is the data received from the input of the first interconnect;
wherein a result of the mathematical operation is the sum.

Clause 19. The processing element of Clause 18, wherein the circuitry further comprises one or more delay registers, the one or more delay registers configured to store the product for one or more clock cycles and provide the product to the adder.

Clause 20. The processing element of Clause 12, wherein each interconnect of the plurality of interconnects is electronically isolated from each other interconnect of the plurality of interconnects.

Various additional example embodiments of the disclosure can be described by the following clauses:

Clause 1. A systolic processor comprising:
a systolic array of processing elements arranged in rows and columns, each processing element of the processing elements comprising:
a multiplier configured to multiply an input data element by a weight to generate a multiplier product, and
an adder configured to generate an output partial sum by adding the multiplier product and an input partial sum;
wherein the rows comprise a first, second, third, and fourth row each comprising a plurality of processing elements;
wherein the first and third rows are coupled to a first columnar bus, and the second and fourth rows are coupled to a second columnar bus;
wherein each processing element of the first row is configured to output a respective output partial sum along the first columnar bus to a corresponding processing element in the third row, wherein the first and third row are separated within the rows by at least the second row;
wherein each processing element of second row is configured to output a respective output partial sum along the second columnar bus to a corresponding processing element in the fourth row, wherein the second and fourth row are separated within the rows by at least the third row;
wherein each of the columns comprises at least an adder configured to generate a final sum of the column by adding an output partial sum corresponding to the first columnar bus and an output partial sum corresponding to the second columnar bus.

Clause 2. The systolic processor of Clause 1, wherein each processing element of the first row and each processing element of the second row are configured to receive a respective first input partial sum in a first systolic interval.

Clause 3. The systolic processor of Clause 1, wherein each processing element of the first row and each processing element of the second row are configured to receive a respective first input partial sum in a first systolic interval and each processing element of the third row and each processing element of the fourth row are configured to receive a respective first input partial sum in a second systolic interval, wherein the first and second systolic interval are separated within systolic intervals by at least one intervening systolic interval.

Clause 4. The accumulate processor of Clause 1, wherein the adder of each processing element is further configured to:
generate the output partial sum over a number of systolic intervals, wherein the number of systolic intervals equals a number of rows separating the first row and the third row.

Clause 5. A systolic circuit comprising:
a systolic array comprising a plurality of processing elements arranged into rows and columns, each column of the systolic array including a plurality of columnar buses, each columnar bus implemented as a set of processing elements in non-consecutive rows, each processing element within an individual row of the systolic array configured to:
perform one or more operations on a respective input partial sum,
generate an output partial sum based on the one or more operations, and
provide the output partial sum to a subsequent row corresponding to the columnar bus of the individual row, wherein the subsequent row is separated within the systolic array from the individual row by one or more intervening rows coupled to a different columnar bus.

Clause 6. The systolic circuit of Clause 5, wherein:
each processing element of the plurality of processing elements comprises:
a multiplier configured to calculate a product, and
an adder configured to add the product and the respective input partial sum and generate the output partial sum;
wherein the one or more operations comprises at least a multiplication operation by the multiplier and an addition operation by the adder.

Clause 7. The systolic circuit of Clause 6, wherein the multiplication operation is completed at a first systolic interval and the addition operation is completed at a second systolic interval, wherein the first and second systolic interval are separated within systolic interval by at least one intervening systolic interval.

Clause 8. The systolic circuit of Clause 6, wherein the adder is further configured to generate the respective output partial sum over a set of systolic intervals.

Clause 9. The systolic circuit of Clause 8, wherein the systolic array is configured to provide an initial input partial sum to an initial processing element coupled to each columnar bus on a first systolic interval.

Clause 10. The systolic circuit of Clause 5, wherein each column of the plurality of columns is configured to receive a plurality of input partial sums.

Clause 11. The systolic circuit of Clause 5, wherein a first processing element of each columnar bus is configured to receive an input partial sum in a first systolic interval.

Clause 12. The systolic circuit of Clause 5, each column of the systolic array further including a plurality of adders configured to, for each column of the systolic array, combine each output partial sum generated by each columnar bus of a respective column to generate one or more final sums.

Clause 13. The systolic circuit of Clause 5, each column of the systolic array further including a plurality of adders configured to perform chunk-based accumulation.

Clause 14. A method comprising:
receiving a first input partial sum corresponding to a first columnar bus of a column of a systolic array and a second input partial sum corresponding to a second columnar bus of the column of the systolic array;
at a processing element of the column and a first row of the systolic array:
performing a set of operations on the first input partial sum to generate a columnar partial sum for the first column, and
providing the columnar partial sum for the first column to a processing element of a third row of the systolic array, wherein the first and third rows are separated by at least a second row of the systolic array;

at a processing element of the column and the second row of the systolic array:

performing the set of operations on the second input partial sum to generate a columnar partial sum for the second column, and providing the columnar partial sum for the second column to a processing element of a fourth row of the systolic array, wherein the second and fourth rows are separated by at least the third row of the systolic array;

at a processing element of the column and the third row of the systolic array, updating the columnar partial sum for the first columnar bus by performing the set of operations on the columnar partial sum for the first columnar to result in an updated columnar partial sum for the first columnar bus; and at a processing element of the column and the fourth row of the systolic array, updating the columnar partial sum for the second columnar bus by performing the set of operations on the columnar partial sum for the second columnar bus to result in an updated columnar partial sum for the second columnar bus.

Clause 15. The method of Clause 14, further comprising generating a final sum based on adding the updated columnar partial sum for the first columnar bus and the updated columnar partial sum for the second columnar bus.

Clause 16. The method of Clause 14, wherein performing the set of operations on the first input partial sum to generate the columnar partial sum for the first column and performing the set of operations on the second input partial sum to generate the columnar partial sum for the second column occur in parallel during the same set of systolic intervals.

Clause 17. The method of Clause 16, wherein the set of operations includes an add operation that occurs over at least two systolic intervals, and wherein the at least two systolic intervals are equal in number to a number of columnar busses of the column.

Clause 18. The method of Clause 14, wherein the set of operations comprises:

receiving an input data element and a weight;

multiplying the input data element and the weight to generate a multiplier product; and adding an input partial sum to the first multiplier product.

Clause 19. The method of Clause 18, further comprising:

performing said multiplying in a first systolic interval; and performing said adding in one or more systolic intervals subsequent to the first systolic interval.

Clause 20. The method of Clause 14, wherein the first and third rows are separated by a number of rows within the systolic array equal to one less than a number of columnar buses of the column.

Examples of the disclosed technologies can provide systems and methods to reduce dynamic power consumption by reducing or eliminating the use of speculative logic in the PEs. Additionally, the enablement of increased latency in each PE allows for reduced power consumption. However, the sequence skipping of multiple rows allows for a corresponding decrease in overall latency of the systolic array. Therefore, the decreased latency due to the columnar busses when combined with the increased latency due to the high latency adders can result in decreased power consumption with minimal increases in system latency.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 6A, FIG. 6B, or FIG. 6C, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The term "or" is used in its inclusive sense (and not in its exclusive sense) so that when used, for example, to connect a list of elements, the term "or" means one, some, or all of the elements in the list. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A systolic processor comprising:
a systolic array of processing elements arranged in rows and columns;
wherein the systolic array of processing elements is divided into a plurality of sub-arrays of processing elements, each sub-array of the plurality of sub-arrays including at least one of 1) a plurality of non-consecutive columns of the columns of the systolic array, or 2) a plurality of non-consecutive rows of the rows of the systolic array, an individual processing element within a sub-array of the plurality of sub-arrays configured to:
perform one or more operations on an input, and
provide an output to a subsequent processing element within the same sub-array, wherein the subsequent processing element is separated within the systolic array from the individual processing element by one or more intervening processing elements corresponding to a different sub-array of the plurality of sub-arrays.

2. The systolic processor of claim 1, wherein a number of the one or more intervening processing elements is equal to one less than a number of buses of the systolic array.

3. The systolic processor of claim 1, wherein a first processing element within a first sub-array of the plurality of sub-arrays provides an output to a second processing element within the first sub-array that is separated within the systolic array from the first processing element by n intervening processing elements, and wherein the second processing element provides a second output to a third processing element within the first sub-array that is separated within the systolic array from the second processing element by n intervening processing elements.

4. The systolic processor of claim 1, wherein the individual processing element corresponds to at least one of a first row or a first column of the systolic array, wherein the subsequent processing element corresponds to at least one of a third row or a third column of the systolic array, wherein the first row and the third row are separated within the rows of the systolic array by at least a second row of the systolic array, and wherein the first column and the third column are separated within the columns of the systolic array by at least a second column of the systolic array.

5. The systolic processor of claim 1, wherein the systolic array includes a plurality of busses.

6. The systolic processor of claim 1, wherein a number of the plurality of sub-arrays is equal to a number of buses of the systolic array.

7. The systolic processor of claim 1, wherein the subsequent processing element is separated within the systolic array from the individual processing element by the one or more intervening processing elements based on the distance that a bus of the systolic array can be driven in a clock cycle.

8. The systolic processor of claim 1, wherein the one or more operations comprise:
receiving an input data element and a weight;
multiplying the input data element and the weight to generate a product; and
adding an input partial sum to the product to generate an output partial sum.

9. The systolic processor of claim 8, wherein the output comprises at least one of the input data element, the weight, or the output partial sum.

10. The systolic processor of claim 1, wherein a first processing element within a first sub-array of the plurality of sub-arrays and a second processing element within a second sub-array of the plurality of sub-arrays are configured to receive a respective input in a first systolic interval.

11. The systolic processor of claim 1, wherein a first processing element within a first sub-array of the plurality of sub-arrays is configured to receive a respective input in a first systolic interval, and wherein a second processing element within the first sub-array is configured to receive a respective input in a second systolic interval, wherein the first systolic interval and the second systolic interval are separated within systolic intervals by at least one intervening systolic interval.

12. A systolic circuit comprising:
a systolic array of processing elements arranged in rows and columns, wherein the systolic array of processing elements is divided into a plurality of sub-arrays of processing elements, and wherein an initial processing element within a first sub-array of the plurality of sub-arrays is adjacent within the systolic array to an initial processing element within a second sub-array of the plurality of sub-arrays, the initial processing element within the first sub-array configured to:
perform one or more operations on an input, and
provide an output to a subsequent processing element within the first sub-array, wherein the subsequent processing element is separated within the systolic array from the initial processing element within the first sub-array by at least the initial processing element within the second sub-array.

13. The systolic circuit of claim 12, wherein each sub-array of the plurality of sub-arrays including at least one of 1) a plurality of non-consecutive columns of the columns of the systolic array, or 2) a plurality of non-consecutive rows of the rows of the systolic array.

14. The systolic circuit of claim 12, wherein the initial processing element within the first sub-array is separated within the systolic array from each other processing element within the first sub-array by at least one intervening processing element.

15. The systolic circuit of claim 12, wherein at least one of:
each row of the rows of the systolic array includes a plurality of row-oriented buses; or
each column of the columns of the systolic array includes a plurality of columnar buses.

16. The systolic circuit of claim 12, wherein each sub-array of the plurality of sub-arrays includes:
a plurality of consecutive columns of the columns of the systolic array; and
a plurality of non-consecutive rows of the rows of the systolic array.

17. The systolic circuit of claim 12, wherein each sub-array of the plurality of sub-arrays includes:

a plurality of consecutive rows of the rows of the systolic array; and
a plurality of non-consecutive columns of the columns of the systolic array.

18. A method comprising:
receiving first data corresponding to a first sub-array of a systolic array and second data corresponding to a second sub-array of the systolic array;
passing the first data to a first processing element within the first sub-array;
passing the second data to a second processing element within the second sub-array;
at the first processing element:
   performing a first set of operations on the first data to generate an output; and
   providing the output to a third processing element within the first sub-array, wherein the third processing element is separated within the systolic array from the first processing element by at least the second processing element.

19. The method of claim 18, wherein passing the first data to the first processing element comprises:
passing the first data through one or more delay registers to the first processing element.

20. The method of claim 18, wherein the first sub-array comprises a first plurality of non-consecutive columns of the systolic array and a first plurality of non-consecutive rows of the systolic array, wherein the second sub-array comprises a second plurality of non-consecutive columns of the systolic array and a second plurality of non-consecutive rows of the systolic array, wherein at least a first column of the second plurality of non-consecutive columns is interleaved within the first plurality of non-consecutive columns within the systolic array, and wherein at least a first row of the second plurality of non-consecutive rows is interleaved within the first plurality of non-consecutive rows within the systolic array.

* * * * *